(12) United States Patent
Cormode et al.

(10) Patent No.: US 8,825,640 B2
(45) Date of Patent: Sep. 2, 2014

(54) METHODS AND APPARATUS FOR RANKING UNCERTAIN DATA IN A PROBABILISTIC DATABASE

(75) Inventors: Graham Cormode, Morristown, NJ (US); Feifei Li, Tallahassee, FL (US); Ke Yi, Clear Water Bay (CN)

(73) Assignee: AT&T Intellectual Property I, L.P., Atlanta, GA (US)

(*) Notice: Subject to any disclaimer, the term of this patent is extended or adjusted under 35 U.S.C. 154(b) by 810 days.

(21) Appl. No.: 12/404,906

(22) Filed: Mar. 16, 2009

(65) Prior Publication Data
US 2010/0235362 A1    Sep. 16, 2010

(51) Int. Cl.
*G06F 17/30* (2006.01)

(52) U.S. Cl.
CPC ............................ *G06F 17/3053* (2013.01)
USPC ....................................................... 707/723

(58) Field of Classification Search
CPC .................... G06F 17/3053; G06F 17/3061
See application file for complete search history.

(56) References Cited

U.S. PATENT DOCUMENTS

| 5,041,972 | A  | * | 8/1991  | Frost ............................ 705/7.32 |
| 5,124,911 | A  | * | 6/1992  | Sack ............................. 705/7.32 |
| 6,654,742 | B1 | * | 11/2003 | Kobayashi et al. .................... 1/1 |
| 7,113,932 | B2 |   | 9/2006  | Tayebnejad et al. |
| 7,191,144 | B2 |   | 3/2007  | White |
| 7,246,113 | B2 | * | 7/2007  | Cheetham et al. ............ 707/741 |
| 7,254,530 | B2 | * | 8/2007  | Klavans et al. ................. 704/10 |
| 7,359,550 | B2 |   | 4/2008  | Brand |
| 7,383,262 | B2 | * | 6/2008  | Das et al. .............................. 1/1 |
| 7,389,351 | B2 |   | 6/2008  | Horvitz |
| 7,398,221 | B1 |   | 7/2008  | Bensoussan et al. |
| 7,403,931 | B2 |   | 7/2008  | Tayebnejad et al. |
| 7,428,521 | B2 | * | 9/2008  | Horvitz et al. ................... 706/52 |
| 7,797,314 | B2 | * | 9/2010  | Stern et al. ..................... 707/723 |
| 7,814,113 | B2 | * | 10/2010 | Suciu et al. .................... 707/758 |
| 7,840,522 | B2 | * | 11/2010 | Liu et al. .......................... 706/62 |
| 7,987,176 | B2 | * | 7/2011  | Latzina et al. ................. 707/713 |
| 8,229,944 | B2 | * | 7/2012  | Latzina et al. ................. 707/759 |
| 2003/0220913 | A1 | * | 11/2003 | Doganata et al. ................. 707/3 |

(Continued)

OTHER PUBLICATIONS

Agrawal et al., "Trio: A System for Data, Uncertainty, and Lineage," pp. 1151-1154, Very Large Data Bases, Proceedings of the 32nd international conference on Very large data bases, held in Seoul, Korea, on Sep. 12-15, 2006 (4 pages).

(Continued)

*Primary Examiner* — Alexey Shmatov
*Assistant Examiner* — Hubert Cheung
(74) *Attorney, Agent, or Firm* — Hanley, Flight & Zimmerman, LLC

(57) ABSTRACT

Methods and apparatus for ranking uncertain data in a probabilistic database are disclosed. An example method disclosed herein comprises using a set of data tuples representing a plurality of possible data set instantiations associated with a respective plurality of instantiation probabilities to store non-deterministic data in a database, each data tuple corresponding to a set of possible data tuple instantiations, each data set instantiation realizable by selecting a respective data tuple instantiation for at least some of the data tuples, the method further comprising determining an expected rank for each data tuple included in at least a subset of the set of data tuples, the expected rank for a particular data tuple representing a combination of weighted component ranks of the particular data tuple, each component rank representing a ranking of the data tuple in a corresponding data set instantiation, each component ranking weighted by a respective instantiation probability.

19 Claims, 17 Drawing Sheets

(56) References Cited

U.S. PATENT DOCUMENTS

| | | | |
|---|---|---|---|
| 2004/0220907 A1* | 11/2004 | Camarillo | 707/3 |
| 2005/0060222 A1 | 3/2005 | White | |
| 2005/0234709 A1* | 10/2005 | Klavans et al. | 704/10 |
| 2005/0289102 A1* | 12/2005 | Das et al. | 707/1 |
| 2006/0095457 A1 | 5/2006 | Glasspool et al. | |
| 2006/0212412 A1* | 9/2006 | Sapir | 706/12 |
| 2006/0271556 A1 | 11/2006 | Mukherjee et al. | |
| 2006/0294035 A1 | 12/2006 | Siegel et al. | |
| 2007/0043755 A1* | 2/2007 | Rolleke | 707/102 |
| 2007/0061315 A1 | 3/2007 | McSherry | |
| 2007/0094181 A1 | 4/2007 | Tayebnejad et al. | |
| 2007/0094216 A1 | 4/2007 | Mathias et al. | |
| 2008/0319947 A1* | 12/2008 | Latzina et al. | 707/3 |
| 2009/0018897 A1 | 1/2009 | Breiter | |
| 2010/0198822 A1* | 8/2010 | Glennon et al. | 707/728 |
| 2011/0264697 A1* | 10/2011 | Latzina et al. | 707/771 |

OTHER PUBLICATIONS

Antova et al., "10Λ(10Λ6) Worlds and Beyond: Efficient Representation and Processing of Incomplete Information," pp. 606-615, IEEE 23rd International Conference held in Vienna, Austria, on Apr. 15-20, 2007 (preprint 17 pages).

Antova et al., "Fast and Simple Relational Processing of Uncertain Data," pp. 983-992, ICDE, Proceedings of the 2008 IEEE 24th International Conference on Data Engineering, 2008 (preprint 10 pages).

Benjelloun et al., "ULDBs: Databases with Uncertainty and Lineage," pp. 953-964, Very Large Databases, Proceedings of the 32nd international conference on Very large data bases, held in Seoul, Korea, on Sep. 12-15, 2006 (12 pages).

Beskales et al., "Efficient Search for the Top-k Probable Nearest Neighbors in Uncertain Databases," pp. 326-339, vol. 1, Issue 1, Proceedings of the VLDB Endowment, held in Auckland, New Zealand, on Aug. 23-28, 2008 (14 pages).

Borzsonyi et al., "The Skyline Operator," Proceedings of the 17th International Conference on Data Engineering, 2001 (preprint 20 pages).

Chaudhuri et al., "Robust and Efficient Fuzzy Match for Online Data Cleaning," pp. 313-324, International Conference on Management of Data, Proceedings of the 2003 ACM SIGMOD international conference on Management of data, held in San Diego, United States, on Jun. 9-12, 2003 (12 pages).

Cheng et al., "Probabilistic Verifiers: Evaluating Constrained Nearest-Neighbor Queries over Uncertain Data," pp. 973-982, ICDE 2008, IEEE 24th International Conference on Data Engineering, Apr. 7-12, 2008 (preprint 10 pages).

Cheng et al., "Evaluating Probabilistic Queries over Imprecise Data," pp. 551-562, International Conference on Management of Data, Proceedings of the 2003 ACM SIGMOD international conference on Management of data, held in San Diego, United States, on Jun. 9-12, 2003 (13 pages).

Dalvi et al., "Efficient Query Evaluation on Probabilistic Databases," pp. 523-544, vol. 16, Issue 4, The VLDB Journal—The International Journal on Very Large Data Bases, Oct. 2007 (preprint 22 pages).

Deshpande et al., "Model-Driven Data Acquisition in Sensor Networks," pp. 588-599, vol. 30, Very Large Data Bases, Proceedings of the Thirtieth international conference on Very large data bases, held in Toronto, Canada, 2004 (12 pages).

Dwork et al., "Rank Aggregation Methods for the Web," pp. 613-622, International World Wide Web Conference, Proceedings of the 10th international conference on World Wide Web, held in Hong Kong, China, on May 1-5, 2001 (10 pages).

Fagin et al., "Optimal Aggregation Algorithms for Middleware," Symposium on Principles of Database Systems, Proceedings of the twentieth ACM SIGMOD-SIGACT-SIGART symposium on Principles of database systems, held in Santa Barbara, United States, 2001 (preprint 41 pages).

Fuxman et al., "ConQuer: Efficient Management of Inconsistent Databases," pp. 155-166, International Conference on Management of Data, Proceedings of the 2005 ACM SIGMOD international conference on Management of data, held in Baltimore, United States, on Jun. 14-16, 2005 (12 pages).

Halevy et al., "Data Integration: The Teenage Years," pp. 9-16, Very Large Data Bases, Proceedings of the 32nd international conference on Very large data bases, held in Seoul, Korea, on Sep. 12-15, 2006 (8 pages).

Hernandez et al., "Real-World Data is Dirty: Data Cleansing and the Merge/Purge Problem," vol. 2, Issue 1, Data Mining and Knowledge Discovery, Jan. 1998 (preprint 39 pages).

Hua et al., "Efficiently Answering Probabilistic Threshold Top-k Queries on Uncertain Data," in Proceedings of the 24th International Conference on Data Engineering (ICDE'08), held in Cancun, Mexico, on Apr. 7-12, 2008 (preprint 24 pages).

Hua et al., "Ranking Queries on Uncertain Data: A Probabilistic Threshold Approach," pp. 673-686, International Conference on Management of Data, Proceedings of the 2008 ACM SIGMOD international conference on Management of data, held in Vancouver, Canada, on Jun. 9-12, 2008 (14 pages).

Ilyas et al., "Adaptive: Rank-Aware Query Optimization in Relational Databases," pp. 1257-1304, vol. 31, Issue 4, ACM Transactions on Database Systems (TODS), Dec. 2006 (preprint 45 pages).

Ilyas et al., "A Survey of Top-k Query Processing Techniques in Relational Database Systems," Article 11, vol. 40, Issue 4, ACM Computing Surveys (CSUR), Oct. 2008 (58 pages).

Jampani et al., "MCDB: A Monte Carlo Approach to Managing Uncertain Data," pp. 687-700, International Conference on Management of Data, Proceedings of the 2008 ACM SIGMOD international conference on Management of data, held in Vancouver, Canada, on Jun. 9-12, 2008 (14 pages).

Kanagal et al., "Online Filtering, Smoothing and Probabilistic Modeling of Streaming Data," pp. 1160-1169, ICDE, Proceedings of the 2008 IEEE 24th International Conference on Data Engineering, 2008 (preprint 10 pages).

Li et al., "RankSQL: Query Algebra and Optimization for Relational Top-k Queries," pp. 131-142, International Conference on Management of Data, Proceedings of the 2005 ACM SIGMOD international conference on Management of data, held in Baltimore, United States, on Jun. 14-16, 2005 (12 pages).

Lian et al., "Probabilistic Ranked Queries in Uncertain Databases," pp. 511-522, vol. 261, ACM International Conference Proceeding Series, Proceedings of the 11th international conference on Extending database technology: Advances in database technology, held in Nantes, France, on Mar. 25-30, 2008 (12 pages).

Ljosa et al., "APLA: Indexing Arbitrary Probability Distributions," pp. 946-955, Proceedings of the 23rd International Conference on Data Engineering (ICDE), Apr. 2007 (preprint 10 pages).

Ljosa et al., "Top-k Spatial Joins of Probabilistic Objects," pp. 566-575, ICDE, Proceedings of the 2008 IEEE 24th International Conference on Data Engineering, Apr. 2008 (corrected print 10 pages).

Pei et al., "Probabilistic Skylines on Uncertain Data," Very Large Data Bases, Proceedings of the 33rd international conference on Very large data bases, held in Vienna, Austria, on Sep. 23-28, 2007 (12 pages).

Re et al., "Efficient Top-k Query Evaluation on Probabilistic Data," pp. 886-895, ICDE, Proceedings of the 23rd International Conference on Data Engineering, held in Istanbul, Turkey, on Apr. 15-20, 2007 (preprint 10 pages).

Sarma et al., "Working Models for Uncertain Data," ICDE, Proceedings of the 22nd International Conference on Data Engineering, held on Apr. 3-7, 2006 (preprint 21 pages).

Sen et al., "Representing and Querying Correlated Tuples in Probabilistic Databases," pp. 596-605, ICDE, Proceedings of the 23rd International Conference on Data Engineering, held in Istanbul, Turkey, on Apr. 15-20, 2007 (preprint 10 pages).

"Relational Database," retrieved from http://en.wikipedia.org/wiki/Relational_database, on Jan. 26, 2009 (5 pages).

Singh et al., "Indexing Uncertain Categorical Data," pp. 616-625, ICDE, Proceedings of the 23rd International Conference on Data Engineering, held on Apr. 15-20, 2007 (preprint 10 pages).

(56) References Cited

OTHER PUBLICATIONS

Soliman et al., "Top-k Query Processing in Uncertain Databases," pp. 896-905, ICDE, Proceedings of the 23rd International Conference on Data Engineering, held in Istanbul, Turkey, on Apr. 15-20, 2007 (preprint 10 pages).

Soliman et al., "Probabilistic Top-k and Ranking-Aggregate Queries," Article 13, vol. 33, Issue 3, ACM Transactions on Database Systems (TODS), Aug. 2008 (54 pages).

Tao et al., "Indexing Multi-Dimensional Uncertain Data with Arbitrary Probability Density Functions," pp. 922-933, Very Large Data Bases, Proceedings of the 31st international conference on Very large data bases, held in Trondheim, Norway, 2005 (12 pages).

Xin et al., "Progressive and Selective Merge: Computing Top-K with Ad-hoc Ranking Functions," pp. 103-114, International Conference on Management of Data, Proceedings of the 2007 ACM SIGMOD international conference on Management of data, held in Beijing, China, on Jun. 11-14, 2007 (12 pages).

Yi et al., "Efficient Processing of Top-k Queries in Uncertain Databases with x-Relations," vol. 21, Issue 1, IEEE Transactions on Knowledge and Data Engineering, Jan. 2009 (14 pages).

Zhang et al., "Finding Frequent Items in Probabilistic Data," pp. 819-832, International Conference on Management of Data, Proceedings of the 2008 ACM SIGMOD international conference on Management of data, held in Vancouver, Canada, on Jun. 9-12, 2008 (13 pages).

Zhang et al., "On the Semantics and Evaluation of Top-k Queries in Probabilistic Databases," ICDEW, Proceedings of the 24th International Conference on Data Engineering Workshop, held on Apr. 7-12, 2008 (15 pages).

Lian et al., "Monochromatic and Bichromatic Reverse Skyline Search over Uncertain Databases," pp. 213-226, International Conference on Management of Data, Proceedings of the 2008 ACM SIGMOD international conference on Management of data, held in Vancouver, Canada, on Jun. 9-12, 2008 (14 pages).

Cormode et al., "Semantics of Ranking Queries for Probabilistic Data and Expected Ranks," in the ICDE '09 Proceedings of the 2009 IEEE International Conference on Data Engineering, 2009 (pre-publication version, 12 pages).

\* cited by examiner

500 ─┐ 505 ─┐ ┌─ 510

| tuples | score |
|---|---|
| $t_1$ | $\{(100, 0.4), (70, 0.6)\}$ |
| $t_2$ | $\{(92, 0.6), (80, 0.4)\}$ |
| $t_3$ | $\{(85, 1)\}$ |

515 ─┐ ┌─ 520

| world $W$ | $\Pr[W]$ |
|---|---|
| $\{t_1 = 100, t_2 = 92, t_3 = 85\}$ | $0.4 \times 0.6 \times 1 = 0.24$ |
| $\{t_1 = 100, t_3 = 85, t_2 = 80\}$ | $0.4 \times 0.4 \times 1 = 0.16$ |
| $\{t_2 = 92, t_3 = 85, t_1 = 70\}$ | $0.6 \times 0.6 \times 1 = 0.36$ |
| $\{t_3 = 85, t_2 = 80, t_1 = 70\}$ | $0.6 \times 0.4 \times 1 = 0.24$ |

| tuples | score | $p(t)$ |
|---|---|---|
| $t_1$ | 100 | 0.4 |
| $t_2$ | 92 | 0.5 |
| $t_3$ | 80 | 1 |
| $t_4$ | 70 | 0.5 |

┌─ 620

| rules | |
|---|---|
| $\tau_1$ | $\{t_1\}$ |
| $\tau_2$ | $\{t_2, t_4\}$ |
| $\tau_3$ | $\{t_3\}$ |

625 ─┐ ┌─ 630

| world $W$ | $\Pr[W]$ |
|---|---|
| $\{t_1, t_2, t_3\}$ | $p(t_1)p(t_2)p(t_3) = 0.2$ |
| $\{t_1, t_3, t_4\}$ | $p(t_1)p(t_3)p(t_4) = 0.2$ |
| $\{t_2, t_3\}$ | $(1-p(t_1))p(t_2)p(t_3) = 0.3$ |
| $\{t_3, t_4\}$ | $(1-p(t_1))p(t_3)p(t_4) = 0.3$ |

FIG. 6

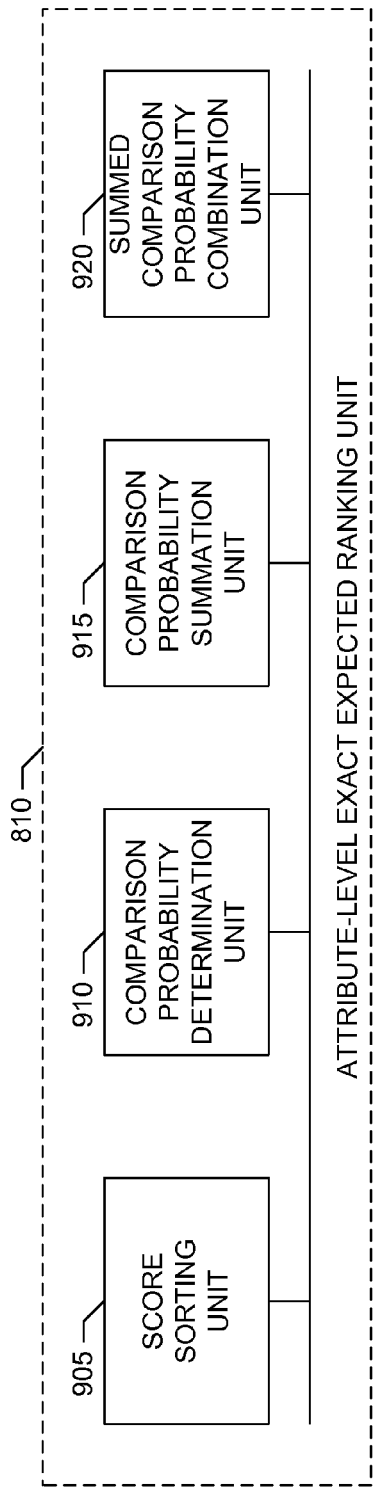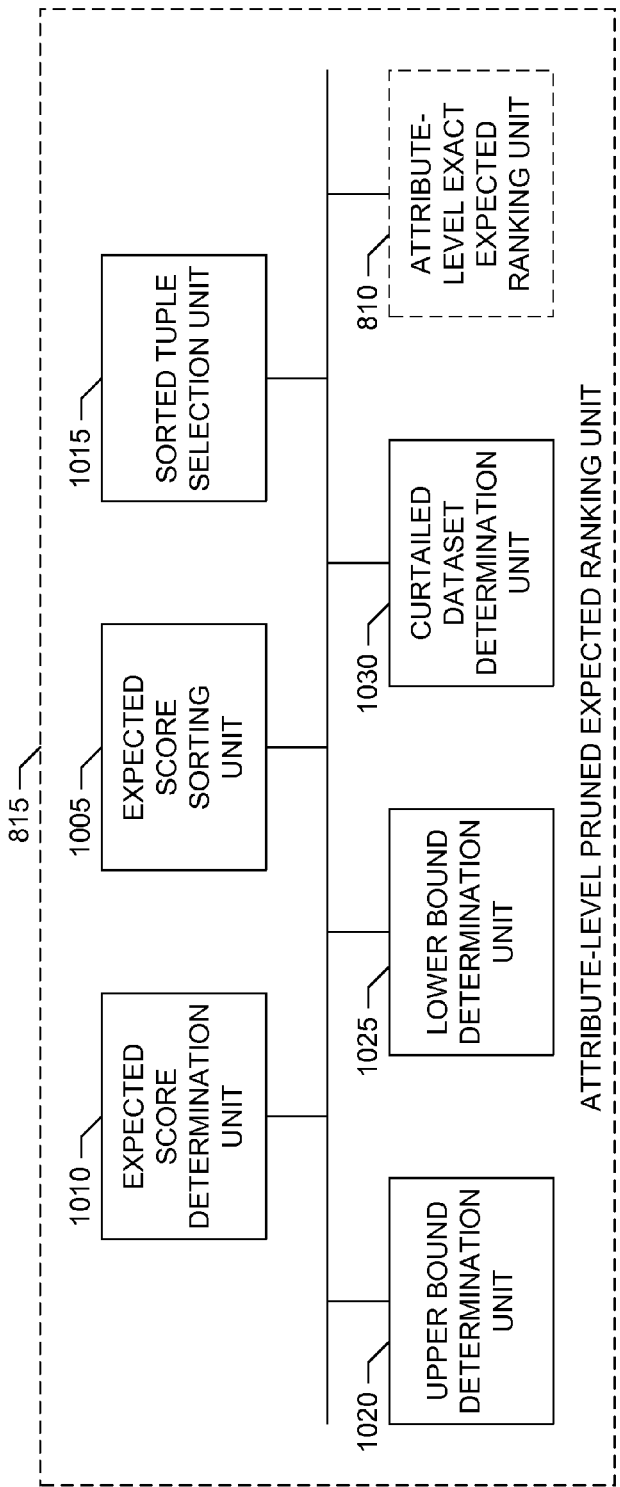

METHODS AND APPARATUS FOR RANKING UNCERTAIN DATA IN A PROBABILISTIC DATABASE

FIELD OF THE DISCLOSURE

This disclosure relates generally to database processing and, more particularly, to methods and apparatus for ranking uncertain data in a probabilistic database.

BACKGROUND

In many data processing and analysis applications, especially those involving large amounts of data, top-k ranking queries are often used to obtain only the k most relevant data tuples for inspection, with relevance represented as a score based on a scoring function. There are many existing techniques for answering such ranking queries in the context of deterministic relational databases in which each data tuple is an ordered sequence of deterministic attribute values. A typical deterministic relational database employs a deterministic relation to encode a set of tuples each having the same attributes to yield a single data set instantiation, with each tuple representing a particular deterministic occurrence of an ordered sequence of the attribute values. A top-k query of such a deterministic relational database returns the k tuples having the top scores in the single data set instantiation based on a specified scoring function that evaluates the ordered sequence of attribute values to determine a single score for each tuple.

A probabilistic database uses an uncertainty relation to encode the set of tuples into multiple possible non-deterministic data set instantiations due to the randomness associated with each tuple. Accordingly, each tuple may exhibit different scores having respective different likelihoods for some or all of the different possible non-deterministic data set instantiation realized by the uncertainty relation. Because each tuple can be associated with multiple different scores having respective different likelihoods, conventional top-k query techniques that rank tuples assuming a single score per tuple are generally not applicable in a probabilistic database setting.

BRIEF DESCRIPTION OF THE DRAWINGS

FIG. 5 illustrates a second example attribute-level uncertainty relation and a corresponding example group of uncertain data set instantiations that may be used by the example probabilistic database of FIGS. 1 and/or 2 to store uncertain data.

FIG. 6 illustrates a second example tuple-level uncertainty relation and a corresponding example group of uncertain data set instantiations that may be used by the example probabilistic database of FIGS. 1 and/or 2 to store uncertain data.

FIG. 9 illustrates an example attribute-level exact expected ranking unit that may be used to implement the second example expected ranking unit implementation of FIG. 8.

FIG. 10 illustrates an example attribute-level pruned expected ranking unit that may be used to implement the second example expected ranking unit implementation of FIG. 8.

DETAILED DESCRIPTION

Figure 1:
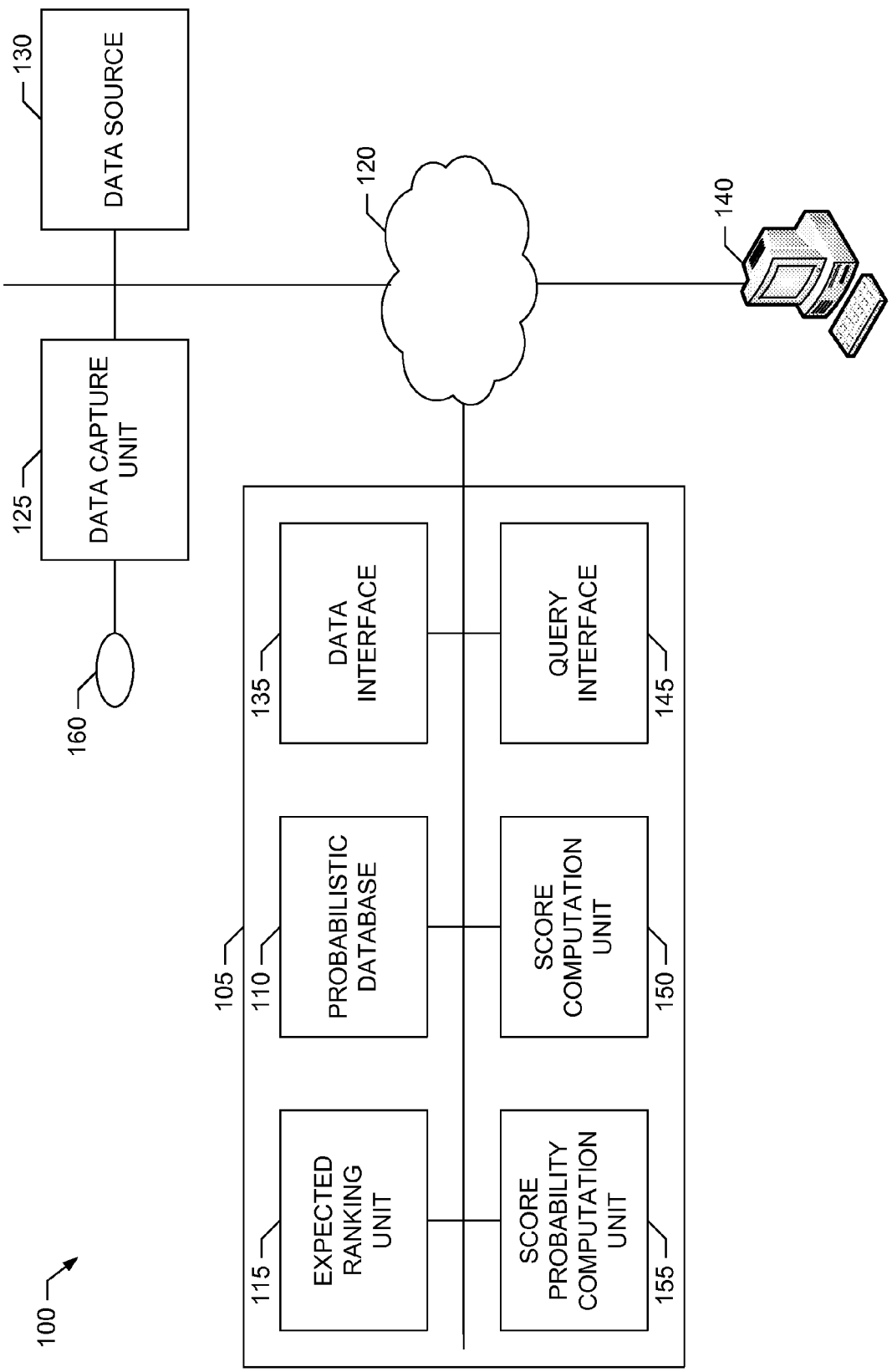
FIG. 1 is block diagram of an example environment of use for an example probabilistic database server implementing an example probabilistic database and an example expected ranking unit according to the methods and/or apparatus described herein.

Methods and apparatus for ranking uncertain (e.g., non-deterministic) data in a probabilistic database are disclosed herein. An example ranking technique described herein to rank data stored in a probabilistic database implemented by a database server uses a set of data tuples representing multiple possible data set instantiations to store the uncertain (e.g., non-deterministic) data in the probabilistic database. In the example ranking technique, each data tuple stored in the probabilistic database is capable of being realized by the database server into one of a set of possible data tuple instantiations through use of an uncertainty relation. Additionally, each possible data set instantiation is capable of being realized by the database server through use of the uncertainty relation to select particular data tuple instantiations of at least some of the data tuples in the set of data tuples for inclusion in the possible data set instantiation. Furthermore, each possible data set instantiation is associated with a respective instantiation probability representing the likelihood that the respective possible data set instantiation occurs among the entire set of possible data set instantiations.

The example ranking technique also determines an expected rank, or an approximate expected rank, for at least some of the data tuples. For example, in response to a top-k query, expected ranks may be determined for only a sufficient number of data tuples needed to determine the k data tuples having the top score. In contrast with conventional ranking of deterministic data in which each data tuple has a single rank associated with the single deterministic data set instantiation, the expected rank for a particular uncertain (e.g., non-deterministic) data tuple represents a combination of component rankings of the particular data tuple in each of the possible non-deterministic data set instantiations. Additionally, each such component ranking is weighted by the respective instantiation probability associated with the possible non-deterministic data set instantiation from which the component ranking of the particular data tuple is determined. In other words, each component ranking of a data tuple is weighted by the likelihood that the data tuple will actually have the component ranking when a particular one of the possible non-deterministic data set instantiations is realized.

The methods and apparatus described herein to determine expected ranks for data tuples stored in a probabilistic database can be tailored to take advantage of the uncertainty relation used by the probabilistic database to store and process the data tuples. For example, as discussed in greater detail below, the ranking techniques described herein can be tailored to determine expected ranks in conjunction with probabilistic databases employing an attribute-level uncertainty relation that associates sets of scores and respective score probabilities with each data tuple and then realizes a possible non-deterministic data set instantiation by selecting a score for each data tuple according to its score probability. Additionally or alternatively, the ranking techniques described herein can be tailored to determine expected ranks in conjunction with probabilistic databases employing a tuple-level uncertainty relation that associates each data tuple with a score and a score probability and then realizes a possible non-deterministic data set instantiation by determining whether to include each data tuple in the data set instantiation based on its score probability and a set of exclusion rules. Furthermore, pruning techniques are described that can potentially reduce the number of data tuples that need to be accessed to determine expected ranks in response to top-k queries.

As discussed above, in the context of deterministic databases, top-k ranking queries are often used to obtain only the k top data tuples for inspection. It can be argued that providing top-k queries in probabilistic databases may be even more important than in deterministic databases because the uncertainty relation can encode and realize many possible non-deterministic data set instantiations (also referred to herein as possible "worlds"), instead of only the single data set instantiation associated with the deterministic database. While there have been some attempts to implement ranking queries for probabilistic databases, most (if not all) of the existing techniques lack at least some of the intuitive properties of a top-k query over deterministic data. For example, as described below, top-k ranking queries for deterministic databases storing deterministic data exhibit the properties of exact-k (or exactness), containment, unique-rank, value-invariance and stability. In contrast, most (if not all) of the existing techniques for implementing top-k ranking queries for probabilistic databases fail to satisfy at least one of these properties. However, unlike the existing techniques, top-k queries for probabilistic databases based on the expected ranks determined by the example ranking techniques described herein do satisfy all of the properties of exact-k, containment, unique-rank, value-invariance and stability, as described in greater detail below.

Additionally, at least some example implementations of the ranking techniques described herein are adapted to determine expected ranks and process associated top-k queries efficiently for various models of uncertain (e.g., non-deterministic) data, such as the attribute-level and tuple-level uncertainty models. For example, for an uncertainty relation used to store N data tuples in a probabilistic data base, the processing cost for at least some of the example implementation described herein is shown to be on the order of N log N operations (denoted "O(N log N)"), which is on a par with simply sorting the data tuples. In contrast, existing attempts to implement ranking queries for probabilistic databases typically require a higher processing cost, typically on the order of $O(N^2)$ operations. Furthermore, in scenarios where there is a high cost for generating or accessing each data tuple, pruning techniques based on probabilistic tail bounds are described that allow early termination of the expected ranking procedure and still guarantee that the top-k data tuples have been found.

Turning to the figures, a block diagram of an example environment of use 100 for an example probabilistic database server 105 implementing an example probabilistic database 110 and an example expected ranking unit 115 according to the methods and/or apparatus described herein is illustrated in FIG. 1. The example environment of use 100 also includes a data network 120 configured to interconnect one or more example data capture units 125 and/or one or more example data sources 130 with the example probabilistic database server 105. In the illustrated example, the data capture unit(s) 125 and/or the data source(s) 130 provide uncertain data to the probabilistic database server 105 via a data interface 135 for storage in the probabilistic database 1 10. The example expected ranking unit 115 operates to rank the uncertain data stored in the probabilistic database 105 in response to one or more queries, such as a top-k ranking query, received form an example interface terminal 140 via a query interface 145. Although the example environment of use 100 depicted in FIG. 1 illustrates the example probabilistic database server 105, the example data capture unit(s) 125, the example data source(s) 130 and the example interface terminal 140 as being separate devices interconnected by the example data network 120, the example methods and apparatus described herein may be used in many alternative environments in which uncertain data is to be ranked.

The example data network 120 included in the example environment of use 100 may be implemented by any type of data networking technology. For example, the data network 120 may be implemented by a local area network (LAN), a wide area network (WAN), a wireless LAN and/or WAN, a cellular network, the Internet, etc., and/or any combination thereof. Additionally, the example interface terminal 140 may be implemented by any type of terminal device, such as a personal computer, a workstation, a PDA, a mobile telephone, etc. In the illustrated example, the interface terminal 140 is configured to allow a user to formulate a query, such as a top-k ranking query, for receipt via the query interface 145 of the probabilistic database server 105 using any type of database query language, technique, topology, etc. In the case of a top-k or similar ranking query, the example interface terminal 140 is also configured to allow a user to specify one of multiple techniques for determining the ranking, at least in some example implementations. Additionally, the example interface terminal 140 is configured to display or otherwise present the query results, such as the top-k rankings, returned from via the query interface 145 from the probabilistic database server 105. Although the interface terminal 140 is shown as being connected to the probabilistic database server 105 via the data network 120 in the illustrated example, the interface terminal 140 alternatively could be integrated with the probabilistic database server 105.

Top-k ranking queries are a useful tool for focusing attention on data that is likely to be most relevant to a particular query. To support such rankings, data tuples stored in the example probabilititstic database 110 are associated with one or more scores determined by an example score computation unit 150, usually using one or more scoring functions. In an example implementation, the score computation unit 150 determines one or more scores for each data tuple based on a pre-defined scoring function. In another example implementation, the score computation unit 150 additionally or alternatively determines one or more scores for each data tuple based on a user-defined scoring function specified via the example interface terminal 140. For example, the example interface terminal 140 could be used to specify a query-dependent scoring function in a k-nearest-neighbor query of the example probabilistic database 110 which has been configured to store spatial information. In such an example, the score can be specified to be the distance of a data point to a query point. When the data points each correspond to multiple uncertain (e.g., noisy) measurements, the scores (e.g., distances) determined by the scoring function can be modeled as random variables and stored in the example probabilistic database 110 using an uncertainty model, as described in greater detail below. As another example, if the probabilistic database 110 stores data tuples each having multiple uncertain attributes on which a ranking query is to be performed, the user typically can specify a scoring function via the example interface terminal 140 that combines the multiple attributes to produce scores for use in ranking the tuples.

Additionally, the one or more scores determined by the example score computation unit 150 are each associated with a respective score probability determined by an example score probability computation unit 155. In response to a top-k ranking query received via the example query interface 145, the example expected ranking unit 115 returns the top-k (or k top ranked) data tuples from the example probabilistic database 110 based on the score and score probabilities determined by the example score computation unit 150 and the example score probability computation unit 155 for each of the stored data tuples. Example of scores and respective score probabilities that can be determined by the example score computation unit 150 and the example score probability computation unit 155, as well as the resulting rankings determined by the example expected ranking unit 115, are described in greater detail below.

In the example environment of use 100, potentially massive quantities of data may need to be stored in the example probabilistic database 110, which is why determining an ordering, or ranking, based on score is beneficial. However, an additional challenge in the example environment of use 100 is that the data is also inherently fuzzy or uncertain. For example, the data provided by the data source(s) 130 may correspond to multimedia and/or unstructured web data that has undergone data integration and/or schema mapping. Such data may be stored in the example probabilistic database 110 as data tuples each associated with one or more scores and respective score probabilities (e.g., such as confidence factors), with the scores and score probabilities reflecting how well the data tuples matched other data from other example data sources 130. As another example, an example data capture unit 125 may provide measurement data, such as sensor readings obtained from a example sensor 160, measured distances to a query point, etc. Such data is often inherently noisy, and is can be represented in the example probabilistic database 110 by a probability distribution rather than a single deterministic value. More broadly, any type of data source 130, data capture unit 125 and/or sensor 160 can provide the uncertain data to be stored in the example probabilistic database 110

As discussed in greater detail below, the example probabilistic database 110 is capable of representing a potentially large number of possible realizations, or non-deterministic data set instantiations, of the stored probabilistic data. This can result in a correspondingly large, and even exponential, increase relative to conventional deterministic relational databases in the size of the relation used to represent the stored data. Accordingly, it can be a challenge to extend the familiar semantics of the top-k queries to the probabilistic database setting, and to answer such queries efficiently.

For example, in deterministic database settings having deterministic (e.g., certain) data each with a single score value, there is a clear total ordering based on score from which a top-k ranking can be determined. This is readily apparent by analogy with the many occurrences of top-k lists in daily life, such as movies ranked by box-office receipts, athletes ranked by race times, researchers ranked by number of publications (or other metrics), etc. However, with uncertain data stored in the example probabilistic database 110, there are two distinct orders to address: ordering by score and ordering by probability. The example expected ranking unit 115 operates to combine scores and score probabilities to order, or rank, the probabilistic data stored in the example probabilistic database 110 in a manner that satisfies the properties of exact-k, containment, unique ranking, value invariance and stability exhibited by ranking queries on deterministic data. More specifically, the exact-k (or exactness) property provides that the top-k list should contain exactly k items. The containment property provides that the top-(k+1) list should contain all items in the top-k. The unique-ranking property provides that within the top-k, each reported item should be assigned exactly one position, and that the same item should not be listed multiple times within the top-k. The value-invariance property provides that scores determine the relative relevance of the tuples and that changing the absolute value of a score without causing a reordering of the score relative to other scores should not change the top-k. The stability property provides that making an item in the top-k list more likely or more important should not remove it from the list.

The preceding properties are clearly satisfied for rankings of deterministic (e.g., certain) data, and capture intuitively how a ranking query should behave. It is desirable for rankings of probabilistic (e.g., uncertain) data stored in the example probabilistic database 110 to also exhibit these same properties. However, as discussed in greater detail below, most, if not all, of the existing techniques for implementing ranking queries for probabilistic data fail to satisfy at least one of these properties. In contrast, the example expected ranking unit 115 implements an expected ranking of probabilistic (e.g., uncertain) data stored in the example probabilistic database 110 that does exhibit all of these properties, at least for the example uncertainty models described below. Furthermore, the ability to satisfy the properties does not come at a price of higher computational costs. On the contrary, its is possible to construct efficient O(N log N) implementations to determine exactly the expected ranking of data represented using both the attribute-level uncertainty model and the tuple-level uncertainty model, whereas many of the existing techniques require $O(N^2)$ operations to determine exact rankings.

While an example manner of implementing the example probabilistic database server 105 included in the example environment of use 100 has been illustrated in FIG. 1, one or more of the elements, processes and/or devices illustrated in FIG. 1 may be combined, divided, re-arranged, omitted, eliminated and/or implemented in any other way. Further, the example probabilistic database 110, the example expected ranking unit 115, the example data interface 135, the example query interface 145, the example score computation unit 150, the example score probability computation unit 155 and/or, more generally, the example probabilistic database server 105 of FIG. 1 may be implemented by hardware, software, firmware and/or any combination of hardware, software and/or firmware. Thus, for example, any of the example probabilistic database 110, the example expected ranking unit 115, the example data interface 135, the example query interface 145, the example score computation unit 150, the example score probability computation unit 155 and/or, more generally, the example probabilistic database server 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example probabilistic database server 105, the example probabilistic database 110, the example expected ranking unit 115, the example data interface 135, the example query interface 145, the example score computation unit 150 and/or the example score probability computation unit 155 are hereby expressly defined to include a tangible medium such as a memory, digital versatile disk (DVD), compact disk (CD), etc., storing such software and/or firmware. Further still, the example probabilistic database server 105 of FIG. 1 may include one or more elements, processes and/or devices in addition to, or instead of, those illustrated in FIG. 1, and/or may include more than one of any or all of the illustrated elements, processes and devices.

Figures 2, 3, 4:
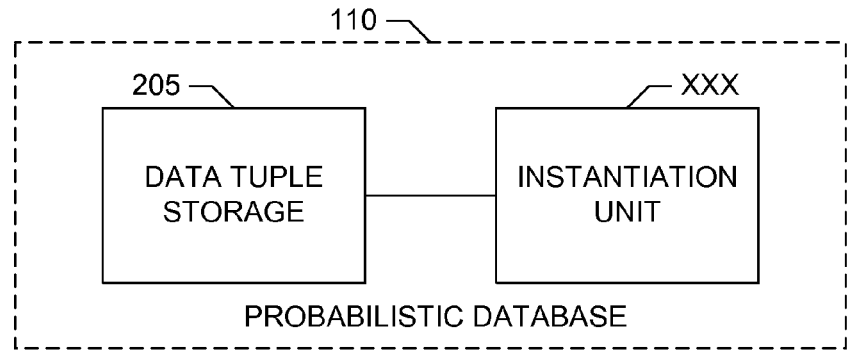
FIG. 2 is a block diagram of an example probabilistic database that may be implemented by the example probabilistic database server of FIG. 1.
FIG. 3 illustrates a first example attribute-level uncertainty relation that may be used by the example probabilistic database of FIGS. 1 and/or 2 to store uncertain data.
FIG. 4 illustrates a first example tuple-level uncertainty relation that may be used by the example probabilistic database of FIGS. 1 and/or 2 to store uncertain data.

A block diagram of an example implementation of the probabilistic database 110 that may be implemented by the example probabilistic database server 105 of FIG. 1 is illustrated in FIG. 2. The example probabilistic database 110 of FIG. 2 includes example data tuple storage 205 to store data tuples representing uncertain data obtained from any number of sources, such as the example data source(s) 130 and/or the example data capture unit(s) 125 of FIG. 1. The example data tuple storage 205 may be implemented by any type of data storage unit, memory, etc. The example probabilistic database 110 of FIG. 2 also includes an instantiation unit 210 capable of realizing possible data set instantiations using the data tuples stored in the example data tuple storage 205. For example, each data set instantiation realized by the example instantiation unit 210 may represent a different possible outcome of the uncertain data represented by the data tuples stored in the example data tuple storage 205.

Many models for representing uncertain data have been presented in the literature. Each model utilizes probability distributions to map the data tuples representing the uncertain data to possible worlds, with each world corresponding to a single data set instantiation. One approach is to expressly store each possible world and its associated probability in the example data tuple storage 205. Such an approach is referred to as complete, because it can capture all possible outcomes and correlations among the uncertain data. However, complete models are very costly to describe and manipulate because there can be many combinations of data tuples each generating a distinct possible world.

Typically, it is possible to make certain independence assumptions concerning the uncertain data. For example, it is often assumed that unless correlations are expressly described, events are considered to be independent. Consequently, possible data set instantiations can be represented more compactly, with instantiation probabilities (e.g., likelihoods) computed using straight-forward probability calculations (e.g., such as multiplication of probabilities of independent events). A strong independence assumption leads to a basic model for storing data tuples in the example data tuple storage 205 in which each tuple has an associated probability of occurrence, and all tuples are assumed fully independent of each other. This is typically too strong an assumption, and so intermediate models allow for descriptions of simple correlations among tuples. Such descriptions extend the expressiveness of the models, while keeping probability computations tractable. Two such models for storing data tuples in the example data tuple storage 205 are the attribute-level uncertainty model and the tuple-level uncertainty model. Without loss of generality, in the following discussion the example probabilistic database 110 is assumed to employ only one uncertainty relation for use by the instantiation unit 210 to realize possible data set instantiations using the data tuples stored in the example data tuple storage 205.

In the attribute-level uncertainty model, the example probabilistic database 110 stores uncertain data as a table of N data tuples in the example data tuple storage 205. Each tuple includes one attribute whose value is uncertain, as well as potentially other attributes that are deterministic. The uncertain attribute has a discrete probability density function (pdf) describing its value distribution. Alternatively, the uncertain attribute could have a continuous pdf (e.g., such as a Gaussian pdf) describing its value distribution. In the latter case, the continuous pdf is converted to a discrete pdf having an appropriate level of granularity using, for example, a histogram.

When realizing a possible data set instantiation using attribute-level uncertain model, the example instantiation unit 210 selects a value for each tuple's uncertain attribute based on the associated discrete pdf, with the selection being independent among tuples. The attribute-level uncertainty model has many practical applications, such as sensor readings, spatial objects with fuzzy locations, etc. Additionally, conventional relational databases can be adapted to store uncertain data according to the attribute-level uncertainty.

For the purpose of processing ranking queries, it is assumed that the uncertain attribute represents the score for the tuple, and that the query requests a ranking based on this score attribute (otherwise, the ranking would be based on a single deterministic score for the tuple and conventional deterministic ranking techniques could be used). For example, let $X_i$ be a random variable denoting a score of a tuple $t_i$ in the set of data tuples stored in the example probabilistic database 110. It is assumed that $X_i$ is characterized by a discrete pdf with bounded size, which is a realistic assumption for many practical applications, such as movie ratings, and string matching, etc. The general, continuous pdf case is discussed below. Ranking of the data tuples $t_i$ according to score the becomes equivalent to ranking the set of independent random variables $X_1, \ldots, X_N$.

An example of an uncertainty relation 300 for storing data in the example data tuple storage 205 according to an attribute-level uncertainty model is illustrated in FIG. 3. In the example uncertainty relation 300, data tuples 305 are stored in a tabular format, with each data tuple 305 (denoted $t_i$) associated with a respective set of possible pairs 310 of scores (denoted $v_{i,j}$) and score probabilities (denoted $p_{i,j}$), for $1 \leq j \leq s_i$, the number of scores associated with the particular tuple $t_i$. In the illustrated example, the scores $v_{i,j}$ for each tuple $t_i$ represent the possible values of the random variable $X_i$ representing the score of the tuple $t_i$. The score probabilities $p_{i,j}$ for each tuple represent the discrete pdf characterizing the distribution of the scores $v_{i,j}$ for the tuple $t_i$. As such, a possible instantiation of the data tuple $t_i$ corresponds to a particular score $v_{i,j}$ and respective score probability $p_{i,j}$ for the particular tuple $t_i$.

In the tuple-level uncertainty model, the attributes of each tuple are fixed, but the entire tuple may or may not appear in a possible data set instantiation. In a basic tuple-level uncertainty model, each tuple t appears with probability p(t) independently. In more complex tuple-level uncertainty models, there are dependencies among the tuples, which can be specified by a set of exclusion rules, where each data tuple appears in a single exclusion rule τ and each tuple appears in at most one rule. In the examples that follow, an exclusion rule including a group of more than one data tuple is used to specify that only one tuple from the group may be selected for inclusion in a possible data set instantiation. Accordingly, the total probability for all tuples in one rule must be less or equal than one, so that selection can be interpreted as governed by a probability distribution. The tuple-level uncertainty model is useful in applications where it is important to capture the correlations between tuples.

An example of an uncertainty relation 400 for storing data in the example data tuple storage 205 according to a tuple-level uncertainty model is illustrated in FIG. 4. The example uncertainty relation 400 has N data tuples 405 (denoted $t_i$) stored in a tabular format with associated scores 410 (denoted $v_i$) and score probabilities 415 (denoted $p(t_i)$). The score probability $p(t_i)$ for each tuple $t_i$ represents how likely the tuple is selected by the example instantiation unit 210 for inclusion in a particular data set instantiation. The example uncertainty relation 400 also has M rules 420 (denoted $\tau_k$). As described above, each data tuple appears in a single exclusion rule, each tuple appears in at most one rule and an exclusion rule including a group of data tuples is used to specify that only one tuple from the group may selected for inclusion in a possible data set instantiation. As such, a possible instantiation of the tuple $t_i$ corresponds to selecting the tuple $t_i$ with score $v_i$ for inclusion in a possible data set instantiation based on the respective score probability $p(t_i)$ for the particular tuple $t_i$ and the exclusion rule that includes $t_i$. For example, the second rule $\tau_2$ in the example uncertainty relation 400 specifies that tuples $t_2$ and $t_4$ cannot appear together in any possible data set instantiation realized by the example instantiation unit 210. The second the second rule $\tau_2$ also specifies an implicit constraint that $p(t_2)+p(t_4) \leq 1$.

As mentioned above, the example instantiation unit 210 utilizes the uncertainty relation (denoted as D herein) to realize possible data set instantiations corresponding to possible worlds from the data tuples stored in the example data tuple storage 205. In the attribute-level uncertainty model, the example instantiation unit 210 uses the uncertainty relation to instantiate a possible world by selecting a data tuple instantiation for each data tuple. For example, the instantiation unit 210 uses the uncertainty relation to select one value independently for each tuple's uncertain score attribute according to the score probabilities defining the distribution of scores for the tuple. For example, denote a possible data set instantiation corresponding to a possible world as W, and the selected value for $t_i$'s uncertain score attribute in W as $w_{t_i}$. In the attribute-level uncertainty model, a data set instantiation probability representing how likely W is to occur is given by Equation 1, which is:

$$Pr[W] = \prod_{j=1}^{N} p_{j,x}, \qquad \text{Equation 1}$$

where x satisfies $v_{j,x} = w_{t_j}$. In other words, the data set instantiation probability representing how likely W occurs is determined by multiplying the individual score probabilities associated with particular score selected by the example instantiation unit 210 for each tuple. Because every tuple appears in every possible data set instantiation, the size of every possible data set instantiation in the attribute-level uncertainty model is N, the number of data tuples stored in the example data tuple storage 205. In other words, for all $W \in S$, $|W|=N$ where S is the space of all possible worlds.

A particular example of using an attribute-level uncertainty relation to realize a set of possible data set instantiations corresponding to a set of possible worlds is illustrated in FIG. 5. In the illustrated example of FIG. 5, an example uncertainty relation 500 is used to store three data tuples 505 and associated sets of score and score probability pairs 510 in the example data tuple storage 205. The example uncertainty relation 500 is used by the example instantiation unit 210 to realize a set of possible data set instantiations 515 associated with a respective set of instantiation probabilities 520. As illustrated in FIG. 5, each instantiation probability is determined by multiplying the score probabilities associated with the score values selected for each of the data tuples in the respective data set instantiation.

In the tuple-level uncertainty model, the example instantiation unit 210 uses the uncertainty relation D to instantiate a possible world by selecting data tuples for inclusion in the data set instantiation corresponding to the possible world, with selection based on the set of exclusion rules and the score probability associated with each selected tuple. In other words, the example instantiation unit 210 instantiates a possible world by selected data tuple instantiations for at least some of the set of data tuples, where a data tuple instantiation corresponds to selecting the data tuple with its associated score for inclusion in the possible world. Accordingly, a possible world W from the set of all possible worlds S is a subset of tuples stored in the example data tuple storage 205 selected according to the uncertainty relation D. The instantiation probability representing the likelihood a possible world W occurring is given by Equation 2, which is:

$$Pr[W] = \prod_{j=1}^{M} p_W(\tau_j), \qquad \text{Equation 2}$$

where for any exclusion rule τ∈D, $p_W(\tau)$ is defined by Equation 3, which is $$p_W(\tau) = \begin{cases} p(t), & \tau \cap W = \{t\}; \\ 1 - \sum_{t_i \in \tau} p(t_i), & \tau \cap W = \emptyset; \\ 0, & \text{otherwise.} \end{cases} \quad \text{Equation 3}$$

In other words, $p_W(\tau)$ denotes the contribution to the instantiation probability made by the particular exclusion rule τ. A notable difference for the tuple-level uncertain model relative to the attribute-level uncertainty model is that not all data tuples appear in every possible data set instantiation. Therefore, the size of a possible world can range from 0 to N, the total number of data tuples stored in the example data tuple storage 205.

A particular example of using a tuple-level uncertainty relation to realize a set of possible data set instantiations corresponding to a set of possible worlds is illustrated in FIG. 6. In the illustrated example of FIG. 6, an example uncertainty relation 600 is used to store four data tuples 605 and associated scores 610 and score probabilities 615 in the example data tuple storage 205. The example uncertainty relation 600 is also used to specify a set of three exclusion rules 620. The example exclusion rules 620 specify that tuple $t_1$ can be selected for inclusion in any possible data set instantiation according to its score probability, tuple $t_3$ can be selected for inclusion in any possible data set instantiation according to its score probability, and tuples $t_2$ and $t_4$ cannot both be selected for inclusion in the same data set instantiation. The example uncertainty relation 600 is used by the example instantiation unit 210 to realize a set of possible data set instantiations 625 associated with a respective set of instantiation probabilities 630. As illustrated in FIG. 6, each instantiation probability is determined by multiplying the contributions $p_W(\tau)$ to the instantiation probability made by each particular exclusion rule τ, with the contribution $p_W(\tau)$ for a particular rule τ determined according to Equation 3.

Both the attribute-level and tuple-level uncertainty data models provide succinct descriptions of a distribution of data set instantiations over a set of possible worlds S. Each possible world W corresponds to a fixed realization of the set of data tuples stored in the example probabilistic database 110. As described below, the example expected ranking unit 110 operates to combine ranking results from all the possible worlds into a meaningful overall ranking without expressly realizing the many (possible exponentially many) possible worlds.

While an example manner of implementing the probabilistic database 110 of FIG. 1 has been illustrated in FIG. 2, one or more of the elements, processes and/or devices illustrated in FIG. 2 may be combined, divided, re-arranged, omitted, eliminated and/or implemented in any other way. Further, the example data tuple storage 205, the example instantiation unit 210 and/or, more generally, the example probabilistic database 110 of FIG. 2 may be implemented by hardware, software, firmware and/or any combination of hardware, software and/or firmware. Thus, for example, any of the example data tuple storage 205, the example instantiation unit 210 and/or, more generally, the example probabilistic database 110 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example probabilistic database 110, the example data tuple storage 205 and/or the example instantiation unit 210 are hereby expressly defined to include a tangible medium such as a memory, digital versatile disk (DVD), compact disk (CD), etc., storing such software and/or firmware. Further still, the example probabilistic database 110 of FIG. 2 may include one or more elements, processes and/or devices in addition to, or instead of, those illustrated in FIG. 2, and/or may include more than one of any or all of the illustrated elements, processes and devices.

Figure 7:
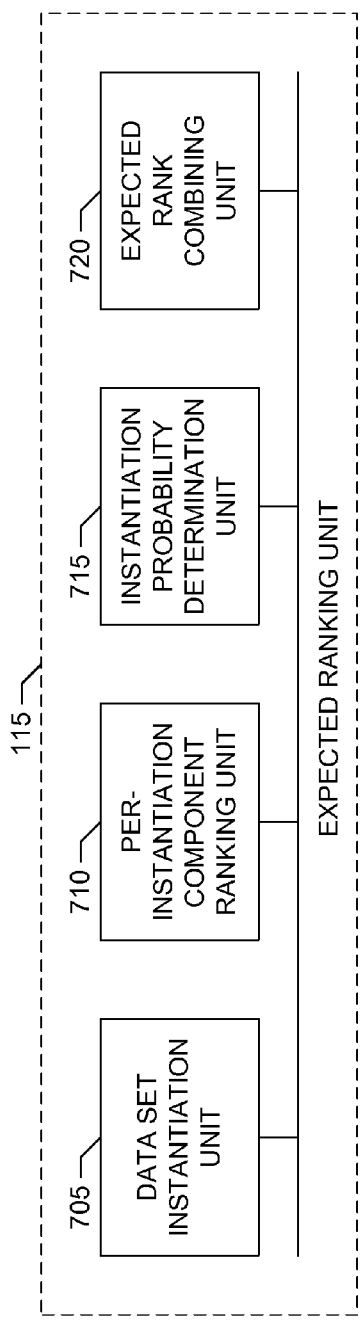
FIG. 7 illustrates a first example implementation of the example expected ranking unit of FIG. 1.

A first example implementation of the expected ranking unit 115 of FIG. 1 is illustrated in FIG. 7. Before proceeding with a description of FIG. 7, several desirable properties of a ranking of uncertain data stored in the example probabilistic database 110 are described. Additionally, it is shown how various existing techniques that could be used for ranking uncertain data stored in the example probabilistic database 110 each fail to satisfy all of these desirable ranking properties. Subsequently, a description of the first example implementation of the expected ranking unit 115 is provided, including a discussion of how the expected ranking unit 115 satisfies all of the following desirable ranking properties.

As mentioned above, the desirable properties of a ranking of uncertain data stored in the example probabilistic database 110 include the properties of exact-k, containment, unique ranking, value invariance and stability exhibited by ranking queries on deterministic data. Taking each of these desirable ranking properties in turn, the exact-k property provides that the top-k list should contain exactly k items. Mathematically, the exact-k property provides that, given $R_k$ as the set of tuples in the top-k query result, if the number of tuples stored according to the uncertainty relation D is at least k (i.e., if $|D| \geq k$), then the size of the set of tuples in the top-k query result, $R_k$, is $|R_k|=k$.

The containment property provides that the top (k+1) list should contain all items in the top-k. In other words, the containment property captures the intuition that if an item is in the top-k, it should be in the top-k' for any k'>k. Equivalently, the choice of k can be viewed as a slider that chooses how many results are to be returned to the user, and changing k should only change the number of results returned, not the underlying set of results. Mathematically, the containment property provides that, for any k, $R_k \subset R_{k+1}$. Replacing "⊂" with "⊆" yields the weak containment property.

The unique-ranking property provides that within the top-k, each reported item should be assigned exactly one position, and that the same item should not be listed multiple times within the top-k. In other words, the rank assigned to each tuple in the top-k list should be unique. Mathematically, the unique-ranking property provides that, given $r_k(i)$ to be the identity of the tuple having rank i, then $\forall_{i \neq j}, r_k(i) \neq r_k(j)$.

The value-invariance property provides that scores determine only the relative behavior of the tuples and that changing the absolute value of a score without the relative ordering of the scores among the tuples should not change the top-k. In other words, the score function is assumed to yield a relative ordering, and is not an absolute measure of the value of a tuple. Mathematically, the value-invariance property is described as follows. Let D denote the uncertainty relation which includes score values $v_1 \leq v_2 \leq \ldots$. Let $s_i'$ be any set of score values satisfying $v_1' \leq v_2' \leq \ldots$, and define D' to be D with all scores $v_i$ replaced with $v_i'$. The value invariance property provides that $R_k(D)=R_k(D')$ for any k. For example, consider the example uncertainty relation 600 for the example tuple-level uncertainty model illustrated in FIG. 6. In the example uncertainty relation 600, the example scores 610 are 70≤80≤92≤100, The value invariance property provides that the example scores 610 could be replaced with, for example, 1≤2≤3≤1000, and the result of the ranking would still be the same The stability property provides that making an item in the top-k list more likely or more important should not remove it from the list. For the tuple-level uncertainty model, the stability property is described mathematically as, given a tuple $t_i=(v_i, p(t_i))$ from D, if we replace $t_i$ with $t_i^\uparrow=(v_i^\uparrow, p(t_i^\uparrow))$ where $v_i^\uparrow \geq v_i, p(t_i^\uparrow) \geq p(t_i)$, then $t_i \in R_k(D) \Rightarrow t_i^\uparrow \in R_k(D')$, where D' is obtained by replacing $t_i$ with $t_i^\uparrow$ in D. For the attribute-level uncertainty model, the mathematical description of the stability property remains the same but with $t_i^\uparrow$ defined as follows. Given a tuple $t_i$ whose score is a random variable $X_i$, $t_i^\uparrow$ is obtained by replacing $X_i$ with a random variable $X_i^\uparrow$ that is stochastically greater or equal than $X_i$, denoted as $X_i^\uparrow \succeq X_i$. The stability property captures the intuition that if a tuple is already in the top-k, making it probabilistically larger should not eject it from the top-k. Stability also implies that making a non-top-k tuple probabilistically smaller should not bring it into the top-k.

Given these desirable properties associated with rankings of data, some further considerations regarding how to extend ranking queries to uncertain data are now discussed. In the attribute-level model, a tuple has a random score but it always exists in any possible data set instantiation corresponding to any possible world. In other words, every tuple participates in the ranking process in all possible worlds. In contrast, in the tuple-level model, a tuple has a fixed score but it may not always appear in a possible data set instantiation corresponding to a possible world. In other words, a tuple may not participate in the ranking process in some possible worlds. Even so, a ranking of uncertainty data represented by the tuple-level uncertainty model should still aim to produce a ranking over all tuples.

Considering the tuple-level uncertainty model, a difficulty of extending ranking queries to probabilistic data is that there are now two distinct orderings present in the data, and ordering based on score, and another ordering based on probabilities. These two types of ordering should be combined in some way to determine a top-k ranking. Various existing techniques for determining top-k rankings of uncertain data, and their shortcomings with respect to the desireable ranking properties, are now described.

Because a probabilistic relation can define exponentially many possible worlds, one existing approach to determine a top-k ranking finds the most likely top-k set that has the highest support over all possible worlds. Conceptually, such most likely top-k techniques extract the top-k tuples from each possible world, and compute the support (e.g., probability) of each distinct top-k set found. The U-Top k technique, described by Mohamed A. Soliman, Ihab F. Ilyas and K. C.-C. Chang in "Top-k Query Processing in Uncertain Databases," ICDE 2007, which is incorporated herein by reference in its entirety, reports the most likely top-k as the answer to the ranking query. This technique incorporates likelihood information, and satisfies the unique ranking, value invariance, and stability ranking properties. However, the U-Top k technique may not always return k tuples when the total number of tuples stored according to the uncertainty relation D is small, thus violating the exact-k property. Furthermore, the U-Top k technique violates the containment property, and there are simple examples where the top-k can be completely disjoint from the top-(k+1). For example, consider the example attribute-level uncertainty relation 500 of FIG. 5. The top-1 result under the U-Top k definition is $t_1$, since its probability of having the highest score in a random possible world is 0.24+0.16=0.4, which is larger than that of $t_2$ or $t_3$. However, the top-2 result is $(t_2,t_3)$ with a probability of being the top-2 of 0.36, which is larger than that of $(t_1,t_2)$ or $(t_1,t_3)$. Thus, the U-Top k technique determines a top-2 ranking that is completely disjoint from the top-1 ranking. Similarly one can verify that for the example tuple-level uncertainty relation 600 of FIG. 6, the top-1 result is $t_1$ but the top-2 is $(t_2,t_3)$ or $(t_3,t_4)$. Regardless of what tie-breaking rule is used, the top-2 ranking determined by the U-Top k technique is completely disjoint from the top-1 ranking.

The U-Top k technique fails because it deals with top-k sets as immutable objects. Instead, the U-k Ranks technique, also described in "Top-k Query Processing in Uncertain Databases" mentioned above, considers the property of a certain tuple being ranked k th in a possible world. In particular, let $X_{i,j}$ be the event that tuple j is ranked i within a possible world. Computing the probability $Pr[X_{i,j}]$ for all i,j pairs, the U-k Ranks technique reports the i th ranked tuple as $\arg_{max_j} Pr[X_{i,j}]$ or, in other words, as the tuple that is most likely to be ranked i th over all possible worlds. This technique overcomes the shortcomings of U-Top k and satisfies the exact-k and containment properties. However, the U-k Ranks technique fails to support unique ranking, as one tuple may dominate multiple ranks at the same time. A related issue is that some tuples may be quite likely, but never get reported. For example, in the example attribute-level uncertainty relation 500 of FIG. 5, the top-3 under the U-k Ranks technique is $t_1,t_3,t_1$, in which $t_1$ appears twice and $t_2$ never appears. As another example, in the example tuple-level uncertainty relation 600 of FIG. 6, there is a tie for the third position, and there is no fourth placed tuple, even though N=4, Additionally, the U-k Ranks technique fails on stability, because when the score of a tuple becomes larger, it may leave its original rank but cannot take over any higher ranks as the dominating winner.

As an attempt to improve the U-k Ranks technique, the meaning of the kth ranked tuple can be changed from "tuple i is at rank k" to "tuple i is at rank k or better." In other words, consider a definition of the top-k probability of a tuple as the probability that the tuple is in the top-k ranking over all possible worlds. The probabilistic threshold top-k query (abbreviated "PT-k"), described by M. Hua, J. Pei, W. Zhang and X. Lin in "Ranking Queries on Uncertain Data: A Probabilistic Threshold Approach," SIGMOD 2008, which is incorporated herein by reference in its entirety, employs such a definition and returns the set of all tuples whose top-k probability exceeds a user-specified probability p. However, for a user specified p, the top-k list returned by PT-k may not contain k tuples, violating the exact-k property. Furthermore, if p is fixed and k is increased, the top-k lists does expand, but it satisfies only the weak containment property. For example consider the example tuple-level uncertainty relation 600 of FIG. 6. If the user-specified probability p is set to p=0.4, then the top-1 list is $(t_1)$, but both the top-2 and top-3 lists contain the same set of tuples: $t_1,t_2,t_3$. A further drawback of using PT-k for ranking is that user has to specify the threshold p, which can greatly affect the resulting ranking.

Similarly, the Global-Top k technique, described by X. Zhang and J. Chomicki in "On the Semantics and Evaluation of Top-k Queries in Probabilistic Databases," DBRank 2008, which is incorporated herein by reference in its entirety, also ranks the tuples by their top-k probability, and ensures that exactly k tuples are returned. However, the Global-Top k technique also fails to satisfy the containment property. For example, in the example attribute-level uncertainty relation 500 of FIG. 5, the Global-Top k technique determines that the top-1 is $t_1$, but the top-2 is $(t_2,t_3)$. In the example tuple-level uncertainty relation 600 of FIG. 6, the Global-Top k technique determines that the top-1 is $t_1$, but the top-2 is $(t_3,t_2)$.

The preceding existing techniques for ranking uncertain data all differ from traditional ranking queries in that they do not define a single ordering of the tuples from which the top-k is taken. In other words, these existing techniques do not resemble "top-k" in the literal interpretation of the term. An improvement over these existing techniques could be to compute the expected score of each tuple, rank the tuples according to this expected score, and then return the top-k tuples ranked according to the expected score. Such an approach would satisfy the exact-k, containment, unique ranking and stability properties. However, the expected score technique would be dependent on the values of the scores. For example, consider a tuple which has very low probability but a score that is orders of magnitude higher than the other tuples. Such a tuple could be propelled to the top of the ranking if it has the highest expected score, even though it is unlikely. However, if the score for this tuple was reduced to being just greater than the next highest score, the tuple would drop down in the ranking. As such, the expected ranking technique violates the value invariance property. Furthermore, in the tuple-level uncertainty model, simply using the expected score ignores the correlations among tuples described by the exclusion rules.

Having established the desirable properties of a ranking of uncertain data stored in the example probabilistic database 110 and the associated deficiencies of existing ranking techniques, as well as the expected score technique, a description of the example expected ranking unit 115 of FIG. 7 is now provided. Operation of the example expected ranking unit 115 is based on recognizing that a top-k ranking over deterministic data is achieved by determining a total ordering of the tuples, and then selecting the k highest tuples according to the ordering. Such an approach satisfies the containment and unique-ranking properties. Instead of using the expected score as the ranking metric due to its sensitivity to the score values, the example expected ranking unit 115 utilizes the expected rank of the tuple over the possible worlds as the metric for tuple ranking. In other words, the example expected ranking unit 115 operates to determine a rank for a tuple in each of the possible data set instantiations corresponding to the respective possible worlds, and then to combine the individual rankings weighted by the respective likelihoods of occurrence of the possible worlds to determine the expected rank for the tuple across all possible worlds.

Turning to FIG. 7, the expected ranking unit 115 of the illustrated example includes a data set instantiation unit 705 to determine the possible data set instantiations capable of being realized from the set of data tuples stored in, for example, the probabilistic database 110 and representing the uncertain data to be ranked. Using the mathematical terminology introduced above, the example data set instantiation unit 705 determines the possible data set instantiations corresponding to the respective possible worlds W included in the set of all possible worlds S realizable from the set of data tuples $\{t\}$ stored according to an uncertainty relation D.

The example expected ranking unit 115 of FIG. 7 also includes a per-instantiation component ranking unit 710 to determine the ranks of data tuples in the possible data set instantiations determined by the example data set instantiation unit 705. In particular, the example per-instantiation component ranking unit 710 determines a rank of a tuple $t_i$ in a possible world W as the number of other data tuples whose score is higher than the tuple $t_i$. Accordingly, the tuple with the highest ranking according to score in the possible word W has a per-instantiation, or component, rank in W of zero (0), the tuple with the next highest ranking according to score has a per-instantiation, or component, rank in W of one (1), and so on. In other words, the determined per-instantiation, or component, rank for the tuple $t_i$ is a ranking value that, for convenience, is inversely related to the ranking of the tuple $t_i$ according to score such that tuples with higher rankings according to score in a particular world W have lower component rank values. Mathematically, the example per-instantiation component ranking unit 710 determines the per-instantiation rank in W of the tuple $t_i$ according to Equation 4, given by $$\text{rank}_W(t_i) = |\{t_j \in W | v_j > v_i\}|. \quad \text{Equation 4}$$

For example, in the attribute-level uncertainty model, each possible world W is realized by selecting a score for each data tuple based on the tuple's score probabilities. Accordingly, the per-instantiation rank $\text{rank}_W(t_i)$ of the tuple $t_i$ in the possible world W is determined by comparing the selected tuple scores in the possible world W according to Equation 4, However, in the tuple-level uncertainty model, a tuple $t_i$ may not appear in one or more possible worlds. Thus, in the tuple-level uncertainty model, for a possible world W in which a particular tuple $t_i$ does not appear, the per-instantiation rank $\text{rank}_W(t_i)$ for the tuple is set to $\text{rank}_W(t_i) = |W|$, which is the number of tuples included in the possible world. Setting the per-instantiation rank of the non-existent tuple to $|W|$ causes the non-existent tuple to be ranked lower than all the tuples that actually exist in the particular possible world W.

The example expected ranking unit 115 of FIG. 7 further includes an example instantiation probability determination unit 715 and an example expected rank combining unit 720 to determine expected ranks for the data tuples using the per-instantiation ranks determined by the example instantiation component ranking unit 710 for the possible worlds W. Mathematically, the example instantiation probability determination unit 715 and the example expected rank combining unit 720 determine an expected rank $r(t_i)$ for a particular tuple $t_i$ according to Equation 5, given by $$r(t_i) = \sum_{W \in S, t_i \in W} Pr[W] \cdot \text{rank}_W(t_i), \quad \text{Equation 5}$$

where $Pr[W]$ is the instantiation probability for the possible world W and represents the likelihood of the possible world W occurring from among the set of all possible worlds S. In the illustrated example, the instantiation probability determination unit 715 determines the instantiation probability $Pr[W]$ for the possible worlds W represented in Equation 5, For example, in the attribute-level uncertainty model, the instantiation probability determination unit 715 determines the instantiation probability $Pr[W]$ for a possible world W by multiplying the score probabilities associated with the scores selected for each data tuple to realize the particular world W. In the tuple-level uncertainty model, the the instantiation probability determination unit 715 determines the instantiation probability $Pr[W]$ for a possible world W by multiplying the probabilities of selecting those tuples existing in the particular world W with the probabilities of not selecting the tuples that are non-existent in the particular world W. The example expected rank combining unit 720 then combines the per-instantiation, or component, ranks $\text{rank}_W(t_i)$ determined for the possible worlds W after weighting by the instantiation probabilities $Pr[W]$ according to Equation 5, In the tuple-level uncertainty mode, the expected rank $r(t_i)$ of Equation 5 can be alternatively be determined using Equation 6, given by $$r(t_i) = \sum_{W \in S, t_i \in W} Pr[W] \cdot \text{rank}_W(t_i) = \qquad \text{Equation 6}$$

$$\sum_{t_i \in W} Pr[W] \text{rank}_W(t_i) + \sum_{t_i \notin W} Pr[W] \cdot |W|,$$

where, as discussed above, $\text{rank}_W(t_i)$ is defined to be $|W|$ if $t_i \notin W$.

As an illustrative example, for example attribute-level uncertainty relation 500 of FIG. 5, the expected rank for tuple $t_2$ is $r(t_2) = 0.24 \times 1 + 0.16 \times 2 + 0.36 \times 0 + 0.24 \times 1 = 0.8$. Similarly, the expected rank for tuple $t_1$ is $r(t_1) = 1.2$, and the expected rank for $t_3$ is $r(t_3) = 1$. Thus, the final top-3 ranking in this example is $(t_2, t_3, t_1)$. As another illustrative example, for the example tuple-level uncertainty relation 600 of FIG. 6, the expected rank for tuple $t_2$ is $r(t_2) = 0.2 \times 1 + 0.2 \times 3 + 0.3 \times 0 + 0.3 \times 2 = 1.4$, Note here that the tuple $t_2$ does not appear in the second and the fourth possible worlds, so its ranks in these worlds are taken to be 3 and 2, respectively. Similarly e expected rank for tuple $t_1$ is $r(t_1) = 1.2$, the expected rank for $t_3$ is $r(t_3) = 0.9$, and the expected rank for $t_4$ is $r(t_4) = 1.9$, Thus, the final top-4 ranking is $(t_3, t_1, t_2, t_4)$.

Top-k rankings based on expected rank as determined by the example expected ranking unit 115 satisfy all of the desirable ranking properties of exact-k, containment, unique ranking, value invariance and stability as shown below. For simplicity, it is assumed that the expected ranks determined by the example expected ranking unit 115 are unique for each tuple, such that the expected ranking forms a total ordering of the tuples. In practice, expected ranking ties can be broken arbitrarily, such as by choosing the tuple having a lexicographically smaller identifier. The same tie-breaking issues also affect the ranking of deterministic data, and are not discussed further herein.

Satisfaction of the properties of exact-k, containment, unique ranking by the top-k rankings determined by the example expected ranking unit 115 follows immediately from the fact that expected rank is used to give a complete ordering of the data tuples. Value invariance follows by observing that changing absolute score values associated with tuples, without changing the relative scope values among tuples, will not change the rankings in possible worlds, and therefore does not change the expected ranks of the tuples.

For the stability property, it is sufficient to show that when a tuple $t_i$ is changed to $t_i^{\uparrow}$ as defined above, the tuple's expected rank will not increase and the expected rank of any other tuple will not decrease. To show that the top-k rankings determined by the example expected ranking unit 115 satisfy the stability property, let r' be the expected rank in the uncertainty relation D' after changing $t_i$ to $t_i^{\uparrow}$. It suffices to show that $r(t_i) \geq r'(t_i^{\uparrow})$ and $r(t_{i'}) \leq r'(t_{i'})$ for any i'≠i.

For the case of data tuples stored according to the attribute-level uncertainty model, it can be shown that the expected rank $r(t_i)$ of Equation 5 for a particular tuple $t_i$ is equivalent to Equation 7, which is given by $$r(t_i) = \sum_{W \in S, t_i \in W} Pr[W] \cdot \text{rank}_W(t_i) = \sum_{j \neq i} Pr[X_i < X_j] \qquad \text{Equation 7}$$

Then, as shown in Equation 8, after changing $t_i$ to $t_i^{\uparrow}$, $r(t_i) \geq r'(t_i^{\uparrow})$:

$$r(t_i) = \sum_{j \neq i} Pr[X_i < X_j] = \sum_{j \neq i} \sum_l p_{j,l} Pr[X_i < v_{j,l}] \geq \qquad \text{Equation 8}$$

$$\sum_{j \neq i} \sum_l p_{j,l} Pr[X_i^{\uparrow} < v_{j,l}] (\text{because} X_i \leq X_i^{\uparrow})$$

$$= \sum_{j \neq i} Pr[X_i^{\uparrow} < X_j] = r'(t_i^{\uparrow}).$$

Next, as shown in Equation 9, for any i'≠i, $r(t_{i'}) \leq r'(t_{i'})$:

$$r(t_{i'}) = Pr[X_{i'} < X_i] + \sum_{j \neq i', j \neq i} Pr[X_{i'} < X_j] \qquad \text{Equation 9}$$

$$= \sum_l p_{i',l} Pr[v_{i',l} < X_i] + \sum_{j \neq i', j \neq i} Pr[X_{i'} < X_j] \leq$$

$$\sum_l p_{i',l} Pr[v_{i',l} < X_i^{\uparrow}] + \sum_{j \neq i', j \neq i} Pr[X_{i'} < X_j]$$

$$= Pr[X_{i'} < X_i^{\uparrow}] + \sum_{j \neq i', j \neq i} Pr[X_{i'} < X_j] = r'(t_{i'})$$

Thus, top-k rankings determined by the example expected ranking unit 115 for data tuples stored according to an attribute-level uncertainty model satisfy the stability property.

For the case of data tuples stored according to the tuple-level uncertainty model, if $t_i^{\uparrow}$ has a larger score than $t_i$, but the same probability, then $r(t_i) \geq r'(t_i^{\uparrow})$ follows directly from Equation 6 because $\text{rank}_W(t_i)$ can only get smaller while the second term of Equation 6 remains unchanged. For similar reasons, $r(t_{i'}) \leq r'(t_{i'})$ for any i'≠i. If $t_i^{\uparrow}$ has the same score as $t_i$, but a larger probability, $\text{rank}_W(t_i)$ stays the same for any possible world W, but Pr[W] may change. The possible worlds for which $t_i^{\uparrow}$ has the same score as $t_i$, but a larger probability, can be divided into three categories: (a) those containing $t_i$; (b) those containing one of the tuples in the exclusion rule of $t_i$ (other than $t_i$); and (c) all other possible worlds. Note that Pr[W] does not change for any W in category (b), so the focus is on categories (a) and (c). Observe that there is a one-to-one mapping between the possible worlds in category (a) and (c): $W \to W \cup \{t_i\}$. For each such pair, its contribution to $r(t_i)$ is $Pr[W] \cdot |W| + Pr[W \cup \{t_i\}] \cdot \text{rank}_W(t_i)$. Suppose the tuples in the exclusion rule of $t_i$ are $t_{i,1}, \ldots, t_{i,s}$. Note that W and $W \cup \{t_i\}$ differ only in the inclusion of $t_i$, so we can write $$Pr[W] = \pi \left( 1 - \sum_l p(t_{i,l}) - p(t_i) \right)$$

and $Pr[W \cup \{t_i\}] = \pi p(t_i)$ for some $\pi$. When $p(t_i)$ increases to $p(t_i^{\uparrow})$, the increase in the contribution from $r(t_i)$ to $r(t_i^{\uparrow})$ is $\pi(p(t_i) - p(t_i^{\uparrow}))|W| + \pi(p(t_i^{\uparrow}) - p(t_i))\text{rank}_W(t_i)$, which can be rewritten as $\pi(p(t_i) - p(t_i^{\uparrow}))(|W| - \text{rank}_W(t_i)) \leq 0$, The same holds for each pair of possible worlds in categories (a) and (c). Therefore, $r(t_i) \geq r'(t_i^{\uparrow})$.

Next, for any i'≠i, the contribution of each pair is $Pr[W] \cdot \text{rank}_W(t_{i'}) + Pr[W \cup \{t_i\}] \cdot \text{rank}_{W \cup \{t_i\}}(t_{i'})$. When $p(t_i)$ increases to $p(t_i^{\uparrow})$, the preceding expression increases by $\pi(p(t_i) - p(t_i^{\uparrow}))(\text{rank}_W(t_{i'}) - \text{rank}_{W \cup \{t_i\}}(t_{i'})) \geq 0$, The same holds for each pair of possible worlds in categories (a) and (c). Therefore, $r'(t_{i'}) \geq r(t_{i'})$. Thus, top-k rankings determined by the example expected ranking unit 115 for data tuples stored according to a tuple-level uncertainty model also satisfy the stability property.

Table 1 summarizes which desirable ranking properties are supported by the existing ranking techniques, the expected score technique and also the expected rank technique implemented the example expected ranking unit 115 of FIG. 7.

TABLE 1

| Ranking method | Exact- | Containment | Unique-Rank | Value-Invariant | Stability |
|---|---|---|---|---|---|
| U-top k | No | No | Yes | Yes | Yes |
| U-k Ranks | Yes | Yes | No | Yes | No |
| PT-k | No | Weak | Yes | Yes | Yes |
| Global-top k | Yes | No | Yes | Yes | Yes |
| Expected score | Yes | Yes | Yes | No | Yes |
| Expected rank | Yes | Yes | Yes | Yes | Yes |

While an example manner of implementing the expected ranking unit 115 of FIG. 1 has been illustrated in FIG. 7, one or more of the elements, processes and/or devices illustrated in FIG. 7 may be combined, divided, re-arranged, omitted, eliminated and/or implemented in any other way. Further, the example data set instantiation unit 705, the example per-instantiation component ranking unit 710, the example instantiation probability determination unit 715, the example expected rank combining unit 720 and/or, more generally, the expected ranking unit 115 of FIG. 7 may be implemented by hardware, software, firmware and/or any combination of hardware, software and/or firmware. Thus, for example, any of the example data set instantiation unit 705, the example per-instantiation component ranking unit 710, the example instantiation probability determination unit 715, the example expected rank combining unit 720 and/or, more generally, the expected ranking unit 115 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the expected ranking unit 115, the example data set instantiation unit 705, the example per-instantiation component ranking unit 710, the example instantiation probability determination unit 715 and/or the example expected rank combining unit 720 are hereby expressly defined to include a tangible medium such as a memory, digital versatile disk (DVD), compact disk (CD), etc., storing such software and/or firmware. Further still, the expected ranking unit 115 of FIG. 7 may include one or more elements, processes and/or devices in addition to, or instead of, those illustrated in FIG. 7, and/or may include more than one of any or all of the illustrated elements, processes and devices.

Figure 8:
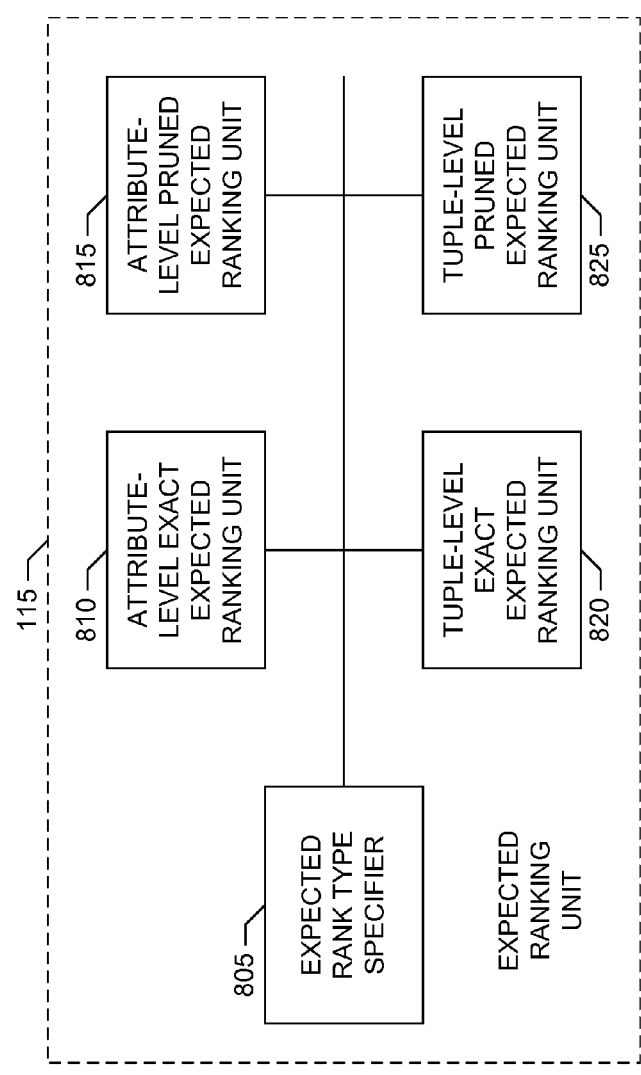
FIG. 8 illustrates a second example implementation of the example expected ranking unit of FIG. 1.

A second example implementation of the expected ranking unit 115 of FIG. 1 is illustrated in FIG. 8. The expected ranking unit 115 of FIG. 8 is tailored to take advantage of the uncertainty relation used by the probabilistic database to store and process the data tuples. In particular, the example expected ranking unit 115 of FIG. 8 includes an expected rank type specifier 805 to specify a particular processing element for use in determining the expected ranks of data tuples stored in a probabilistic database, such as the example probabilistic database 110, depending upon the type of uncertainty relation employed by the probabilistic database. Furthermore, the expected rank type specifier 805 can be used to specify whether to invoke processing elements further tailored to support data pruning to reduce the number of data tuples that need to be accessed to determine expected ranks based on a particular specified uncertainty relation in response to top-k queries.

In the illustrated example of FIG. 8, the expected rank type specifier 805 can invoke an attribute-level exact expected ranking unit 810 to determine exact expected ranks in conjunction with probabilistic databases employing an attribute-level uncertainty relation that associates sets of scores and respective score probabilities with each data tuple and then realizes a possible data set instantiation by selecting a score for each data tuple according to its score probability. The expected rank type specifier 805 can also invoke an attribute-level pruned expected ranking unit 815 to determine expected ranks in conjunction with probabilistic databases employing the attribute-level uncertainty relation, with pruning techniques being used to potentially reduce the number of tuples that need to be accessed. The expected rank type specifier 805 can further invoke a tuple-level exact expected ranking unit 820 to determine exact expected ranks in conjunction with probabilistic databases employing a tuple-level uncertainty relation that associate each data tuple with a score and a score probability and then realizes a possible data set instantiation by determining whether to include each data tuple in the data set instantiation based on its score probability and a set of exclusion rules. The expected rank type specifier 805 can also invoke a tuple-level pruned expected ranking unit 825 to determine expected ranks in conjunction with probabilistic databases employing the tuple-level uncertainty relation, with pruning techniques being used to potentially reduce the number of tuples that need to be accessed. Example implementations of the attribute-level exact expected ranking unit 810, the attribute-level pruned expected ranking unit 815, the tuple-level exact expected ranking unit 820 and the tuple-level pruned expected ranking unit 825 are illustrated in FIGS. 9-12 and discussed in greater detail below.

While an example manner of implementing the expected ranking unit 115 of FIG. 1 has been illustrated in FIG. 8, one or more of the elements, processes and/or devices illustrated in FIG. 8 may be combined, divided, re-arranged, omitted, eliminated and/or implemented in any other way. Further, the example expected rank type specifier 805, the example attribute-level exact expected ranking unit 810, the example attribute-level pruned expected ranking unit 815, the example tuple-level exact expected ranking unit 820, the example tuple-level pruned expected ranking unit 825 and/or, more generally, the expected ranking unit 115 of FIG. 8 may be implemented by hardware, software, firmware and/or any combination of hardware, software and/or firmware. Thus, for example, any of the example expected rank type specifier 805, the example attribute-level exact expected ranking unit 810, the example attribute-level pruned expected ranking unit 815, the example tuple-level exact expected ranking unit 820, the example tuple-level pruned expected ranking unit 825 and/or, more generally, the expected ranking unit 115 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the expected ranking unit 115, the example expected rank type specifier 805, the example attribute-level exact expected ranking unit 810, the example attribute-level pruned expected ranking unit 815, the example tuple-level exact expected ranking unit 820 and/or the example tuple-level pruned expected ranking unit 825 are hereby expressly defined to include a tangible medium such as a memory, digital versatile disk (DVD), compact disk (CD), etc., storing such software and/or firmware. Further still, the expected ranking unit 115 of FIG. 8 may include one or more elements, processes and/or devices in addition to, or instead of, those illustrated in FIG. 8, and/or may include more than one of any or all of the illustrated elements, processes and devices.

An example implementation of the attribute-level exact expected ranking unit 810 that may be used to implement the example expected ranking unit 115 of FIG. 8 is illustrated in FIG. 9. The example attribute-level exact expected ranking unit 810 implements an efficient technique for calculating the expected rank of data tuples in an uncertainty relation D storing N tuples according the attribute-level uncertain model. As discussed below, the example attribute-level exact expected ranking unit 810 determines exact expected ranks of all tuples in D with an O(N log N) processing cost. A technique for determining approximate expected ranks but that can terminate the search without accessing all tuples as soon as the top-k tuples with the k smallest expected ranks are found is discussed below in conjunction with FIG. 10.

The efficient expected ranking technique implemented by the example attribute-level exact expected ranking unit 810 is derived from the brute force technique of Equation 5 as implemented by the example expected ranking unit 115 of FIG. 7. The brute-force approach of Equation 5 as implemented by the example expected ranking unit 115 of FIG. 7 requires O(N) operations to compute the expected rank $r(t_i)$ for one tuple and $O(N^2)$ operations to compute the ranks of all tuples. This quadratic dependence on N can be prohibitive when N is large. However, the efficient expected ranking technique implemented by the example attribute-level exact expected ranking unit 810 requires only O(N log N) operations and is derived from the brute force approach of Equation 5 as follows.

As discussed above, for the case of data tuples stored according to the attribute-level uncertainty model, it can be shown that the expected rank $r(t_i)$ of Equation 5 for a particular tuple $t_i$ is equivalent to Equation 10, which is given by $$r(t_i) = \sum_{i \neq j} Pr[X_j > X_i]. \quad \text{Equation 10}$$

where, as described above, $X_i$ is a random variable denoting the score of a tuple $t_i$. Equation 10 can be rewritten as $$r(t_i) = \sum_{i \neq j} \sum_{l=1}^{s_i} p_{i,l} Pr[X_j > v_{i,l}] = \sum_{l=1}^{s_i} p_{i,l} \sum_{j \neq i} Pr[X_j > v_{i,l}] \quad \text{Equation 11}$$

$$= \sum_{l=1}^{s_i} p_{i,l} \left( \sum_j Pr[X_j > v_{i,l}] - Pr[X_i > v_{i,l}] \right)$$

$$= \sum_{l=1}^{s_i} p_{i,l}(q(v_{i,l}) - Pr[X_i > v_{i,l}])$$

where q(v) is defined to be $$q(v) = \sum_j Pr[X_j > v].$$

In other words, q(v) for a particular score v represents a sum of comparison probabilities $Pr[X_j > v]$, with each comparison probability $Pr[X_j > v]$ representing how likely the respective score v is exceeded by the data tuple $t_j$ having the respective score random variable $X_j$. Referring to FIG. 3, the comparison probability $Pr[X_j > v]$ for the data tuple $t_j$ can be determined by summing the data tuple's score probabilities $p_{j,l}$ that are associated with scores $v_{j,l}$ of the data tuple $t_j$ that are greater than the particular score v.

Let U be the universe of all possible score values of the score random variables $X_i$, i=1, ..., N. Because each pdf associated with the random variables $X_i$ has constant size bounded by s (see FIG. 3), the number of all possible score values is bounded by $|U| \leq |sN|$. When s is a constant, this bound becomes $|U|=O(N)$. After sorting the combined set of scores, U, associated with all data tuples, which has a cost of O(N log N), the sum of comparison probabilities, q(v), can be precomputed for all $v \in U$ with a linear pass over the sorted combined score set U. In the illustrated example of FIG. 9, the attribute-level exact expected ranking unit 810 includes an example score sorting unit 905 to sort the combined set of scores, U, that includes all possible scores of all data tuples. The example attribute-level exact expected ranking unit 810 also includes an example comparison probability determination unit 910 to determine the comparison probability $Pr[X_j > v]$ for each score v in the sorted combined score set U and each data tuple $t_j$ that represents how likely the respective score v is exceeded by the data tuple $t_j$. The example attribute-level exact expected ranking unit 810 further includes an example comparison probability summation unit 915 to determine the sum of comparison probabilities, $$q(v) = \sum_j Pr[X_j > v],$$

for each score v in the sorted combined score set U.

Exact computation of the expected rank for each data tuple can be performed using Equation 11 in constant time given q(v) for all $v \in U$. Accordingly, the attribute-level exact expected ranking unit 810 of FIG. 9 includes a summed comparison probability combination unit 920 to implement Equation 11, In particular, the example summed comparison probability combination unit 920 determines the expected rank $r(t_i)$ for the data tuple $t_i$ by combining the summed comparison probabilities q(v) corresponding to only the set of scores $v_{i,l}$ associated with the data tuple $t_i$, where the summed comparison probabilities $q(v_{i,l})$ for a particular score $v_{i,l}$ is weighted by the corresponding score probability $p_{i,l}$ according to Equation 11, To support a top-k query, the summed comparison probability combination unit 920 of the illustrated example also maintains a priority queue of size k that dynamically stores the k tuples with smallest expected ranks. When all tuples have been processed, the contents of the size k priority queue are returned as the response to the top-k query.

The processing cost exhibited by the example attribute-level exact expected ranking unit 810 of FIG. 9 is determined as follows. Computing q(v) takes O(N log N) operations. Determining expected ranks of all tuples while maintaining the priority queue takes O(N log k) operations. Thus, the overall cost of this approach is O(N log N) operations. For brevity, in the discussions that follow the expected ranking technique implemented by the example attribute-level exact expected ranking unit 810 of FIG. 9 is referred to as "A-ERank" and a pseudocode summary of the A-ERank technique is provided in Table 2.

TABLE 2

A-ERank Expected Ranking Technique

1     Create U containing values from $t_1.X_1,...,t_N.X_N$, in order;
2     Compute q(v) for all $v \in U$ by one pass over U;
3     Initialize a priority queue A sorted by expected rank;
4     for i = 1,...,N do
4a        Compute $r(t_i)$ using q(v)'s and $X_i$ using Equation 11
4b        Insert $(t_i, r(t_i))$ into A;
4c        if |A| > k then Drop element with largest expected rank from A
5     return A;

While an example manner of implementing the example attribute-level exact expected ranking unit 810 of FIG. 8 has been illustrated in FIG. 9, one or more of the elements, processes and/or devices illustrated in FIG. 9 may be combined, divided, re-arranged, omitted, eliminated and/or implemented in any other way. Further, the example score sorting unit 905, the example comparison probability determination unit 910, the example comparison probability summation unit 915, the example summed comparison probability combination unit 920 and/or, more generally, the example attribute-level exact expected ranking unit 810 of FIG. 9 may be implemented by hardware, software, firmware and/or any combination of hardware, software and/or firmware. Thus, for example, any of the example score sorting unit 905, the example comparison probability determination unit 910, the example comparison probability summation unit 915, the example summed comparison probability combination unit 920 and/or, more generally, the example attribute-level exact expected ranking unit 810 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example attribute-level exact expected ranking unit 810, the example score sorting unit 905, the example comparison probability determination unit 910, the example comparison probability summation unit 915 and/or the example summed comparison probability combination unit 920 are hereby expressly defined to include a tangible medium such as a memory, digital versatile disk (DVD), compact disk (CD), etc., storing such software and/or firmware. Further still, the example attribute-level exact expected ranking unit 810 of FIG. 9 may include one or more elements, processes and/or devices in addition to, or instead of, those illustrated in FIG. 9, and/or may include more than one of any or all of the illustrated elements, processes and devices.

An example implementation of the attribute-level pruned expected ranking unit 815 that may be used to implement the example expected ranking unit 115 of FIG. 8 is illustrated in FIG. 10. The A-ERank expected ranking technique implemented by the example attribute-level exact expected ranking unit 810 of FIG. 9 is efficient even for large numbers of data tuples, N. However, in certain scenarios accessing a tuple is considerably expensive, such as where accessing tuples requires significant input/output (I/O) resources. In those scenarios, it may be desirable to reduce the number of tuples that need to be accessed to find answer a top-k ranking query. The example attribute-level pruned expected ranking unit 815 of FIG. 10 is able to reduce the number of tuples that need to be accessed to find a set of k or more tuples guaranteed to include the tuples having the actual top-k expected ranks. The example attribute-level pruned expected ranking unit 815 achieves this reduction in number of tuples accessed by employing pruning based on tail bounds of the score distribution.

In particular, if the data tuples tuples are sorted in decreasing order of their expected scores, $E[X_i]$, the example attribute-level pruned expected ranking unit 815 can terminate the search for the top-k tuples early before determining the expected ranks for all tuples. Accordingly, the example attribute-level pruned expected ranking unit 815 of FIG. 10 includes an expected score sorting unit 1005 to sort the expected scores, $E[X_i]$, determined by an expected score determination unit 1010 for each data tuple $t_i$. In the illustrated example, the expected score determination unit 1010 determines the expected score $E[X_i]$ by summing the possible scores $v_{i,l}$ for the data tuple $t_i$, with each score weighted by the respective score probability $p_{i,l}$ (see FIG. 3). Alternatively, if the scores and score probabilities are modeled as a continuous pdf (instead of the discrete values $v_{i,l}$ and $p_{i,l}$), the expected score $E[X_i]$ can be determined by computing the expected value of the continuous pdf. The example expected score sorting unit 1005 sorts expected scores for the data tuples in decreasing order such that, if i<j, then $E[X_i] \geq E[X_j]$ for all $1 \leq i,j \leq N$. The example attribute-level pruned expected ranking unit 815 of FIG. 10 also includes a sorted tuple selection unit 1015 that implements an interface which selects and provides data tuples in decreasing order of expected rank $E[X_i]$. The example attribute-level pruned expected ranking unit 815 scans the data tuples in decreasing order of expected rank $E[X_i]$ using the example sorted tuple selection unit 1015 and maintains an upper bound on the expected rank $r(t_i)$ for each data tuple $t_i$ selected so far, with the upper bound denoted $r^+(t_i)$. The example attribute-level pruned expected ranking unit 815 also maintains a lower bound on $r(t_u)$ for any unseen tuple $t_u$, with the lower bound denoted $r^-$. In the illustrated example, the example attribute-level pruned expected ranking unit 815 stops selecting data tuples for determining a top-k ranking when there are at least k selected data tuples having upper bound $r^+(X_i)$'s that are smaller than the current lower bound $r^-$.

The example attribute-level pruned expected ranking unit 815 of FIG. 10 includes an upper bound determination unit 1020 to determine an upper bound $r^+(t_i)$ on the expected rank $r(t_i)$ for each selected data tuple $t_i$ as follows. Suppose n tuples $t_1, \ldots, t_n$ have been selected by the example sorted tuple selection unit 1015. From Equation 10, the expected rank $r(t_i)$ of the selected data tuple $t_i$, $\forall i \in [1,n]$, is given by Equation 12, which is:

$$r(t_i) = \sum_{j \leq n, j \neq i} Pr[X_j > X_i] + \sum_{n < j \leq N} Pr[X_j > X_i] \quad \text{Equation 12}$$

$$= \sum_{j \leq n, j \neq i} Pr[X_j > X_i] + \sum_{n < j \leq N} \sum_{l=1}^{s_i} p_{i,l} Pr[X_j > v_{i,l}] \leq$$

$$\sum_{j \leq n, j \neq i} Pr[X_j > X_i] + \sum_{n < j \leq N} \sum_{l=1}^{s_i} p_{i,l} \frac{E[X_j]}{v_{i,l}}$$

The last line of Equation 12 results from the Markov inequality, and can be further bounded by Equation 13, which is:

$$r(t_i) \leq \sum_{j \leq n, j \neq i} Pr[X_j > X_i] + (N-n) \sum_{l=1}^{s_i} p_{i,l} \frac{E[X_n]}{v_{i,l}} = r^+(t_i). \quad \text{Equation 13}$$

Thus, the example upper bound determination unit 1020 implements Equation 13 to determine the upper bound $r^+(t_i)$ on the expected rank $r(t_i)$ for each selected data tuple $t_i$. In particular, the first term in Equation 13 can be computed using only the currently selected tuples $t_1, \ldots, t_n$. The second term in Equation 13 can be computed using the expected score $E[X_n]$ for the most recently selected tuple $t_n$ (which is the smallest expected score from among all the selected data tuples because the tuples are selected in decreasing order of expected score), the possible scores $v_{i,l}$ and respective score probabilities $p_{i,l}$ for the data tuple $t_i$, and a scale factor based on the size n of the subset of tuples currently selected. Thus, the example upper bound determination unit 1020 uses Equation 13 to maintain an upper bound $r^+(t_i)$ on the expected rank $r(t_i)$ for each selected tuple in $\{t_1, \ldots, t_n\}$ using only the selected data tuples $t_i$, i=1, . . . ,n, with the first and second terms in $r^+(t_i)$ updated for each newly scanned tuple $t_n$.

The example attribute-level pruned expected ranking unit 815 of FIG. 10 includes a lower bound determination unit 1025 to maintain the lower bound $r^-$ on the expected rank $r(t_u)$ for all unselected tuples $t_u$ as follows. Suppose n tuples $t_1, \ldots, t_n$ have been selected by the example sorted tuple selection unit 1015. For any unselected tuple $t_u$, u>n, the expected rank $r(t_u)$ of the unselected data tuple $t_u$ is given by Equation 14, which is:

$$r(t_u) \geq \sum_{j \leq n} Pr[X_j > X_u] = \qquad \text{Equation 14}$$

$$n - \sum_{j \leq n} Pr[X_u \geq X_j] = n - \sum_{j \leq n} \sum_{l=1}^{s_j} p_{j,l} Pr[X_u > v_{j,l}].$$

Using the Markov inequality on the last term of Equation 14, the expected rank $r(t_u)$ of the unselected data tuple $t_u$ can be further bounded by Equation 15, given by:

$$r(t_u) \geq n - \sum_{j \leq n} \sum_{l=1}^{s_j} p_{j,l} \frac{E[X_n]}{v_{j,l}} = r^-. \qquad \text{Equation 15}$$

Thus, the example lower bound determination unit 1025 implements Equation 15 to determine the lower bound $r^-$ on the expected rank $r(t_u)$ for all unselected tuples $t_u$. In particular, the first term in Equation 15 is the size n of the subset of tuples currently selected. The second term in Equation 15 can be computed using the expected score $E[X_n]$ for the most recently selected tuple $t_n$ (which is the smallest expected score from among all the selected data tuples because the tuples are selected in decreasing order of expected score), and the possible scores $v_{i,l}$ and respective score probabilities $p_{i,l}$ for the data tuples $t_i$ currently selected. Thus, the example lower bound determination unit 1025 uses Equation 15 to maintain a lower bound $r^-$ on the expected rank $r(t_u)$ for all unselected tuples $t_u$ using only the selected data tuples $t_i$, i=1, . . . ,n, with the lower bound $r^-$ being updated for every newly scanned tuple $t_n$.

To process a top-k query, the example attribute-level pruned expected ranking unit 815 of FIG. 10 uses the upper bounds $r^+(t_i)$ on the expected ranks for all tuples $t_1, \ldots, t_n$ determined by the upper bound determination unit 1020 and the lower bound $r^-$ on the expected ranks of all unselected tuples determined by the lower bound determination unit 1025 to determine a subset of data tuples $t_i$ that must include the top-k tuples. In particular, for each new tuple $t_n$ selected in decreasing order of expected score, the upper bound determination unit 1020 and the lower bound determination unit 1025 update the upper bounds $r^+(t_i)$ and the lower bound $r^-$. The example attribute-level pruned expected ranking unit 815 then finds the k th largest upper bound $r^+(t_i)$ value, and compares this to the lower bound r. If the k th largest upper bound is less than the lower bound, then the example attribute-level pruned expected ranking unit 815 determines that the top-k tuples having smallest expected ranks across all the data tuples are among the first n selected tuples and, thus, the example attribute-level pruned expected ranking unit 815 can stop selecting additional tuples for processing. Otherwise, the example attribute-level pruned expected ranking unit 815 uses the sorted tuple selection unit 1015 to select the next next tuple in decreasing order of expected score. For brevity, in the discussions that follow the expected ranking technique implemented by the example attribute-level pruned expected ranking unit 815 of FIG. 10 is referred to as "A-ERank-Prune."

A remaining challenge is how to find the particular k tuples having the smallest expected ranks among the n selected tuples using only the n selected tuples. It is not possible to obtain a precise order of actual expected ranks of the n selected tuples without inspecting all N data tuples in the uncertainty relation D. Instead, the example attribute-level pruned expected ranking unit 815 determines approximate expected ranks for the only the n selected tuples using a curtailed database $D'=\{t_1, \ldots, t_n\}$ implemented by a curtailed dataset determination unit 1030. The example curtailed dataset determination unit 1030 prunes the original uncertainty relation D to include only the n selected tuples of the N data tuples in the uncertainty relation D, but not any of the unselected tuples. The example attribute-level pruned expected ranking unit 815 further includes an implementation of the example attribute-level exact expected ranking unit 810 of FIGS. 8 or 9 to determine the expected rank $r'(t_i)$ for every tuple $t_i$, i∈[1,n], in the curtailed database D'. The expected rank $r'(t_i)$ determined using only the n selected tuples in the curtailed data set can be an accurate approximation of the actual $r(t_i)$ that would require all N data tuples.

The processing cost exhibited by the A-ERrank-Prune technique implemented by the example attribute-level pruned expected ranking unit 815 of FIG. 10 is determined as follows. After selecting the next data tuple $t_n$, the bounds in both Equation 13 and Equation 15 can be updated in constant time by retaining $$\sum_{l=1}^{s_j} \frac{p_{i,l}}{v_{i,l}}$$

for each seen tuple. Updating the first term in Equation 13 for all i≤n requires linear time for adding $Pr[X_n > X_i]$ to the already computed $$\sum_{j \leq n-1, j \neq i} Pr[X_j > X_i]$$

for all selected tuples as well as computing $$\sum_{i \leq n-1} Pr[X_i > X_n]).$$

This results in a total of $O(n^2)$ operations for the A-ERrank-Prune technique. Using a similar approach in the A-ERank technique implemented by the example attribute-level exact expected ranking unit 810 of FIG. 9, the A-ERank technique could utilize the value universe U' of only the selected tuples and maintain prefix sums of the q(v) values, which would drive down the cost of this technique to $O(n \log n)$ operations.

While an example manner of implementing the attribute-level pruned expected ranking unit 815 of FIG. 8 has been illustrated in FIG. 10, one or more of the elements, processes and/or devices illustrated in FIG. 10 may be combined, divided, re-arranged, omitted, eliminated and/or implemented in any other way. Further, the example expected score sorting unit 1005, the example expected score determination unit 1010, the example sorted tuple selection unit 1015, the example upper bound determination unit 1020, the example lower bound determination unit 1025, the example curtailed dataset determination unit 1030, the example attribute-level exact expected ranking unit 810 and/or, more generally, the example attribute-level pruned expected ranking unit 815 of FIG. 10 may be implemented by hardware, software, firmware and/or any combination of hardware, software and/or firmware. Thus, for example, any of the example expected score sorting unit 1005, the example expected score determination unit 1010, the example sorted tuple selection unit 1015, the example upper bound determination unit 1020, the example lower bound determination unit 1025, the example curtailed dataset determination unit 1030, the example attribute-level exact expected ranking unit 810 and/or, more generally, the example attribute-level pruned expected ranking unit 815 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example attribute-level pruned expected ranking unit 815, the example expected score sorting unit 1005, the example expected score determination unit 1010, the example sorted tuple selection unit 1015, the example upper bound determination unit 1020, the example lower bound determination unit 1025, the example curtailed dataset determination unit 1030 and/or the example attribute-level exact expected ranking unit 810 are hereby expressly defined to include a tangible medium such as a memory, digital versatile disk (DVD), compact disk (CD), etc., storing such software and/or firmware. Further still, the example attribute-level pruned expected ranking unit 815 of FIG. 10 may include one or more elements, processes and/or devices in addition to, or instead of, those illustrated in FIG. 10, and/or may include more than one of any or all of the illustrated elements, processes and devices.

Figure 11:
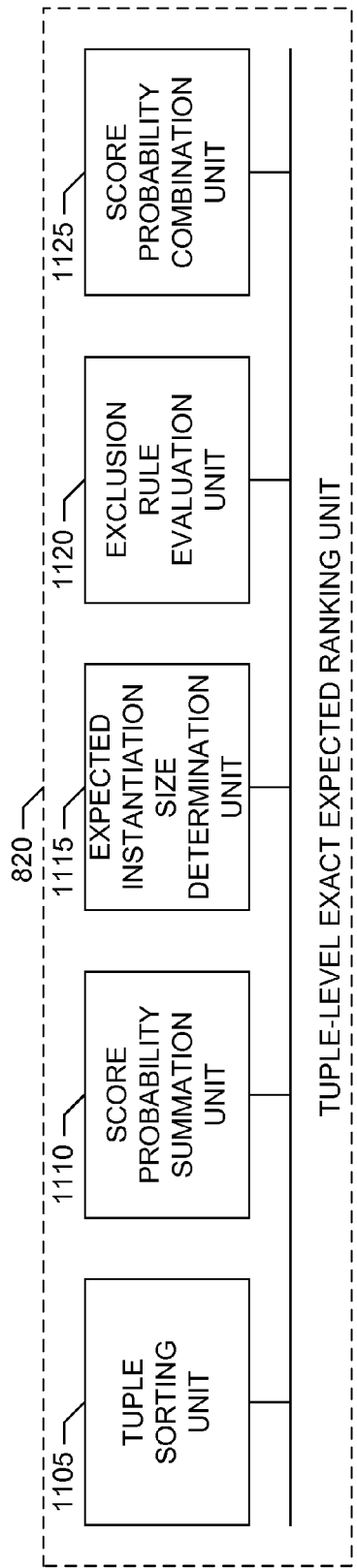
FIG. 11 illustrates an example tuple-level exact expected ranking unit that may be used to implement the second example expected ranking unit implementation of FIG. 8.

An example implementation of the tuple-level exact expected ranking unit 820 that may be used to implement the example expected ranking unit 115 of FIG. 8 is illustrated in FIG. 11. The example tuple-level exact expected ranking unit 820 implements an efficient technique for calculating the expected rank of an uncertainty relation D for storing N tuples according to the tuple-level uncertain model. For a tuple-level uncertainty relation D with N tuples and M exclusion rules (see e.g. FIG. 4), the example tuple-level exact expected ranking unit 820 determines the k tuples with the smallest expected ranks in response to a top-k query. Recall that each exclusion rule $\tau_j$ is a set of tuples, where the score probabilities for the tuples included in the exclusion rule sum to a value not exceeding 1

$$\left(\text{e.g.,} \sum_{t_i \in \tau_j} p(t_i) \le 1\right).$$

Without loss of generality, in the following description it is assumed that an example tuple sorting unit 1105 sorts the tuples $t_1, \ldots, t_n$ by their score attribute and $t_1$ is, therefore, the tuple with the highest score. Additionally, the notation $t_i \diamond t_j$ is used to indicate that the tuples $t_i$ and $t_j$ are in the same exclusion rule and that they are different from each other (e.g., $t_i \ne t_j$). Furthermore, the notation $t_i \overline{\diamond} t_j$ is used to indicate that the tuples $t_i$ and $t_j$ are not in the same exclusion rule. As discussed below, the example tuple-level exact expected ranking unit 820 determines exact expected ranks of all tuples in D with a $O(N \log N)$ processing cost that accesses every tuple. A technique for determining the expected ranks that accesses only the first n tuples and that has a processing cost of $O(n \log n)$ operations is discussed below in conjunction with FIG. 12. This latter technique is based on an assumption that an expected number of tuples included in the possible data instantiations of the tuple-level uncertainty relation D is known, as described below.

The efficient expected ranking technique implemented by the example tuple-level exact expected ranking unit 820 is derived from the brute force approach of Equation 5 as follows. Assuming that the data tuples $t_i$ are sorted according to their respective score attributes $v_i$, the expected rank $r(t_i)$ of Equation 5, which is equivalent to Equation 6 for the tuple-level uncertainty model, becomes Equation 16, given by:

$$r(t_i) = p(t_i) \cdot \sum_{t_j \overline{\diamond} t_i, j<i} p(t_j) + (1 - p(t_i)) \cdot \left( \frac{\sum_{t_j \diamond t_i} p(t_j)}{1 - p(t_i)} + \sum_{t_j \overline{\diamond} t_i} p(t_j) \right) \quad \text{Equation 16}$$

The first term in Equation 16 computes the portion of tuple $t_i$'s expected rank for possible data set instantiations corresponding to random worlds W in which the tuple $t_i$ appears. The second term in Equation 16 computes the expected size (e.g., the number of data tuples in the possible data set instantiation) of a random world W in which $t_i$ does not appear in W. In particular, the term $$\frac{\sum_{t_j \diamond t_i} p(t_j)}{1 - p(t_i)}$$

is the expected number of appearing tuples in the same rule as $t_i$, conditioned on $t_i$ not appearing, while the term $$\sum_{t_j \overline{\diamond} t_i} p(t_j)$$

accounts for the rest of the tuples.

Rewriting Equation 16 yields Equation 17, given by:

$$r(t_i) = p(t_i) \cdot \sum_{t_j \odot t_i, j<i} p(t_j) + \sum_{t_j \Diamond t_i} p(t_j) + (1 - p(t_i)) \cdot \sum_{t_j \Diamond t_i} p(t_j) \quad \text{Equation 17}$$

Let $$q_i = \sum_{j<i} p(t_j)$$

be the sum of the score probabilities $p(t_j)$ for all data tuples $t_j$ ordered (e.g., by the example tuple sorting unit 1105) before the data tuple $t_i$ in decreasing order of score. The example tuple-level exact expected ranking unit 820 includes a score probability summation unit 1110 to determine the score probability summation $q_i$ for all tuples $t_i$ in O(N) operations. The example tuple-level exact expected ranking unit 820 also includes an expected instantiation size determination unit 1115 to sum the respective score probabilities associated with all data tuples to determine the quantity $$E[|W|] = \sum_{j=1}^{N} p(t_j),$$

which is the expected number of tuples averaged over all possible worlds S (which is also referred to as the expected data set instantiation size over all possible worlds S). Using the score probability summation $q_i$ determined by the example score probability summation unit 1110 and the expected number of tuples $E[|W|]$ determined by the example expected instantiation size determination unit 1115, Equation 17 can be rewritten as Equation 18, given by:

$$r(t_i) = p(t_i) \cdot \left( q_i - \sum_{t_j \odot t_i, j<i} p(t_j) \right) + \quad \text{Equation 18}$$
$$\sum_{t_j \Diamond t_i} p(t_j) + (1 - p(t_i))\left( E[|W|] - p(t_i) - \sum_{t_j \Diamond t_i} p(t_j) \right).$$

Referring to Equation 18, the example tuple-level exact expected ranking unit 820 includes an exclusion rule evaluation unit 1120 to determine the first auxiliary information term $$\sum_{t_j \odot t_i, j<i} p(t_j),$$

which is the sum of probabilities of tuples $t_j$ in the same rule as $t_i$ that have score values higher than $t_i$, and the second auxiliary information term $$\sum_{t_j \Diamond t_i} p(t_j),$$

which is the sum of probabilities of tuples $t_j$ that are in the same rule as $t_i$, for each tuple $t_i$ in the tuple-level uncertainty relation D. The example tuple-level exact expected ranking unit 820 further includes a score probability combination unit 1125 to determine the expected rank $r(t_i)$ for tuple $t_i$ in O(1) operations by combining the auxiliary terms determined by the exclusion rule evaluation unit 1120 with the score probability summation $q_i$ determined by the example score probability summation unit 1110 and the expected number of tuples $E[|W|]$ determined by the example expected instantiation size determination unit 1115 according to Equation 18. Additionally, to support a top-k query, the score probability combination unit 1125 of the illustrated example maintains a priority queue of size k that keeps the k tuples with the smallest expected ranks $r(t_i)$, thereby allowing selection of the top-k tuples in O(N log k) operations. Note that both auxiliary terms $$\sum_{t_j \odot t_i, j<i} p(t_j) \text{ and } \sum_{t_j \Diamond t_i} p(t_j)$$

can be calculated inexpensively by initially accessing all the exclusion rules in a single scan of the uncertainty relation D in O(N) operations. However, when the tuples $t_i$ in D are not presorted by score attribute, the processing cost exhibited by the example tuple-level exact expected ranking unit 820 is dominated by the sorting performed by the example tuple sorting unit 1105, which requires O(N log N) operations.

For brevity, in the discussions that follow the expected ranking technique implemented by the example tuple-level exact expected ranking unit 820 of FIG. 11 is referred to as "T-ERrank" and a pseudocode summary of the T-ERrank technique is provided in Table 3

TABLE 3

T-ERrank Expected Ranking Technique

| | |
|---|---|
| 1 | Sort D by score attribute such that if $t_i.v_i \geq t_j.v_j$, then $i \leq j$ for all $i, j \in [1, N]$; |
| 2 | Compute $q_i$ for all $i \in [1, N]$ and $E[|W|]$ by one pass over D; |
| 3 | Initialize a priority queue A sorted by expected rank; |
| 4 | for i = 1,...,N do |
| 4a | Compute $r(t_i)$ using Equation 18; |
| 4b | if $|A| > k$ then drop the element with largest expected rank from A; |
| 5 | return A; |

While an example manner of implementing the example tuple-level exact expected ranking unit 820 of FIG. 8 has been illustrated in FIG. 11, one or more of the elements, processes and/or devices illustrated in FIG. 11 may be combined, divided, re-arranged, omitted, eliminated and/or implemented in any other way. Further, the example tuple sorting unit 1105, the example score probability summation unit 1110, the example expected instantiation size determination unit 1115, the example exclusion rule evaluation unit 1120, the example score probability combination unit 1125 and/or, more generally, the example tuple-level exact expected ranking unit 820 of FIG. 11 may be implemented by hardware, software, firmware and/or any combination of hardware, software and/or firmware. Thus, for example, any of the example tuple sorting unit 1105, the example score probability summation unit 1110, the example expected instantiation size determination unit 1115, the example exclusion rule evaluation unit 1120, the example score probability combination unit 1125 and/or, more generally, the example tuple-level exact expected ranking unit 820 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example tuple-level exact expected ranking unit 820, the example tuple sorting unit 1105, the example score probability summation unit 1110, the example expected instantiation size determination unit 1115, the example exclusion rule evaluation unit 1120 and/or the example score probability combination unit 1125 are hereby expressly defined to include a tangible medium such as a memory, digital versatile disk (DVD), compact disk (CD), etc., storing such software and/or firmware. Further still, the example tuple-level exact expected ranking unit 820 of FIG. 11 may include one or more elements, processes and/or devices in addition to, or instead of, those illustrated in FIG. 11, and/or may include more than one of any or all of the illustrated elements, processes and devices.

Figure 12:
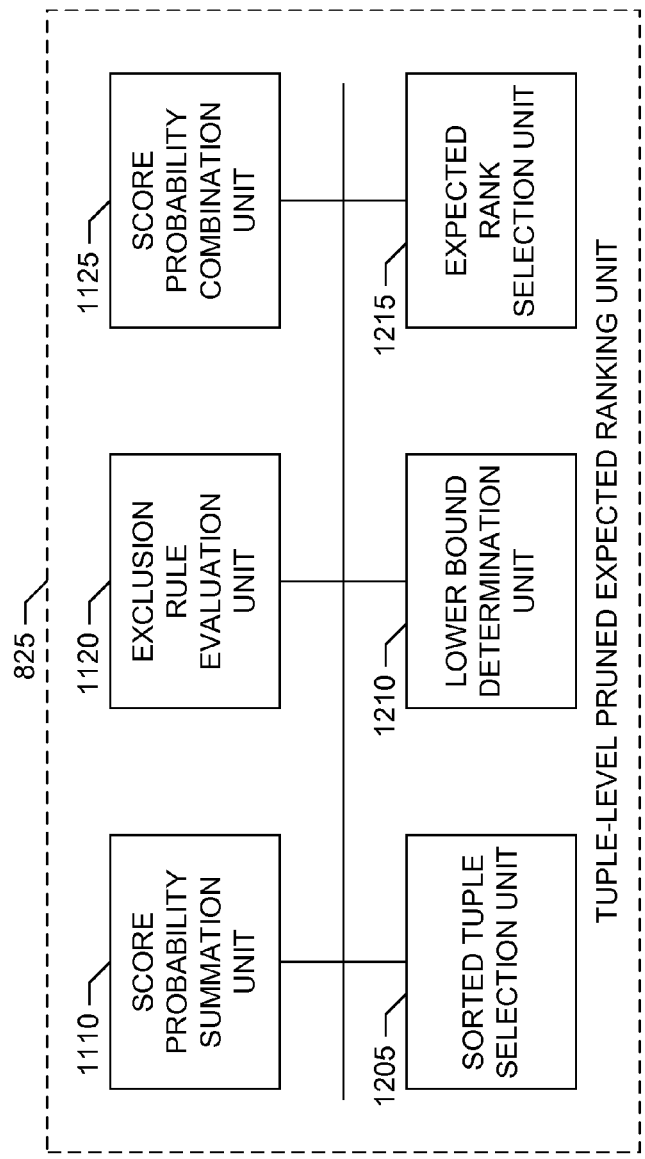
FIG. 12 illustrates an example tuple-level pruned expected ranking unit that may be used to implement the second example expected ranking unit implementation of FIG. 8.

An example implementation of the tuple-level pruned expected ranking unit 825 that may be used to implement the example expected ranking unit 115 of FIG. 8 is illustrated in FIG. 12. Provided that the expected number of tuples $E[|W|]$ is known, the example tuple-level pruned expected ranking unit 825 of FIG. 12 can answer top-k queries efficiently using pruning techniques without accessing all tuples. For example, $E[|W|]$ can be known and efficiently maintained in $O(1)$ operations when the tuple-level uncertainty relation D is updated by the deletion or insertion of tuples. Because $E[|W|]$ is simply the sum of the score probabilities for all tuples included in the tuple-level uncertainty relation D, and does not depend on the exclusion rules, it is reasonable to assume that $E[|W|]$ is always available. Additionally, in the illustrated example of FIG. 12, it is assumed that the tuple-level uncertainty relation D stores tuples in decreasing order of their score attributes (e.g., from the highest to the lowest). If the tuple-level uncertainty relation D does not store tuples in decreasing order of score, the tuple-level pruned expected ranking unit 825 of FIG. 12 can be adapted to include the example tuple sorting unit 1105 of FIG. 11 to perform such sorting.

Turning to FIG. 12, the example tuple-level pruned expected ranking unit 825 includes the example score probability summation unit 1110, the example exclusion rule evaluation unit 1120 and the example score probability combination unit 1125 to determine the expected ranks $r(t_i)$ for tuples $t_i$ according to Equation 18 as described above. (The example tuple-level pruned expected ranking unit 825 does not include the example expected instantiation size determination unit 1115 of FIG. 11 because the expected number of tuples $E[|W|]$ is assumed to be known. However, the example expected instantiation size determination unit 1115 could be included in the example of FIG. 12 if determination of the expected number of tuples $E[|W|]$ is required). The example tuple-level pruned expected ranking unit 825 of FIG. 12 also includes a sorted tuple selection unit 1205 to select tuples $t_i$ in decreasing order or score. After selecting $t_n$, the example tuple-level pruned expected ranking unit 825 further uses the score probability combination unit 1125 to determine the expected rank $r(t_n)$ for tuple $t_n$ in $O(1)$ operations by combining the auxiliary terms determined by the exclusion rule evaluation unit 1120 with the score probability summation $q_n$ determined by the example score probability summation unit 1110 and the expected number of tuples $E[|W|]$ (assumed to be available) according to Equation 18. The example score probability combination unit 1125 also maintains $r^{(k)}$, the k-th smallest expected rank $r(t_i)$ among all the tuples currently selected by the example sorted tuple selection unit 1205. Maintaining the k-th smallest expected rank $r^{(k)}$ can be performed with a priority queue in $O(\log k)$ operations per tuple.

The example tuple-level pruned expected ranking unit 825 of FIG. 12 further includes a lower bound determination unit 1210 to determine a lower bound on the expected ranks $r(t_j)$ for all unselected tuples $t_j$, $l>n$. The lower bound on $r(t_j)$ is derived as follows. Beginning with Equation 17, the expression for the lower bound $r(t_j)$ can be rewritten to be Equation 19, which is:

$$r(t_i) = p(t_i) \cdot \sum_{t_j \circ t_i, j<i} p(t_j) + \sum_{t_j \circ t_i} p(t_j) + (1 - p(t_i)) \cdot \sum_{t_j \circ t_i} p(t_j) \quad \text{Equation 19}$$

$$= p(t_l) \cdot \sum_{t_j \circ t_l, j<l} p(t_j) + E[|W|] - p(t_l) - p(t_l) \cdot \sum_{t_j \circ t_l} p(t_j)$$

$$= E[|W|] - p(t_l) - p(t_l) \cdot \left( \sum_{t_j \circ t_l} p(t_j) - \sum_{t_j \circ t_l, j<l} p(t_j) \right)$$

$$= E[|W|] - p(t_l) - p(t_l) \cdot \sum_{t_j \circ t_l, j<l} p(t_j).$$

The fact that $$\sum_{t_j \circ t_l} p(t_j) + \sum_{t_j \circ t_l} p(t_j) = E[|W|] - p(t_l)$$

was used to obtain the second line from the first line in Equation 19, As defined above, $$q_l = \sum_{j<l} p(t_j)$$

is the sum of the score probabilities $p(t_j)$ for all data tuples $t_j$ ordered before the data tuple $t_l$. It can be shown that:

$$E[|W|] - q_l = \sum_{j>l} p(t_j) + p(t_l) \geq \sum_{t_j \circ t_l, j<l} p(t_j). \quad \text{Equation 20}$$

Substituting Equation 20 into Equation 19 yields the following lower bound on $r(t_l)$:

$$r(t_l) \geq E[|W|] - p(t_l) - p(t_l) \cdot (E[|W|] - q_l) \geq q_l - 1 \geq q_n - 1. \quad \text{Equation 21}$$

The last line of Equation 21 is uses the monotonicity of $q_l$ (e.g., $q_n \leq q_l$ if $n \leq l$) which results from the data tuples being scanned in order. The last line of Equation 21 is the lower bound on $r(t_j)$ determined by the example lower bound determination unit 1210.

Thus, when $r^{(k)} \leq q_n - 1$, there are at least k tuples among the first selected n tuples with expected ranks smaller than all unseen tuples. Accordingly, the example tuple-level pruned expected ranking unit 825 of FIG. 12 includes an expected rank selection unit 1215 to determine when $r^{(k)} \leq q_n - 1$ and then stops the selection of subsequent tuples by the example sorted tuple selection unit 1205. Additionally, because the expected ranks are calculated by the example tuple-level pruned expected ranking unit 825 for all the selected tuples, the expected rank selection unit 1215 can simply select the top-k ranked tuples from among the n selected tuples in response to a top-k query. The processing cost exhibited by the example tuple-level pruned expected ranking unit 825 of FIG. 12 is O(n log k) where n is potentially much smaller than N. For brevity, in the discussions that follow the expected ranking technique implemented by the example tuple-level pruned expected ranking unit 825 of FIG. 12 is referred to as "T-ERrank-Prune."

While an example manner of implementing the example tuple-level pruned expected ranking unit 825 of FIG. 8 has been illustrated in FIG. 12, one or more of the elements, processes and/or devices illustrated in FIG. 12 may be combined, divided, re-arranged, omitted, eliminated and/or implemented in any other way. Further, the example score probability summation unit 1110, the example exclusion rule evaluation unit 1120, the example score probability combination unit 1125, the example sorted tuple selection unit 1205, the example lower bound determination unit 1210, the example expected rank selection unit 1215 and/or, more generally, the example tuple-level pruned expected ranking unit 825 of FIG. 12 may be implemented by hardware, software, firmware and/or any combination of hardware, software and/or firmware. Thus, for example, any of t the example score probability summation unit 1110, the example exclusion rule evaluation unit 1120, the example score probability combination unit 1125, the example sorted tuple selection unit 1205, the example lower bound determination unit 1210, the example expected rank selection unit 1215 and/or, more generally, the example tuple-level pruned expected ranking unit 825 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example tuple-level pruned expected ranking unit 825, the example score probability summation unit 1110, the example exclusion rule evaluation unit 1120, the example score probability combination unit 1125, the example sorted tuple selection unit 1205, the example lower bound determination unit 1210 and/or the example expected rank selection unit 1215 are hereby expressly defined to include a tangible medium such as a memory, digital versatile disk (DVD), compact disk (CD), etc., storing such software and/or firmware. Further still, the example tuple-level pruned expected ranking unit 825 of FIG. 12 may include one or more elements, processes and/or devices in addition to, or instead of, those illustrated in FIG. 12, and/or may include more than one of any or all of the illustrated elements, processes and devices.

Flowcharts representative of example machine readable instructions that may be executed to implement the example probabilistic database server 105, the example probabilistic database 110, the example expected ranking unit 115, the example data interface 135, the example query interface 145, the example score computation unit 150, the example score probability computation unit 155, the example data tuple storage 205, the example instantiation unit 210, the example data set instantiation unit 705, the example per-instantiation component ranking unit 710, the example instantiation probability determination unit 715, the example expected rank combining unit 720, the example expected rank type specifier 805, the example attribute-level exact expected ranking unit 810, the example attribute-level pruned expected ranking unit 815, the example tuple-level exact expected ranking unit 820, the example tuple-level pruned expected ranking unit 825, the example score sorting unit 905, the example comparison probability determination unit 910, the example comparison probability summation unit 915, the example summed comparison probability combination unit 920, the example expected score sorting unit 1005, the example expected score determination unit 1010, the example sorted tuple selection unit 1015, the example upper bound determination unit 1020, the example lower bound determination unit 1025, the example curtailed dataset determination unit 1030, the example tuple sorting unit 1105, the example score probability summation unit 1110, the example expected instantiation size determination unit 1115, the example exclusion rule evaluation unit 1120, the example score probability combination unit 1125, the example sorted tuple selection unit 1205, the example lower bound determination unit 1210 and/or the example expected rank selection unit 1215 are shown in FIGS. 13-18. In these examples, the machine readable instructions represented by each flowchart may comprise one or more programs for execution by: (a) a processor, such as the processor 2612 shown in the example computer 2600 discussed below in connection with FIG. 26, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 2612, but the entire program or programs and/or portions thereof could alternatively be executed by a device other than the processor 2612 and/or embodied in firmware or dedicated hardware (e.g., implemented by an application specific integrated circuit (ASIC), a programmable logic device (PLD), a field programmable logic device (FPLD), discrete logic, etc.). For example, any or all of the example probabilistic database server 105, the example probabilistic database 110, the example expected ranking unit 115, the example data interface 135, the example query interface 145, the example score computation unit 150, the example score probability computation unit 155, the example data tuple storage 205, the example instantiation unit 210, the example data set instantiation unit 705, the example per-instantiation component ranking unit 710, the example instantiation probability determination unit 715, the example expected rank combining unit 720, the example expected rank type specifier 805, the example attribute-level exact expected ranking unit 810, the example attribute-level pruned expected ranking unit 815, the example tuple-level exact expected ranking unit 820, the example tuple-level pruned expected ranking unit 825, the example score sorting unit 905, the example comparison probability determination unit 910, the example comparison probability summation unit 915, the example summed comparison probability combination unit 920, the example expected score sorting unit 1005, the example expected score determination unit 1010, the example sorted tuple selection unit 1015, the example upper bound determination unit 1020, the example lower bound determination unit 1025, the example curtailed dataset determination unit 1030, the example tuple sorting unit 1105, the example score probability summation unit 1110, the example expected instantiation size determination unit 1115, the example exclusion rule evaluation unit 1120, the example score probability combination unit 1125, the example sorted tuple selection unit 1205, the example lower bound determination unit 1210 and/or the example expected rank selection unit 1215 could be implemented by any combination of software, hardware, and/or firmware. Also, some or all of the machine readable instructions represented by the flowchart of FIGS. 13-18 may be implemented manually. Further, although the example machine readable instructions are described with reference to the flowcharts illustrated in FIGS. 13-18, many other techniques for implementing the example methods and apparatus described herein may alternatively be used. For example, with reference to the flowcharts illustrated in FIGS. 13-18, the order of execution of the blocks may be changed, and/or some of the blocks described may be changed, eliminated, combined and/or subdivided into multiple blocks.

Figure 13:
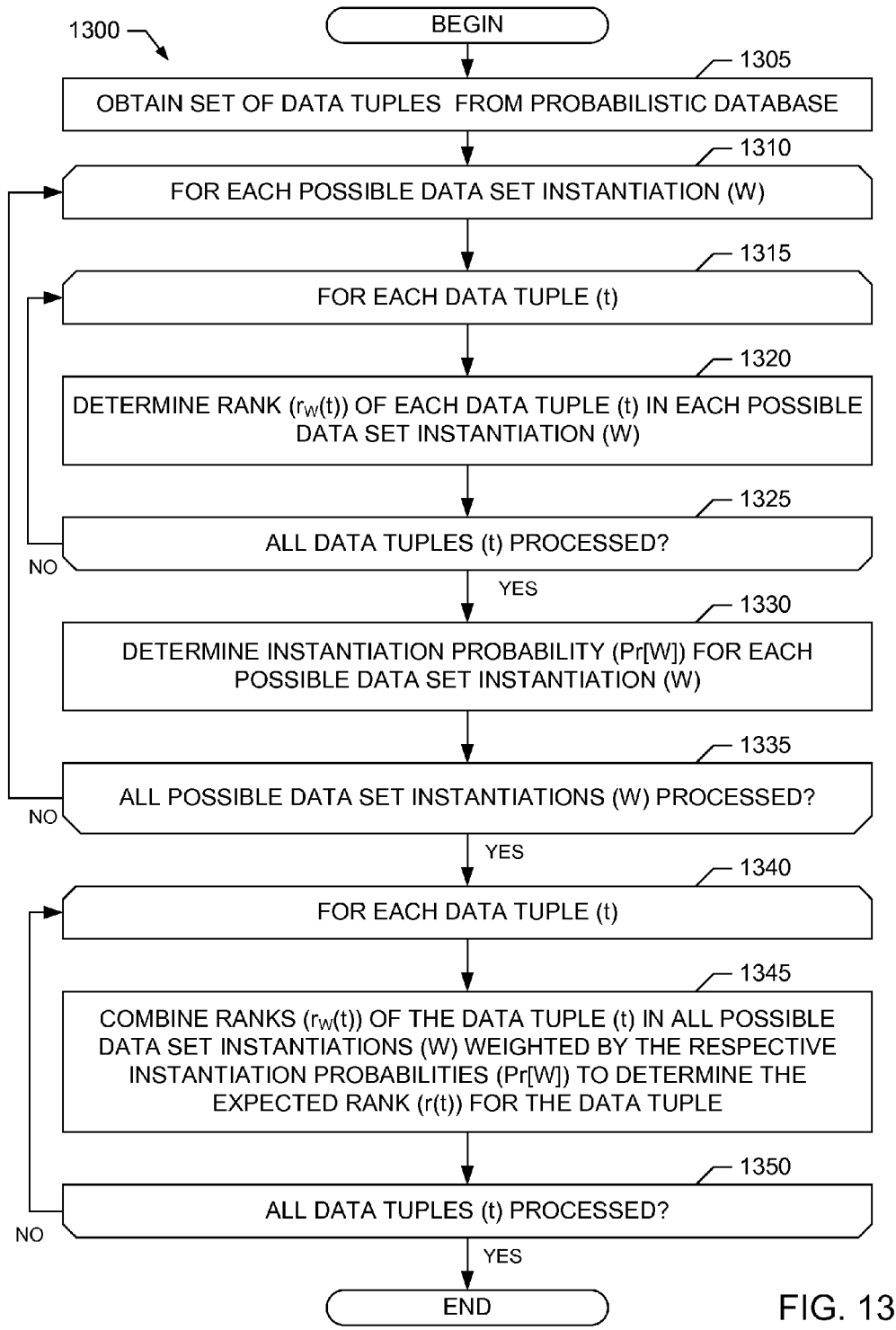
FIG. 13 is a flowchart representative of first example machine readable instructions that may be executed to implement the example expected ranking units of FIGS. 1 and/or 7.

Example machine readable instructions 1300 that may be executed to implement the example expected ranking unit 115 of FIGS. 1 and/or 7 are represented by the flowchart shown in FIG. 13. The example machine readable instructions 1300 may be executed at predetermined intervals, based on an occurrence of a predetermined event, etc., or any combination thereof. With reference to the first example implementation of the expected ranking unit 115 of FIG. 7, the example machine readable instructions 1300 begin execution at block 1305 of FIG. 13 at which the example data set instantiation unit 705 included in the example expected ranking unit 115 obtains the set of data tuples {t} stored in the example probabilistic database 110. Then, at block 1310 the example data set instantiation unit 705 begins determining each possible data set instantiation corresponding to each possible world W included in the set of all possible worlds S capable of being realized from the set of data tuples {t} obtained at block 1305.

Next, control proceeds to block 1315 at which the example per-instantiation component ranking unit 710 begins selecting each tuple $t_i$ from a possible data set instantiation W determined by the example data set instantiation unit 705 at block 1310. Then, at block 1320 the example per-instantiation component ranking unit 710 determines a per-instantiation, or component, rank $rank_W(t_i)$ of the currently selected tuple $t_i$ in the possible data set instantiation W according to Equation 4 as described above. The determined rank $rank_W(t_i)$ is the number of data tuples whose score in the possible data set instantiation W is higher than the tuple $t_i$. Next, at block 1325, if all the data tuples $t_i$ in the possible data set instantiation W determined at block 1310 have not been processed, control returns to block 1315 and blocks subsequent thereto at which the example per-instantiation component ranking unit 710 determines the per-instantiation, or component, rank $rank_W(t_{i+1})$ for the next selected tuple $t_{i+1}$ in the possible data set instantiation W. However, if all data tuples $t_i$ in the possible data set instantiation W determined at block 1310 have been processed (block 1325), control proceeds to block 1330.

At block 1330, the example instantiation probability determination unit 715 included in the example expected ranking unit 115 determines the instantiation probability Pr[W] for the possible data set instantiation W determined at block 1310 as described above in connection with FIG. 7. The instantiation probability Pr[W] determined at block 1330 represents the likelihood of the possible world W occurring among the set of all possible worlds S. Next, at block 1335, if all possible data set instantiations determined by the example data set instantiation unit 705 have not been processed, control returns to block 1310 and blocks subsequent thereto at which the example data set instantiation unit 705 determines a next possible data set instantiation for processing. However, if all possible data set instantiations determined by the example data set instantiation unit 705 have been processed (block 1335), control proceeds to block 1340.

At block 1340, the example expected rank combining unit 720 included in the example expected ranking unit 115 begins selecting each tuple $t_i$ in the set of data tuples {t} obtained at block 1305. Then, at block 1345 the example expected rank combining unit 720 combines the per-instantiation, or component, ranks $rank_W(t_i)$ determined at block 1320 for the current selected tuple $t_i$ in all the possible worlds W after weighting by the respective instantiation probabilities Pr[W] determined at block 1335. The example expected rank combining unit 720 performs such combination of the component ranks $rank_W(t_i)$ and instantiation probabilities Pr[W] according to Equation 5 or Equation 6 as described above in connection with FIG. 7. Next, at block 1350, if all the data tuples $t_i$ in the set of data tuples {t} obtained at block 1305 have not been processed, control returns block 1340 and blocks subsequent thereto at which the example expected rank combining unit 720 combines the component ranks $rank_W(t_{i+1})$ and instantiation probabilities Pr[W] for the next selected tuple $t_{i+1}$ in the set of data tuples {t} obtained at block 1305. However, if all the data tuples $t_i$ in the set of data tuples {t} obtained at block 1305 have been processed (block 1350), execution of the example machine readable instructions 1300 ends.

Figure 14:
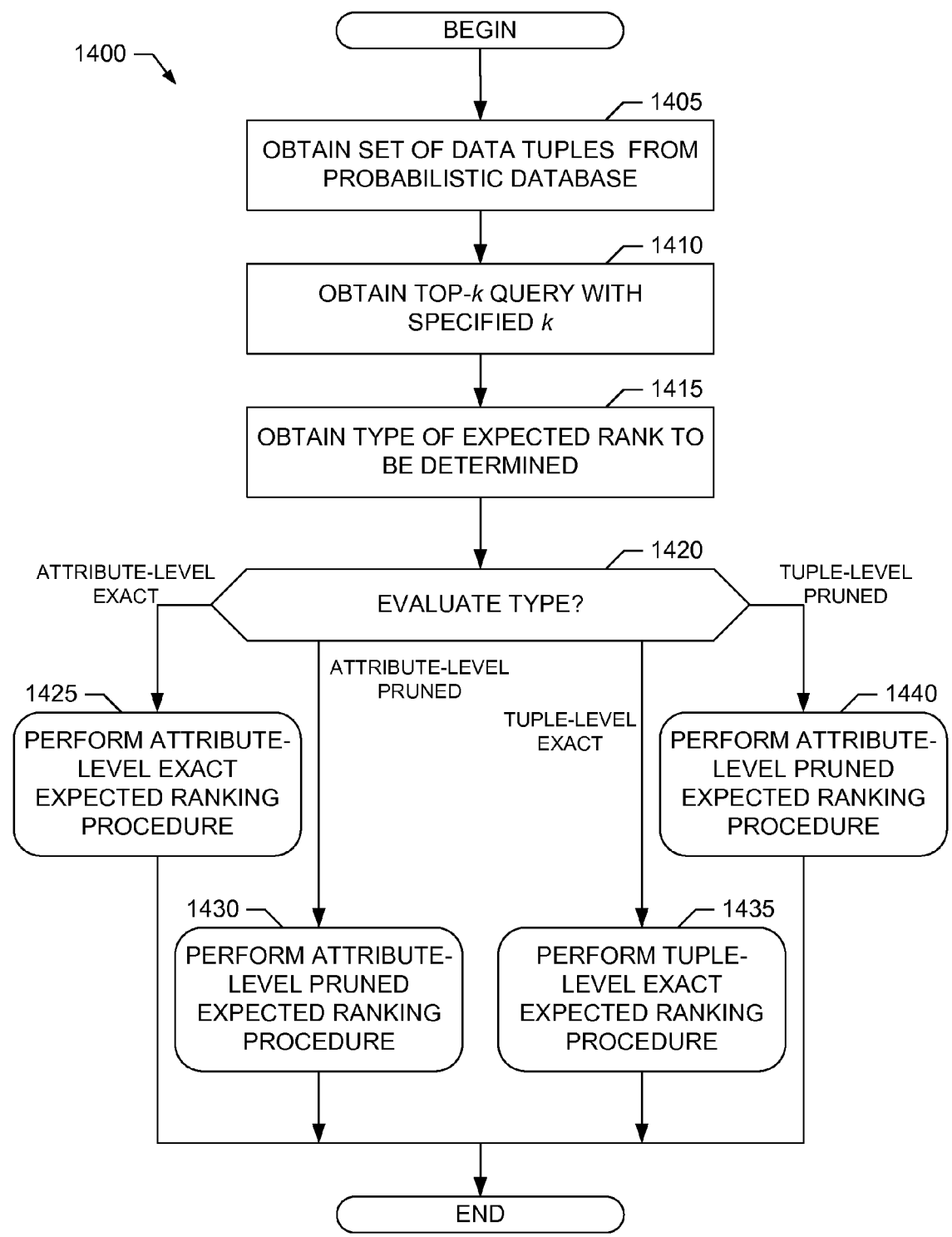
FIG. 14 is a flowchart representative of second example machine readable instructions that may be executed to implement the example expected ranking units of FIGS. 1 and/or 8.

Example machine readable instructions 1400 that may be executed to implement the example expected ranking unit 115 of FIGS. 1 and/or 8 are represented by the flowchart shown in FIG. 14. The example machine readable instructions 1400 may be executed at predetermined intervals, based on an occurrence of a predetermined event, etc., or any combination thereof. With reference to the second example implementation of the example expected ranking unit 115 of FIG. 8, the example machine readable instructions 1400 begin execution at block 1405 of FIG. 14 at which the example expected ranking unit 115 obtains the set of data tuples {t} stored in the example probabilistic database 110. Then, at block the example expected ranking unit 115 obtains a top-k query via, for example, the query interface 140 of the example probabilistic database server 105 of FIG. 1. The top-k query specifies the number of tuples, k, to be returned in response to the top-k query Next, at block 1410 the expected rank type specifier 805 included in the example expected ranking unit 115 obtains a type of expected rank to be determined for the tuples $t_i$ in the set of data tuples {t} obtained at block 1405. The expected ranks determined for the tuples $t_i$ are used to select the k top-ranked tuples in response to the top-k query received at block 1410. In the illustrated example, the type of expected rank can be pre-determined, specified by a user via the example interface terminal 140 and/or determined automatically based on the uncertainty relation used to store the set of data tuples {t} in the probabilistic database 110 and whether pruning is to be employed to reduce the number of tuples that need to be accessed to determine the expected ranks and select the k top-ranked tuples.

Figure 15:
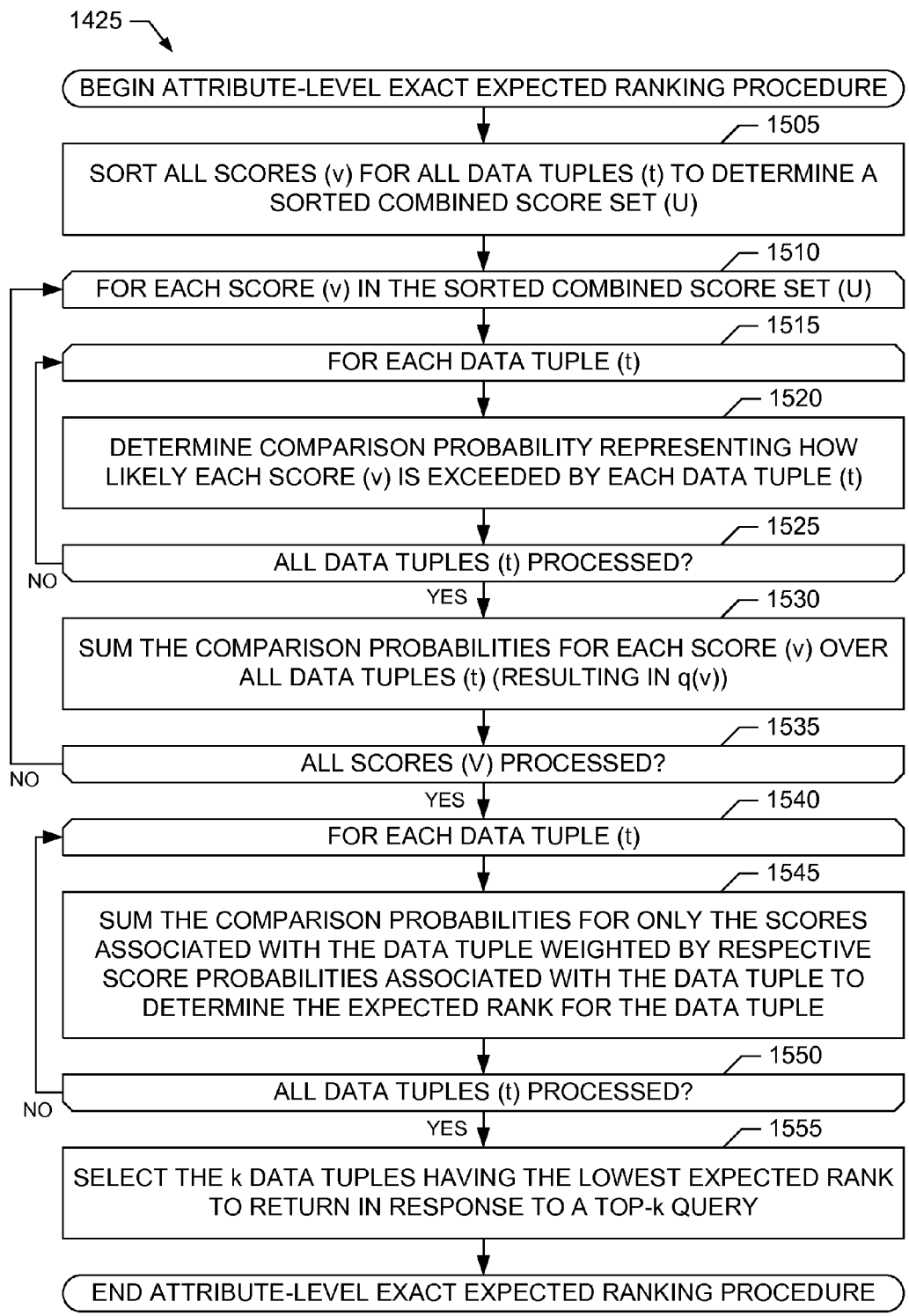
FIG. 15 is a flowchart representative of example machine readable instructions that may be executed to implement an example attribute-level exact expected ranking procedure that may be used to implement the second example machine readable instructions of FIG. 14 and/or the example expected ranking units of FIGS. 1 and/or 8.
Figure 16:
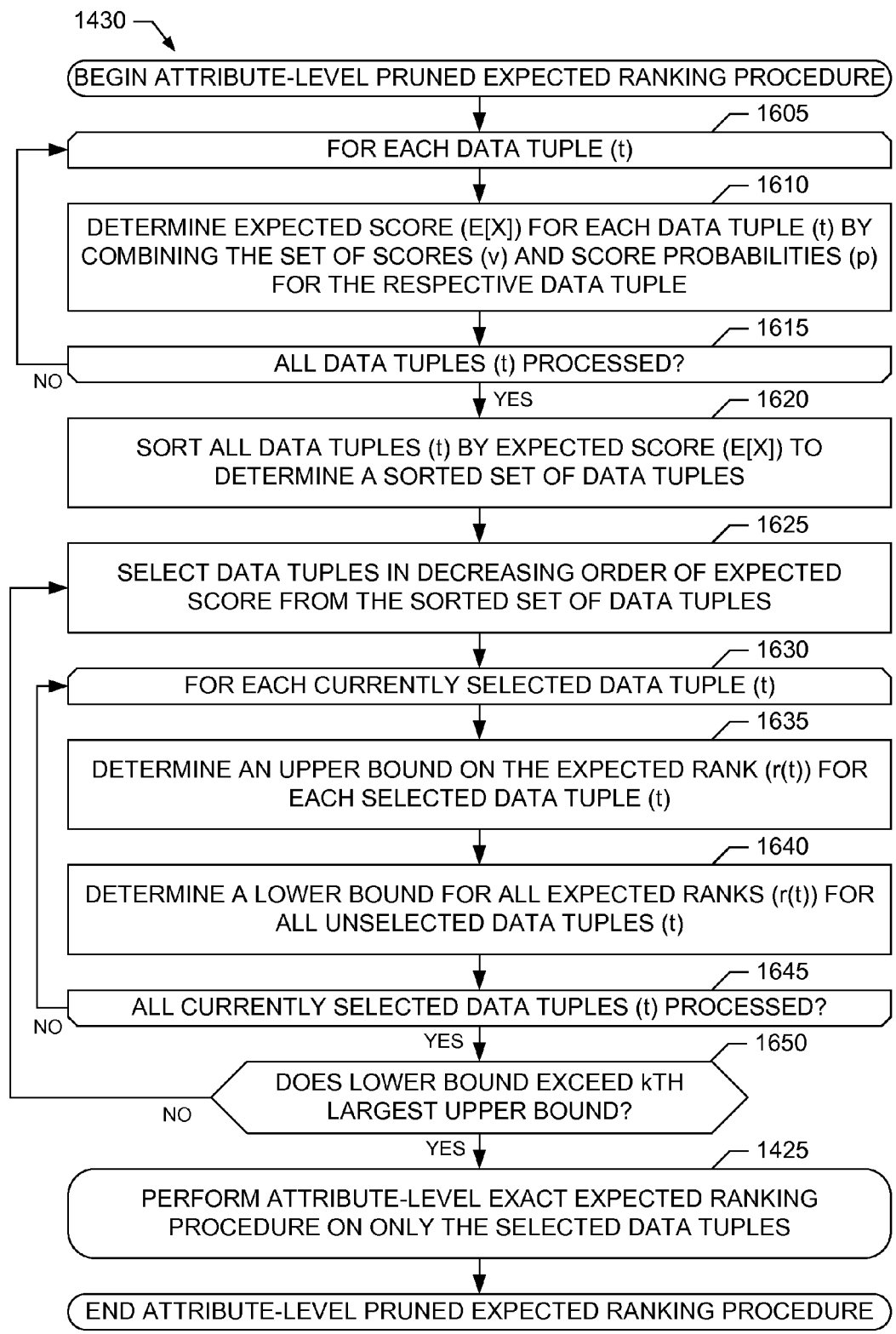
FIG. 16 is a flowchart representative of example machine readable instructions that may be executed to implement an example attribute-level pruned expected ranking procedure that may be used to implement the second example machine readable instructions of FIG. 14 and/or the example expected ranking units of FIGS. 1 and/or 8.

In the illustrated example, control proceeds to block 1420 at which the expected rank type specifier 805 evaluates the expected rank type obtained at block 1415. If the expected rank type corresponds to an attribute-level exact expected rank (block 1420), control proceeds to block 1425 at which the example expected rank type specifier 805 invokes the example attribute-level exact expected ranking unit 810 included in the example expected ranking unit 115 to perform an attribute-level exact expected ranking procedure implementing the A-ERrank technique described above in connection with FIG. 9. Example machine readable instructions that may be used to implement the processing at block 1425 are illustrated in FIG. 15 and described in greater detail below. If, however, the expected rank type corresponds to an attribute-level pruned expected rank (block 1420), control proceeds to block 1430 at which the example expected rank type specifier 805 invokes the example attribute-level pruned expected ranking unit 815 to perform an attribute-level pruned expected ranking procedure implementing the A-ERank-Prune technique described above in connection with FIG. 10. Example machine readable instructions that may be used to implement the processing at block 1430 are illustrated in FIG. 16 and described in greater detail below.

Figure 17:
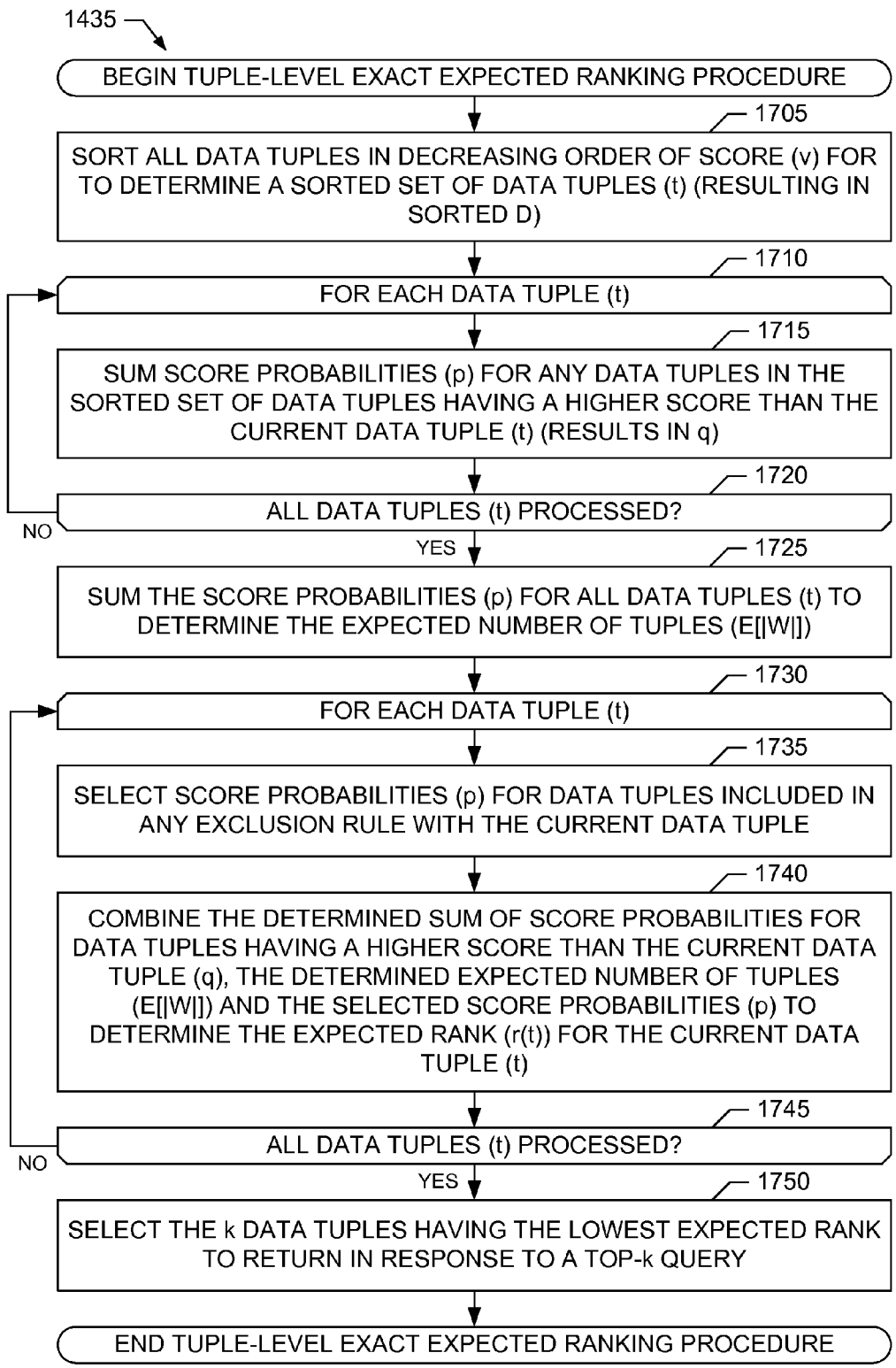
FIG. 17 is a flowchart representative of example machine readable instructions that may be executed to implement an example tuple-level exact expected ranking procedure that may be used to implement the second example machine readable instructions of FIG. 14 the example expected ranking units of FIGS. 1 and/or 8.
Figure 18:
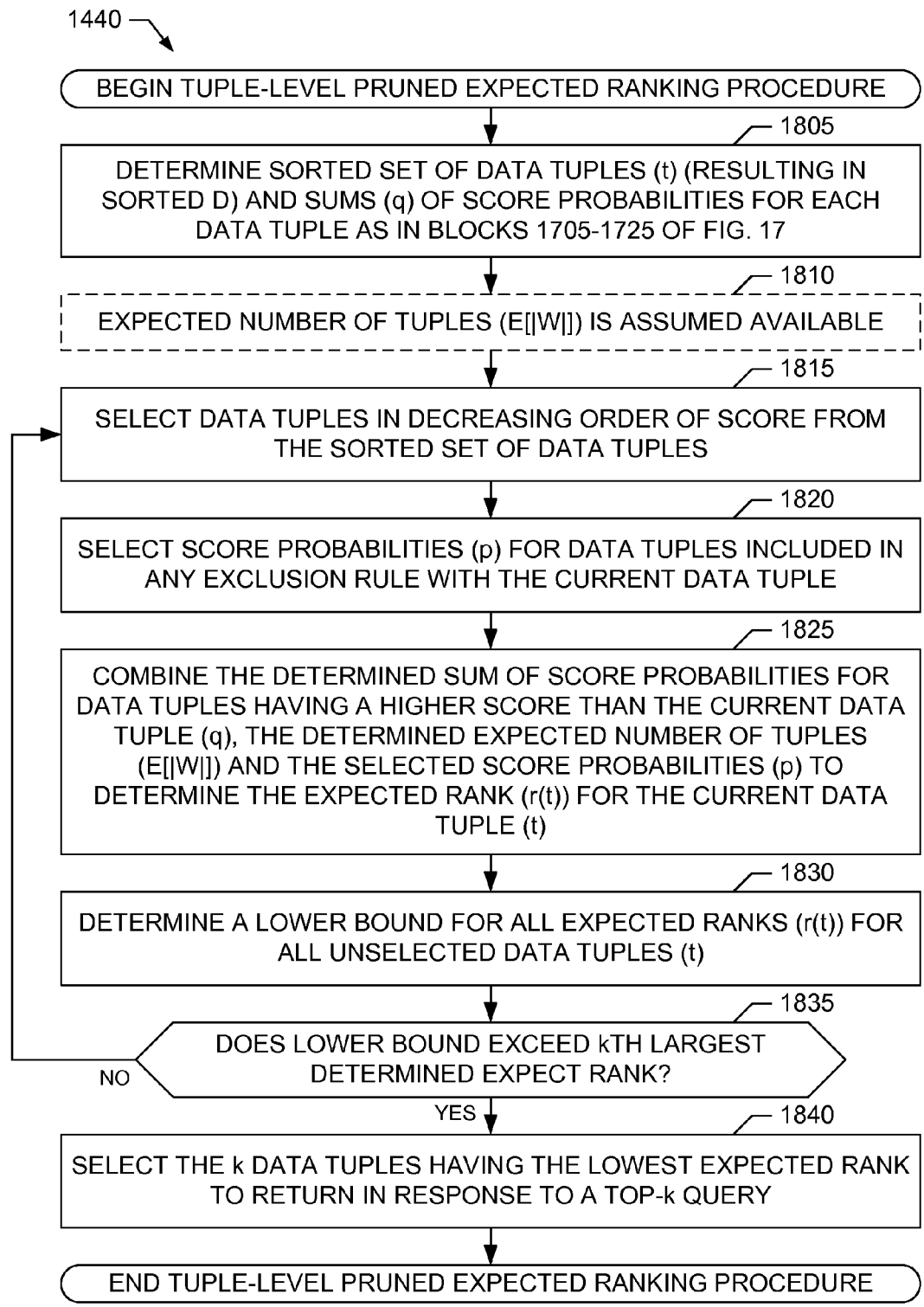
FIG. 18 is a flowchart representative of example machine readable instructions that may be executed to implement an example tuple-level pruned expected ranking procedure that may be used to implement the second example machine readable instructions of FIG. 14 the example expected ranking units of FIGS. 1 and/or 8.

However, if the expected rank type corresponds to a tuple-level exact expected rank (block 1420), control proceeds to block 1435 at which the example expected rank type specifier 805 invokes the example tuple-level pruned expected ranking unit 820 included in the example expected ranking unit 115 to perform a tuple-level exact expected ranking procedure implementing the T-ERrank technique described above in connection with FIG. 11. Example machine readable instructions that may be used to implement the processing at block 1435 are illustrated in FIG. 17 and described in greater detail below. If, however, the expected rank type corresponds to a tuple-level pruned expected rank (block 1420), control proceeds to block 1440 at which the example expected rank type specifier 805 invokes the example tuple-level pruned expected ranking unit 825 to perform a tuple-level pruned expected ranking procedure implementing the T-ERrank-Prune technique described above in connection with FIG. 12. Example machine readable instructions that may be used to implement the processing at block 1440 are illustrated in FIG. 18 and described in greater detail below. Execution of the example machine readable instructions 1400 then ends.

Example machine readable instructions 1425 that may be executed to implement the example attribute-level exact expected ranking unit 810 of FIGS. 8 and/or 9, and/or that may be used to implement the processing performed at block 1425 of FIG. 14 are represented by the flowchart shown in FIG. 15. With reference to the example attribute-level exact expected ranking unit 810 of FIG. 9, the example machine readable instructions 1425 begin execution at block 1505 of FIG. 15 at which the example score sorting unit 905 included in the example attribute-level exact expected ranking unit 810 sorts the universe of all possible score values v of all data tuples t to determine a sorted combined score set U.

Next, control proceeds to block 1510 at which the example comparison probability determination unit 910 included in the example attribute-level exact expected ranking unit 810 begins selecting each score in the sorted combined score set U. Then, at block 1515 the example comparison probability determination unit 910 begins selecting each tuple $t_j$ in the set of data tuples. Control then proceeds to block 1520 at which the example comparison probability determination unit 910 determines a comparison probability $Pr[X_j>v]$ for the score v currently selected at block 1510 and the data tuple $t_j$ currently selected at block 1515. The comparison probability $Pr[X_j>v]$ determined at block 1520 represents how likely the respective score v is exceeded by the data tuple $t_j$. Next, at block 1525, if all of the data tuples $t_j$ have not been processed, control returns to block 1515 and blocks subsequent thereto at which the example comparison probability determination unit 910 determines a comparison probability $Pr[X_{j+1}>v]$ for the score v currently selected at block 1510 and the next data tuple $t_{j+1}$. However, if all of the data tuples $t_j$ have been processed (block 1525), control proceeds to block 1530.

At block 1530, the example comparison probability summation unit 915 included in the example attribute-level exact expected ranking unit 810 determines the sum of comparison probabilities, q(v), for a score v currently selected from the sorted combined score set U at block 1510. Then, at block 1535, if all of the scores v currently in the sorted combined score set U have not been processed, control returns to block 1510 and blocks subsequent thereto at which the example comparison probability determination unit 910 selects a next score v from the sorted combined score set U for processing. If, however, all of the scores v currently in the sorted combined score set U have not been processed (block 1535), control proceeds to block 1540.

At block 1540, the example summed comparison probability combination unit 920 included in the included in the example attribute-level exact expected ranking unit 810 begins selecting each tuple $t_j$ in the set of data tuples. Next, control proceeds to block 1545 at which the example summed comparison probability combination unit 920 determines the expected rank $r(t_i)$ for the data tuple $t_i$ selected at block 1545 by combining the summed comparison probabilities q(v) corresponding to only the set of scores $v_{i,l}$ associated with the selected data tuple $t_i$, with the summed comparison probabilities $q(v_{i,l})$ for a particular score $v_{i,l}$ being weighted by the corresponding score probability $p_{i,l}$ according to Equation 11 as discussed above. Then, at block 1550, if all data tuples have not been processed, control returns to block 1540 and blocks subsequent thereto at which the example summed comparison probability combination unit 920 determines the expected rank $r(t_{i+1})$ for the next selected data tuple $t_{i+1}$. However, if all data tuples have been processed (block 1550), control proceeds to block 1555. at which the example summed comparison probability combination unit 920 selects the k tuples with smallest expected rank determined at block 1545 as the k top-ranked tuples to return in response to a top-k query. Execution of the example machine readable instructions 1425 then ends.

Example machine readable instructions 1430 that may be executed to implement the example attribute-level pruned expected ranking unit 815 of FIGS. 8 and/or 10, and/or that may be used to implement the processing performed at block 1430 of FIG. 14 are represented by the flowchart shown in FIG. 16. With reference to the example attribute-level pruned expected ranking unit 815 of FIG. 10, the example machine readable instructions 1430 begin execution at block 1605 of FIG. 16 at which the example expected score determination unit 1010 included in the attribute-level pruned expected ranking unit 815 selects a data tuple $t_i$ from the set of data tuples. Control then proceeds to block 1610 at which the example expected score determination unit 1010 determines an expected score $E[X_i]$ for the tuple $t_i$ selected at block 1606 by summing the possible scores $v_{i,l}$ for the data tuple $t_i$, with each score weighted by the respective score probability $p_{i,l}$ as described above in connection with FIG. 10. Then, at block 1615, if all data tuples have not been processed, control returns to block 1605 and blocks subsequent thereto at which the the example expected score determination unit 1010 selects a next tuple $t_{i+1}$ for which an expected score $E[X_{i+1}]$. However, if all data tuples have been processed (block 1615), control proceeds to block 1620.

At block 1620, the example expected score sorting unit 1005 included in the example attribute-level pruned expected ranking unit 815 sorts the sorts expected scores for the data tuples in decreasing order such that, if i<j, then $E[X_i] \geq E[X_j]$ for all $1 \leq i,j \leq N$. Then, control proceeds to block 1625 at which the example sorted tuple selection unit 1015 included in the example attribute-level pruned expected ranking unit 815 begins selecting data tuples in decreasing order of expected rank $E[X_i]$ as sorted at block 1620. Next, at blocks 1630 through 1645, the example attribute-level pruned expected ranking unit 815 maintains an upper bound $r^+(t_i)$ for each data tuple $t_i$ selected so far at block 1630 and a lower bound denoted r on the expected ranks for all currently unselected data tuples. In particular, at block 1635, the example upper bound determination unit 1020 included in the example attribute-level pruned expected ranking unit 815 determine an upper bound $r^+(t_i)$ on the expected rank $r(t_i)$ for each selected data tuple $t_i$ using Equation 13 as described above in connection with FIG. 10. At block 1640, the example lower bound determination unit 1025 included in the example attribute-level pruned expected ranking unit 815 determines the lower bound r⁻ on the expected rank r(t$_u$) for all unselected tuples t$_u$ using Equation 15.

After the upper bound r⁺(t$_i$) for each data tuple t$_i$ selected so far at block 1630 and the lower bound denoted r⁻ on the expected ranks for all currently unselected data tuples are determined at blocks 1630-1645, control proceeds to block 1650. At block 1650, the example attribute-level pruned expected ranking unit 815 determines whether k th largest upper bound r⁺(t$_i$) for the expected ranks of the currently selected tuples is less than the lower bound r⁻ on the expected ranks for the unselected tuples. If the k th largest upper bound is not less than the lower bound (block 1650), control returns to block 1625 and blocks subsequent thereto at which the example sorted tuple selection unit 1015 selects the next data tuple in decreasing order of expected rank and updates the upper bounds on the expected ranks for the currently selectd tuples and the lower bound on the expected ranks for the unselected tuples.

However, if the k th largest upper bound is less than the lower bound (block 1650), control proceeds to block 1425. At block 1425, the example attribute-level pruned expected ranking unit 815 performs the attribute-level exact ranking procedure described above in connection with FIG. 15, but for only a curtailed dataset. The curtailed dataset includes only the data tuples which were selected during the iterative processing at block 1625. In the illustrated example, the processing at block 1425 returns the k top ranked data tuples in response to a top-k query. Execution of the example machine readable instructions 1430 then ends.

Example machine readable instructions 1435 that may be executed to implement the example tuple-level exact expected ranking unit 820 of FIGS. 8 and/or 11, and/or that may be used to implement the processing performed at block 1435 of FIG. 14 are represented by the flowchart shown in FIG. 17. With reference to the example tuple-level exact expected ranking unit 820 of FIG. 11, the example machine readable instructions 1435 begin execution at block 1705 of FIG. 17 at which the example tuple sorting unit 1105 included in the example tuple-level exact expected ranking unit 820 sorts the data tuples t$_i$ in decreasing order of their score attributes v$_i$ to determine a sorted set of data tuples.

Next, control proceeds to block 1710 at which the example score probability summation unit 1110 included in the example tuple-level exact expected ranking unit 820 selects each data tuple t$_i$ in the set of data tuples. Then, at block 1715 the example score probability summation unit 1110 determines $$q_i = \sum_{j<i} p(t_j),$$

which is the sum of the score probabilities p(t$_j$) for all data tuples t$_j$ ordered before the data tuple t$_i$ in the sorted score set determined at block 1705. At block 1720, if all data tuples have not been processed, control returns to block 1710 and blocks subsequent thereto at which the example score probability summation unit 1110 selects the next data tuple for which a score probability summation q$_{i+1}$ is to be determined. However, if all data tuples have been processed (block 1720), control proceeds to block 1730.

At block 1730, the example instantiation size determination unit 1115 included in the example tuple-level exact expected ranking unit 820 sums the score probabilities determined at block 1715 to determine the quantity $$E[|W|] = \sum_{j=1}^{N} p(t_j),$$

which is the expected number of tuples averaged over all possible worlds S. Control then proceeds to blocks 1730 through 1745 at which the example tuple-level exact expected ranking unit 820 uses the score probability summation q$_i$ determined at block 1715 and the expected number of tuples E[|W|] determined at block 1725 to determine the expected rank r(t$_i$) for each data tuple t$_i$. In particular, at block 1735 the example exclusion rule evaluation unit 1120 included in the example tuple-level exact expected ranking unit 820 selects score probabilities for data tuples included in an exclusion rule τ with a currently selectd tuple t$_i$ for which the expected rank r(t$_i$) is to be determined. At block 1740, the example score probability combination unit 1125 included in the example tuple-level exact expected ranking unit 820 combines the score probability summation q$_i$ determined at block 1715, the expected number of tuples E[|W|] determined at block 1725 and the score probabilities selected at block 1735 according to Equation 18 as described above to determine the expected rank r(t$_i$) for the currently selected tuple t$_i$.

After the expected ranks for all tuples are determined at blocks 1730-1745, control proceeds to block 1750 at which the example tuple-level exact expected ranking unit 820 selects the k tuples with the smallest expected ranks r(t$_i$) to return in response to a top-k query. Execution of the example machine readable instructions 1435 then ends.

Example machine readable instructions 1440 that may be executed to implement the example tuple-level pruned expected ranking unit 825 of FIGS. 8 and/or 12, and/or that may be used to implement the processing performed at block 1440 of FIG. 14 are represented by the flowchart shown in FIG. 18. With reference to the example tuple-level pruned expected ranking unit 825 of FIG. 12, the example machine readable instructions 1440 begin execution at block 1805 of FIG. 18 at which the example tuple-level pruned expected ranking unit 825 determines the sorted set of data tuples and the score probability summations q$_i$ for the set of tuples t$_i$ as in blocks 1705-1725 of FIG. 17, which are described above in greater detail. Additionally, block 1810 represents the assumption that the expected number of tuples E[|W|] is known and available and, therefore, no processing is required at block 1810.

Then, given the preceding preliminary information, control proceeds to block 1815 at which the example sorted tuple selection unit 1205 included in the example tuple-level pruned expected ranking unit 825 selects a next data tuple t$_n$ in decreasing order of score from the sorted set of tuples. Control then proceeds to block 1820 at which the example exclusion rule evaluation unit 1120 included in the example tuple-level pruned expected ranking unit 825 selects score probabilities for data tuples included in an exclusion rule τ with a currently selectd tuple t$_n$ for which the expected rank r(t$_n$) is to be determined. Next, at block 1825, the example score probability combination unit 1125 included in the example tuple-level pruned expected ranking unit 825 combines the score probability summation q$_n$ for the selected tuple t$_n$, the expected number of tuples E[|W|] and the score probabilities selected at block 1820 according to Equation 18 as described above to determine the expected rank r(t$_n$) for the currently selected tuple t$_n$.

Control next proceeds to block 1830 at which the example lower bound determination unit 1210 included in the example tuple-level pruned expected ranking unit 825 determines a lower bound on the expected ranks r(t$_l$) for all unselected tuples t$_l$, l>n. For example, at block 1830 the example lower bound determination unit 1210 determines the lower bound on the expected ranks r(t$_l$) for all unselected tuples based on the score probability summation q$_n$ for the selected tuple t$_n$ according to Equation 21 as described above. Next, control proceeds to block 1835 at which the example tuple-level pruned expected ranking unit 825 determines whether the lower bound determined at block 1830 exceeds the k th largest expected rank determined for the currently selected tuples. If the lower bound does not exceed the k th largest expected rank (block 1835), control returns to block 1815 and blocks subsequent thereto at which the example sorted tuple selection unit 1205 selects a next data tuple t$_{n+1}$ in decreasing order of score from the sorted set of tuples. However, if the lower bound does exceed the k th largest expected rank (block 1835), control proceeds to block 1840 at which the example tuple-level pruned expected ranking unit 825 selects the k tuples with the smallest expected ranks r(t$_l$) to return in response to a top-k query. Execution of the example machine readable instructions 1440 then ends.

Example performance results for the first and second example implementations of the expected ranking unit 115 illustrated in FIGS. 7-12 are illustrated in FIGS. 19-25. To generate these example performance results, examples of the expected rank techniques described herein were implemented in GNU C++ and executed on a Linux machine having a central processing unit (CPU) operating at 2 GHz and main memory of 2 GB. Several data generators were implemented to generate synthetic data sets for both the attribute-level and tuple-level uncertainty models. Each generator controlled the distributions of score values and score probabilities for the data tuples representing the uncertain data. For both models, these distributions represent the universe of score values and score probabilities when the union of all tuples in D is taken. The distributions examined include uniform, Zipfian and correlated bivariate distributions, abbreviated herein as "u," "zipf" and "cor," respectively. For each tuple, a score and probability value was drawin independently from the score distribution and probability distribution respectively. In the following, the result of drawing from these two distributions is referred to by the concatenation of the abbreviation for the score distribution followed by the abbreviation for the score probability distribution. For example, uu indicates a data set with uniform distributions for both score values and score probabilities, whereas zipfu indicates a Zipfian distribution of score values and a uniform distribution on the score probabilities. In the illustrated examples, the default skewness parameter for the Zipfian distribution was 1.2, and the default value of k was k=100.

Figure 19:
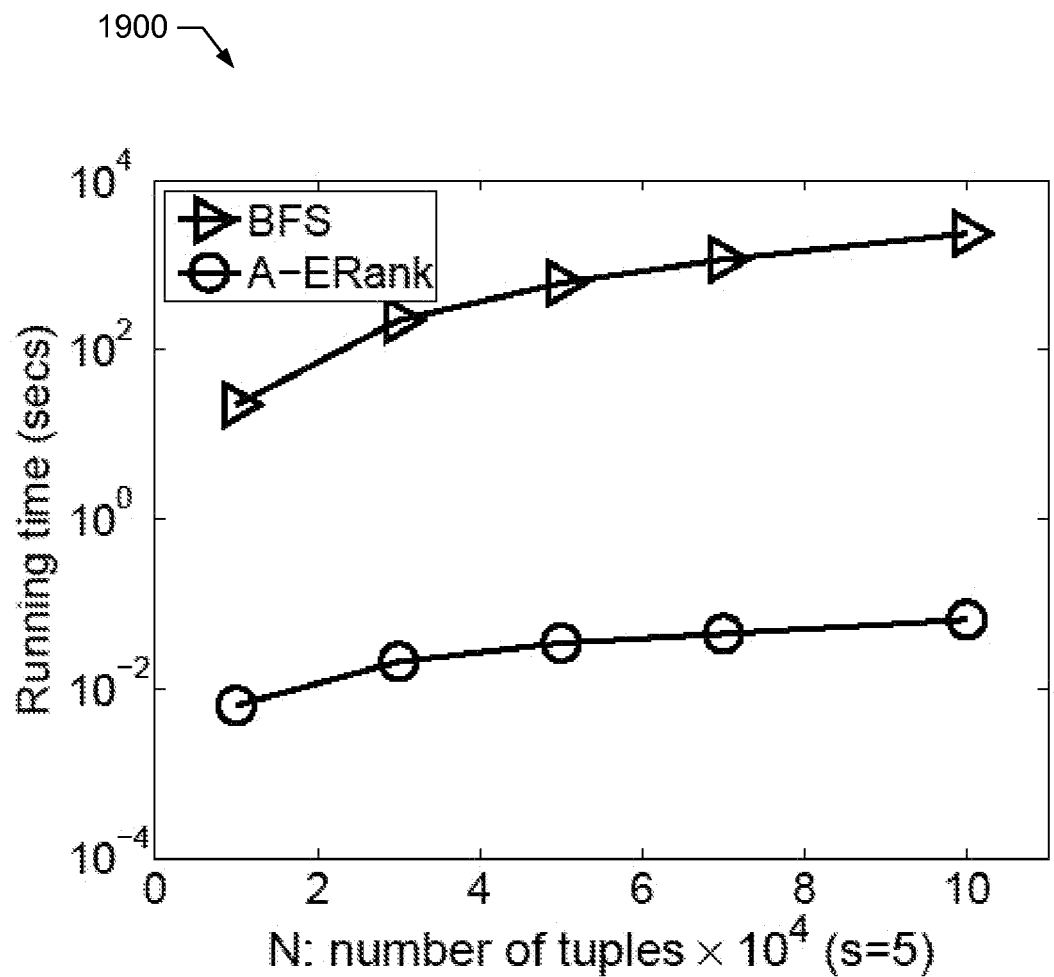
FIGS. 19-25 illustrate example performance results for the first and second example expected ranking unit implementations of FIGS. 7-12.
Figure 20:
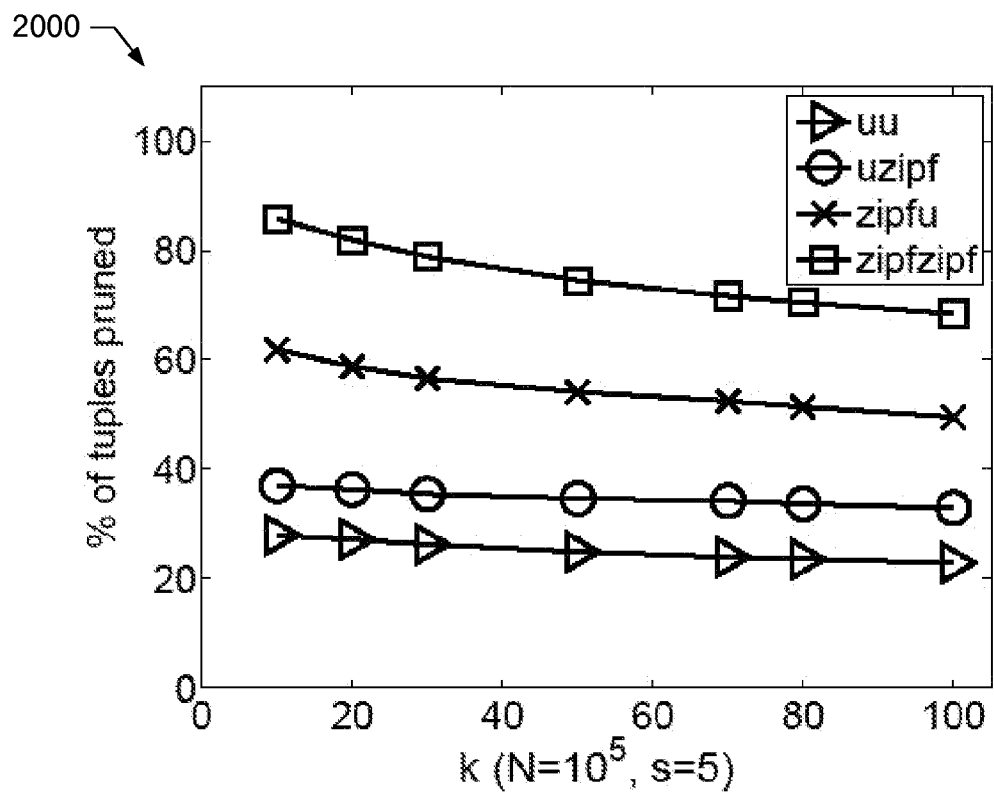
Figure 21:
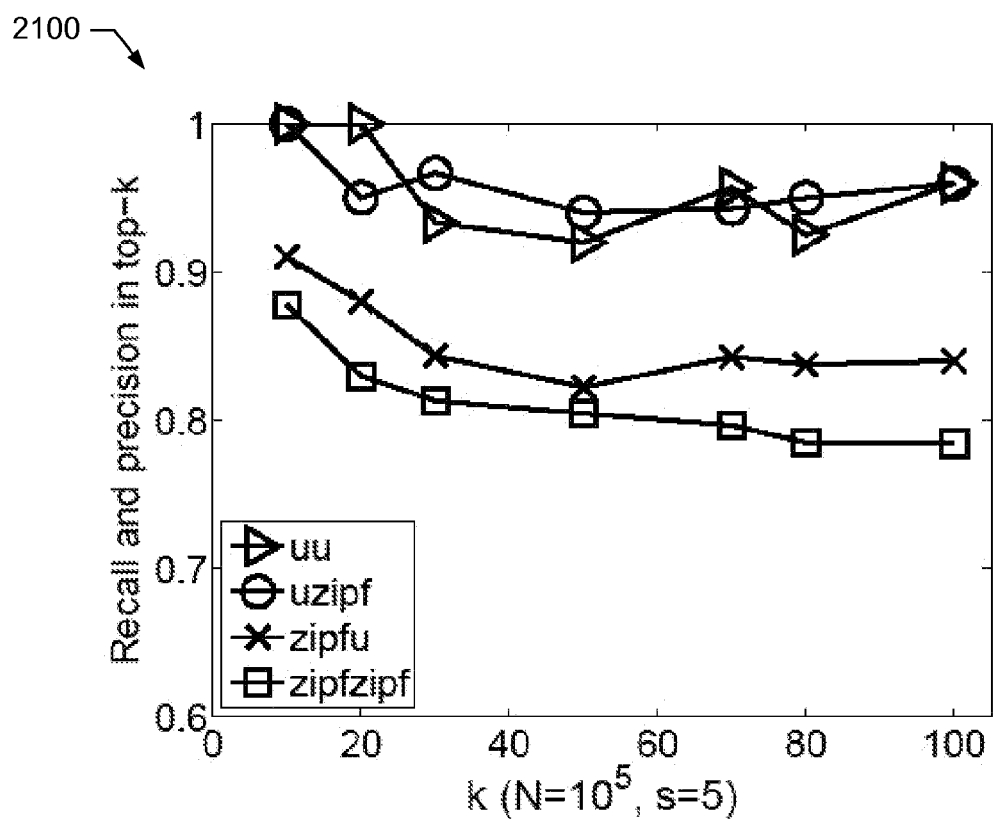

FIGS. 19-21 illustrate performance results for determining expected ranks for uncertain data represented using an attribute-level uncertainty model. FIG. 19 illustrates the performance of the example attribute-level exact expected ranking unit 810 implementing the A-ERank technique described above in connection with FIG. 9 relative to the brute-force search (BFS) technique for determining expected ranks represented by Equation 5 and implemented by the example expected ranking unit 115 of FIG. 7 as discussed above. The score probability distribution does not affect the performance of either technique because both the A-ERank and BFS techniques determine the expected ranks of all tuples. However, while score value distribution does not affect BFS, it does affect A-ERank. For example, the uniform score distribution results in the worst performance given a fixed number of tupless because it results in a large set of possible values, U, that needs to be processed by the A-ERank technique. Therefore, a uu data set was used to generate a performance graph 1900 illustrated in FIG. 19, with each tuple having five (s=5) score (v$_{i,j}$) and score probability (p$_{i,j}$) pairs.

The example performance graph 1900 of FIG. 19 depicts the total running time of example implementations of the A-ERank and BFS techniques as the number of tuples, N, in the attribute-level uncertainty relation D in a range from about 10,000 tuples up to 100,000 tuples. As illustrated by the example performance graph 1900, the A-ERank technique outperforms BFS technique by up to six orders of magnitude, with the improvement increasing steadily as N gets larger. For example, A-ERank takes only about 10 ms to determine expected ranks for all tuples when the number of tuples is N=100,000, whereas the BFS technique takes approximately ten minutes. Similar results were observed for data tuples having other numbers (s) of score and score probability pairs.

FIG. 20 illustrates the benefits of pruning associated with the A-ERank-Prune technique implemented by the example attribute-level pruned expected ranking unit 815 described above in connection with FIG. 10. For example, the performance graph 2000 of FIG. 20 illustrates the number of tuples that are pruned (e.g., not accessed) to determine expected ranks in response to a top-k query when the number of tuples, N, in the attribute-level uncertainty relation D is 100,000 tuples and each tuple has s=5 score and score probability pairs. In the example performance graph 2000, the size of the top-k query, k, is varied from 10 to 100, The example performance graph 2000 depicts that often only a small number of tuples in D (ordered by expected score) need to be accessed to determine the tuples having the top-k expected ranks. Additionally, the example performance graph 2000 illustrates that a skewed distribution for either score values or score probabilities improve the pruning benefits exhibited by the A-ERank-Prune technique. For example, when both the score and score probabilities both distributions are skewed (e.g., corresponding to the zipfzipf case), the A-ERank-Prune determined the top-k expected ranks after accessing less than 20% of the tuples in the uncertainty relation D. However, the example performance graph 2000 demonstrates that pruning benefits were seen even for uniform distributions of scores and score probabilities.

As discussed above in connection with FIG. 10, the A-ERank-Prune technique implemented by the example attribute-level pruned expected ranking unit 815 returns an approximate ranking of top-k tuples according to expected rank. The example performance graph 2100 of FIG. 21 depicts the approximation quality of the A-ERank-Prune technique for various data sets using standard precision and recall metrics. Because A-ERank-Prune always returns k tuples, its recall and precision metrics are the same. The example performance graph 2100 of FIG. 21 illustrates that A-ERank-Prune achieves high approximation quality. For example, recall and precision are both in the 90th percentile when the score values are uniformly distributed (corresponding to the uu and uzipf cases). The worst case occurs when the data is skewed in both the score and score probability dimensions (corresponding to the zipfzipf case), where the potential for pruning is greatest. The reason for the illustrated decrease in recall and precision for this scenario is that, as more tuples are pruned, the pruned (e.g., unselected) tuples have a greater chance to affect the expected ranks of the observed tuples. Even though the pruned tuples all have low expected scores, they could still be associated with one or more values having a high probability to be ranked above one or more of the selected tuples, because of the heavy tail associated with a skewed distribution. However, even in the illustrated worst case, the recall and precision of A-ERank-Prune is about 80% as illustrated in the example performance graph 2100 of FIG. 21.

FIGS. 22-25 illustrate performance results for determining expected ranks for uncertain data represented using a tuple-level uncertainty model. In the illustrated examples, the tuple-level uncertainty models employed exclusion rules in which approximately 30% of tuples were included in rules with other tuples. Although not shown, experiments with a greater or lesser degree of exclusion among tuples yielded similar results. Additionally, similar to the results in FIG. 19 for the attribute-level model, the example tuple-level exact expected ranking unit 820 implementing the T-ERank technique described above in connection with FIG. 11 exhibited better running time performance relative to the BFS technique for determining expected ranks represented by Equation 5 and implemented by the example expected ranking unit 115 of FIG. 7 as discussed above. For brevity, these results are not included herein.

Figure 22:
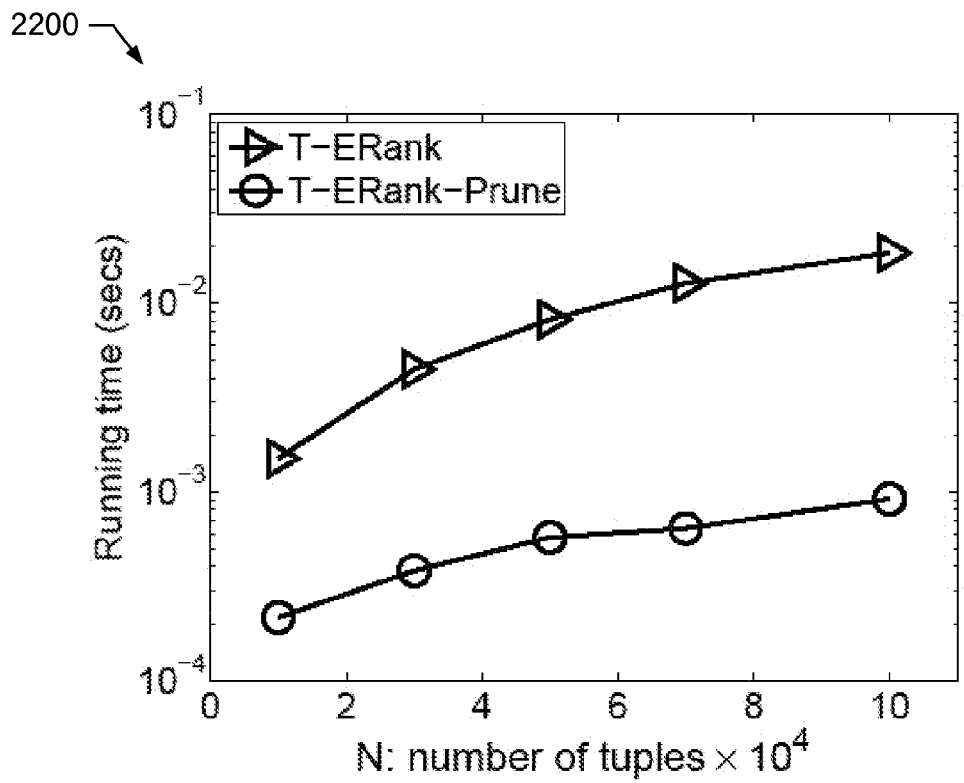

As discussed above in connection with FIG. 12, unlike the attribute-level pruning technique, the tuple-level pruning technique T-ERank-Prune implemented by the example tuple-level pruned expected ranking unit 825 determines the exact, rather than an approximate, top-k tuples according to expected rank provided that E[|W|], the expected number of tuples of D, is known. The example performance graph 2200 in FIG. 22 illustrates the total running time for the T-ERank and T-ERank-Prune techniques using uu data. The example performance graph 2200 shownns that both techniques are extremely efficient. For example, for 100,000 tuples, the T-ERank techniques takes about 10 milliseconds to compute the expected ranks for all tuples. Applying pruning, the T-ERank-Prune technique finds the same k smallest ranks in just 1 millisecond. Even so, T-ERank is still highly efficient, especially in scenarios when E[|W|] is unavailable.

Figure 23:
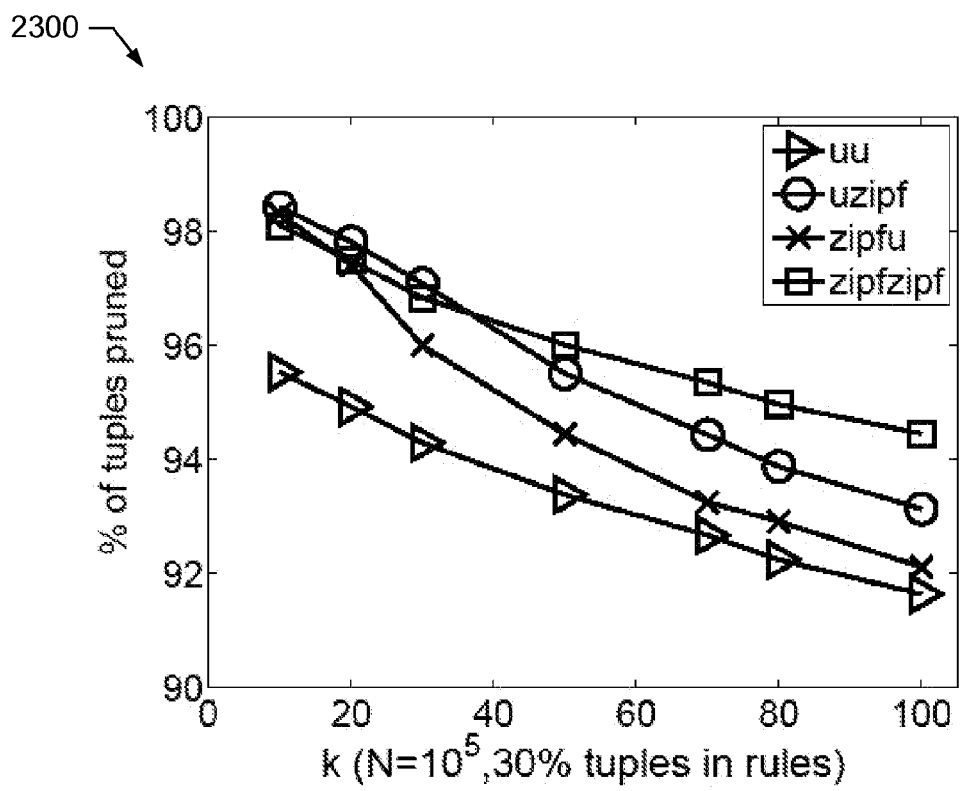
Figure 24:
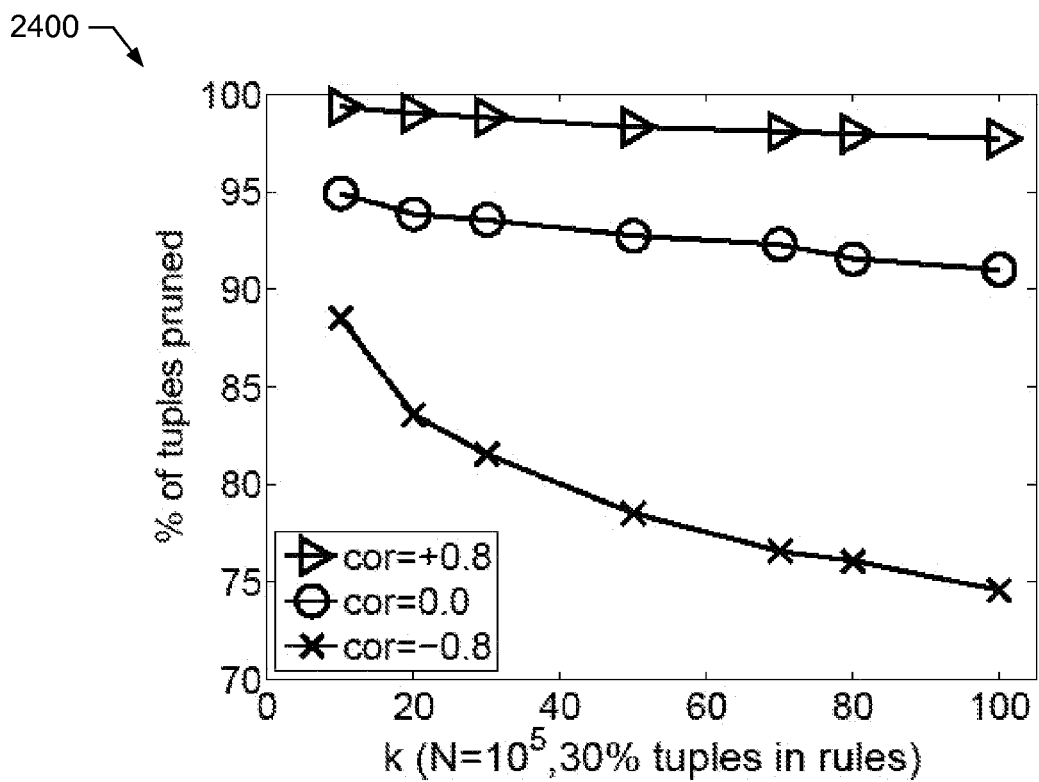
Figure 25:
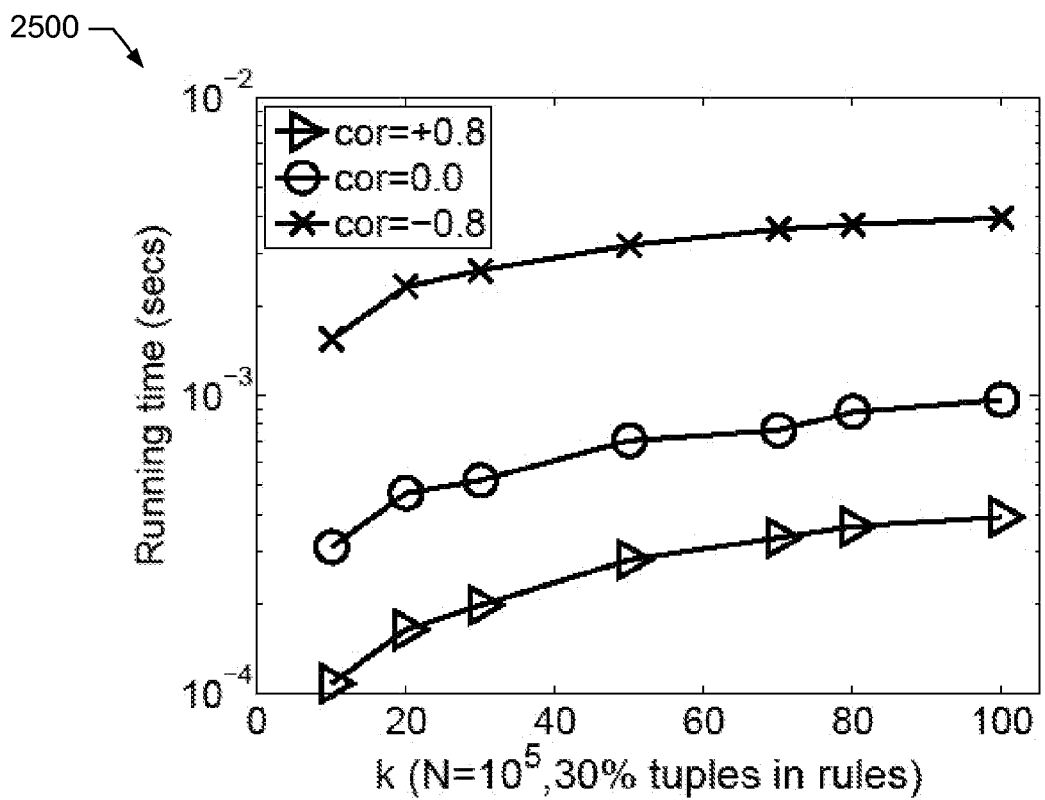

The example performance graph 2300 of FIG. 23 illustrated the pruning capabilities of the T-ERank-Prune for different data sets. In the illustrated example, the number of data tuples was set to N=100,000 and the number of top-k tuples to return was varied. As expected, a skewed distribution on either dimension (e.g., corresponding to the uu, uzipf and zipfu cases) increased the pruning capability of T-ERank-Prune. Additionally, even in the worst case of processing the uu data set, T-ERank-Prune was able to prune more than 90% of tuples FIGS. 24 and 25 illustrated the impact of correlations between a tuple's score value and score probability. As used herein, a score value and a respective score probability are positively correlated for a particular tuple when the tuple has a high score value and also a high probability. Similarly, a score value and a respective score probability are negatively correlated when the tuple has a high score but a low probability, or vice versa. Such correlations do not impact the performance of the T-ERank technique because it computes the expected ranks for all tuples. However, correlation does have an effect on the pruning capability of the T-ERrank-Prune technique. For exampe, the performance graph 2400 of FIG. 24 depicts the pruning capability of the T-ERank-Prune technique for correlated bivariate data sets of N=100,000 data tuples having different correlation degrees. The example performance graph 2400 illustrates that a strongly positively correlated data set with a +0.8 correlation degree allows a significantly better amount of pruning than a strongly negatively correlated data set with a −0.8 correlation degree. However, even for the strongly negatively correlated data set, T-ERank-Prune still pruned more than 75% of tuples as shown in the example performance graph 2400. The performance graph 2500 of FIG. 25 illustrates the running time for the example of FIG. 24 and shows that the T-ERank-Prune technique requires between 0.1 and 5 milliseconds to process 100,000 uncertain tuples.

Figure 26:
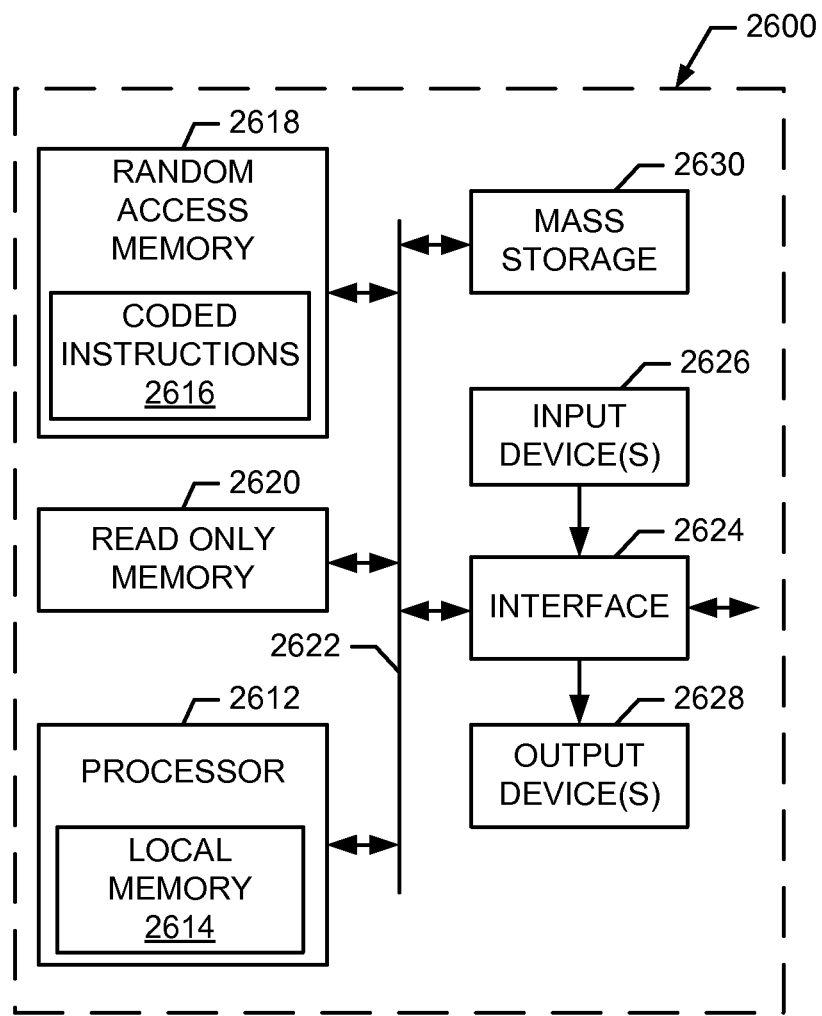
FIG. 26 is a block diagram of an example processing system that may execute the example machine readable instructions of FIGS. 13-18 to implement the example expected ranking unit of FIG. 1 and/or the first and/or second example expected ranking unit implementations of FIGS. 7-8.

FIG. 26 is a block diagram of an example computer 2600 capable of implementing the apparatus and methods disclosed herein. The computer 2600 can be, for example, a server, a personal computer, a personal digital assistant (PDA), an Internet appliance, a DVD player, a CD player, a digital video recorder, a personal video recorder, a set top box, or any other type of computing device.

The system 2600 of the instant example includes a processor 2612 such as a general purpose programmable processor. The processor 2612 includes a local memory 2614, and executes coded instructions 2616 present in the local memory 2614 and/or in another memory device. The processor 2612 may execute, among other things, the machine readable instructions represented in FIGS. 13-18. The processor 2612 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 2612 is in communication with a main memory including a volatile memory 2618 and a non-volatile memory 2620 via a bus 2622. The volatile memory 2618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2620 may be implemented by flash memory and/or any other desired type of memory device. Access to the main memory 2618, 2620 is typically controlled by a memory controller (not shown).

The computer 2600 also includes an interface circuit 2624. The interface circuit 2624 may be implemented by any type of interface standard, such as an Ethernet interface, a universal serial bus (USB), and/or a third generation input/output (3GIO) interface.

One or more input devices 2626 are connected to the interface circuit 2624. The input device(s) 2626 permit a user to enter data and commands into the processor 2612. The input device(s) can be implemented by, for example, a keyboard, a mouse, a touchscreen, a track-pad, a trackball, an isopoint and/or a voice recognition system.

One or more output devices 2628 are also connected to the interface circuit 2624. The output devices 2628 can be implemented, for example, by display devices (e.g., a liquid crystal display, a cathode ray tube display (CRT)), by a printer and/or by speakers. The interface circuit 2624, thus, typically includes a graphics driver card.

The interface circuit 2624 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 2600 also includes one or more mass storage devices 2630 for storing software and data. Examples of such mass storage devices 2630 include floppy disk drives, hard drive disks, compact disk drives and digital versatile disk (DVD) drives. The mass storage device 2630 may implement the example data tuple storage 205. Alternatively, the volatile memory 2618 may implement the example data tuple storage 205.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method implemented by a database server to rank non-deterministic data stored in a database, the method comprising:

storing a set of data tuples representing a plurality of possible instantiations of the non-deterministic data in a database memory, a first data tuple in the set of data tuples taking on a first one of a set of possible data tuple instantiations selectable according to a first probability representing a likelihood of occurrence of the first one of the set of possible data tuple instantiations, respective ones of the possible instantiations of the non-deterministic data being realized when the database server selects a respective combination of possible data tuple instantiations for a combination of data tuples in the set of data tuples, the respective ones of the possible instantiations of the non-deterministic data being associated with respective instantiation probabilities;

in response to a query requesting a first number of data tuples collectively exhibiting a highest ranking among the set of data tuples, determining, using a processor, a ranking of the set of data tuples for output by the database server by determining an expected rank for the first data tuple, the expected rank for the first data tuple corresponding to a combination of multiple weighted component ranks for the first data tuple across the plurality of possible instantiations of the non-deterministic data, respective ones of the weighted component ranks for the first data tuple comprising a component rank, which represents a respective rank of the first data tuple in a respective one of the possible instantiations of the non-deterministic data, weighted by the respective instantiation probability for the respective one of the possible instantiations of the non-deterministic data; and outputting a first ranked subset of the data tuples containing the first number of data tuples determined to exhibit the highest ranking among the set of data tuples, wherein the first ranked subset of the data tuples exhibits all of an exactness property, a containment property, a unique ranking property, a value invariance property and a stability property.

2. The method as defined in claim 1 wherein:

the first ranked subset of the data tuples exhibits the exactness property when the first ranked subset of the data tuples comprises exactly the first number of data tuples;

the first ranked subset of the data tuples exhibits the containment property when the first ranked subset of the subset of the data tuples is included in a second ranked subset of the subset of the data tuples determined in response to a query requesting a second number of data tuples collectively exhibiting a highest ranking among the set of data tuples, the second number of data tuples being greater than the first number of data tuples;

the first ranked subset of the data tuples exhibits the unique ranking property when each data tuple included in the first ranked subset of the data tuples is assigned a unique rank;

the first ranked subset of the data tuples exhibits the value invariance property when an ordering of the data tuples included in the first ranked subset of the data tuples is to remain unchanged if a first score associated with the first data tuple is to be altered without changing an ordering of all scores associated with all data tuples included in the first ranked subset of the data tuples; and the first ranked subset of the data tuples exhibits the stability property when increasing a likelihood or an importance of the first data tuple relative to other data tuples included in the first ranked subset of the data tuples does not remove the first data tuple from the first ranked subset of the data tuples.

3. The method as defined in claim 1 wherein each data tuple corresponds to a measurement obtained from a sensor, the measurement having a non-deterministic characteristic.

4. The method as defined in claim 1 further comprising:
determining a first rank of the first data tuple, the first rank representative of a first ranking of the first data tuple when realized into a first one of the possible instantiations of the non-deterministic data;
determining a second rank of the first data tuple, the second rank representative of a second ranking of the first data tuple when realized into a second one of the possible instantiations of the non-deterministic data; and
combining the first rank weighted by a first instantiation probability with the second rank weighted by a second instantiation probability to determine the expected rank of the first data tuple across the plurality of possible instantiations of the non-deterministic data instantiations.

5. The method as defined in claim 1 wherein each data tuple is associated with a respective set of scores paired with a respective set of score probabilities forming a respective set of score and score probability pairings, a particular score and score probability pairing representing a particular data tuple instantiation of the respective data tuple, a score in the particular pairing determined by evaluating a scoring function for a value of an uncertain attribute associated with the particular data tuple instantiation and a corresponding score probability in the particular pairing representing how likely the particular data tuple instantiation of the respective data tuple is to occur.

6. The method as defined in claim 5 wherein the first data tuple is associated with a respective first set of scores paired with a respective first set of score probabilities, the method further comprising:
sorting a combined score set comprising all sets of scores associated with all data tuples in the set of data tuples to determine a sorted combined score set;
for each score in the sorted combined score set and each data tuple in the set of data tuples, determining a respective comparison probability representing how likely the respective score is exceeded by the respective data tuple;
for each score, summing the respective comparison probabilities for all data tuples to determine a comparison probability sum for the respective score; and
summing the comparison probability sums corresponding to only the first set of scores weighted respectively by the first set of score probabilities to determine the expected rank for the first data tuple.

7. The method as defined in claim 5 further comprising:
for each data tuple included in the set of data tuples, determining an expected score for the respective data tuple by combining the respective set of score and score probability pairings associated with the respective data tuple;
selecting data tuples in decreasing order of expected score for inclusion in a second subset of the set of data tuples;
upon each data tuple selection, determining an upper bound for an expected rank for each selected data tuple based on a smallest expect score among all selected data tuples and a size of the second subset of the set of data tuples;
upon each data tuple selection, determining a lower bound for all expected ranks for all unselected data tuples based on the smallest expect score among all selected data tuples and the size of the second subset of the set of data tuples; and
stopping selection of data tuples for inclusion in the second subset of the set of data tuples when the determined lower bound for all expected ranks for all unselected data tuples exceeds the determined upper bound for the expected rank for a particular selected data tuple.

8. The method as defined in claim 7 further comprising:
determining a curtailed set of data tuples comprising all selected data tuples but not any unselected data tuples; and
determining an approximate expected rank for each data tuple in the curtailed set of data tuples.

9. The method as defined in claim 1 wherein each data tuple is associated with a respective score and a respective score probability, the respective score determined by evaluating a scoring function for a value of an uncertain attribute associated with the particular data tuple, the respective score probability representing how likely the respective data tuple will be included in the plurality of possible instantiations of the non-deterministic data, the first set of possible data tuple instantiations for the first data tuple including (1) a first possible data tuple instantiation corresponding to the first data tuple being selected for inclusion in one of the possible instantiations of the non-deterministic data, and (2) a second possible data tuple instantiation corresponding to the first data tuple not being selected for inclusion in the one of the possible instantiations of the non-deterministic data.

10. The method as defined in claim 9 further comprising:
using a set of exclusion rules to determine which data tuples are included in each of the plurality of possible instantiations of the non-deterministic data, each data tuple being included in only one exclusion rule, each exclusion rule including one or more data tuples, any pair of data tuples occurring in a particular exclusion rule not being included together in any of the possible instantiations of the non-deterministic data;
sorting the set of data tuples in decreasing order of score to determine a sorted set of data tuples;
for each data tuple in the sorted set of data tuples, summing the score probabilities associated with all data tuples ordered before the respective data tuple in decreasing order of score to determine a first quantity;
summing the respective score probabilities associated with all data tuples to determine a second quantity; and
for the first data tuple, combining the first quantity and the second quantity with score probabilities associated with at least some data tuples included with the first data tuple in a first exclusion rule to determine the expected rank for the first data tuple.

11. The method as defined in claim 10 wherein the first data tuple corresponds to a highest score in the sorted set of data tuples, the method further comprising:
in decreasing order of score, selecting data tuples from the sorted set of data tuples for inclusion in a second subset of the set of data tuples;
upon data tuple selection, determining an expected rank for each selected data tuple by combining the first quantity and the second quantity with score probabilities associated with at least some of the data tuples included in an exclusion rule also including the selected data tuple;
upon data tuple selection, summing the score probabilities associated with the respective data tuples ordered before the selected data tuple in the sorted set of data tuples to determine a lower bound for all expected ranks for all unselected data tuples in the sorted set of data tuples; and stopping selection of data tuples for inclusion in the second subset of the set of data tuples when the determined lower bound for all expected ranks for all unselected data tuples exceeds the determined expected rank for a particular selected data tuple.

12. A tangible computer readable memory comprising computer-readable instructions, which, when executed, cause a database server to perform operations comprising:

storing a set of data tuples representing a plurality of possible instantiations of the non-deterministic data in a database memory, a first data tuple in the set of data tuples taking on a first one of a set of possible data tuple instantiations selectable according to a first probability representing a likelihood of occurrence of the first one of the set of possible data tuple instantiations, respective ones of the possible instantiations of the non-deterministic data being realized upon selection of a respective combination of possible data tuple instantiations for a combination of data tuples in the set of data tuples, the respective ones of the possible instantiations of the non-deterministic data being associated with respective instantiation probabilities;

determining a ranking of the set of data tuples for output by the database server in response to a query requesting a first number of data tuples collectively exhibiting a highest ranking among the set of data tuples, wherein the determining the ranking comprises determining an expected rank for the first data tuple, the expected rank for the first data tuple corresponding to a combination of multiple weighted component ranks for the first data tuple across the plurality of possible instantiations of the non-deterministic data, respective ones of the weighted component ranks for the first data tuple comprising a component rank, which represents a respective rank of the first data tuple in a respective one of the possible instantiations of the non-deterministic data, weighted by the respective instantiation probability for the respective one of the possible instantiations of the non-deterministic data; and outputting a first ranked subset of the data tuples containing the first number of data tuples determined to exhibit the highest ranking among the set of data tuples, wherein the first ranked subset of the data tuples exhibits all of an exactness property, a containment property, a unique ranking property, a value invariance property and a stability property.

13. The tangible computer readable memory as defined in claim 12 wherein:

the first ranked subset of the data tuples exhibits the exactness property when the first ranked subset of the data tuples comprises exactly the first number of data tuples;

the first ranked subset of the data tuples exhibits the containment property when the first ranked subset of the subset of the data tuples is included in a second ranked subset of the subset of the data tuples determined in response to a query requesting a second number of data tuples collectively exhibiting a highest ranking among the set of data tuples, the second number of data tuples being greater than the first number of data tuples;

the first ranked subset of the data tuples exhibits the unique ranking property when each data tuple included in the first ranked subset of the data tuples is assigned a unique rank;

the first ranked subset of the data tuples exhibits the value invariance property when an ordering of the data tuples included in the first ranked subset of the data tuples is to remain unchanged if a first score associated with the first data tuple is to be altered without changing an ordering of all scores associated with all data tuples included in the first ranked subset of the data tuples; and the first ranked subset of the data tuples exhibits the stability property when increasing a likelihood or an importance of the first data tuple relative to other data tuples included in the first ranked subset of the data tuples does not remove the first data tuple from the first ranked subset of the data tuples.

14. The tangible computer readable memory as defined in claim 12 wherein each data tuple is associated with a respective set of scores paired with a respective set of score probabilities forming a respective set of score and score probability pairings, a particular score and score probability pairing representing a particular data tuple instantiation of the respective data tuple, a score in the particular pairing determined by evaluating a scoring function for a value of an uncertain attribute associated with the particular data tuple instantiation and a corresponding score probability in the particular pairing representing how likely the particular data tuple instantiation of the respective data tuple is to occur, and wherein the operations further comprise:

selecting a respective first score and a respective first score probability for each data tuple to realize a first one of the possible instantiations of the non-deterministic data;

selecting a respective second score and a respective second score probability for each data tuple to realize a second one of the possible instantiations of the non-deterministic data;

combining the respective first probabilities for all data tuples in the set of data tuples to determine a first instantiation probability;

combining the respective second probabilities for all data tuples in the set of data tuples to determine a second instantiation probability;

determining a first rank of the first data tuple, the first rank representative of a first ranking of the first data tuple when realized into the first one of the possible instantiations of the non-deterministic data;

determining a second rank of the first data tuple, the second rank representative of a second ranking of the first data tuple when realized into the second one of the possible instantiations of the non-deterministic data; and combining the first rank weighted by the first instantiation probability with the second rank weighted by the second instantiation probability to determine the expected rank of the first data tuple across the plurality of possible instantiations of the non-deterministic data.

15. The tangible computer readable memory as defined in claim 12 wherein each data tuple is associated with a respective score and a respective score probability, the respective score determined by evaluating a scoring function for a value of an uncertain attribute associated with the particular data tuple, the respective score probability representing how likely the respective data tuple will be included in the plurality of possible instantiations of the non-deterministic data, the first set of possible data tuple instantiations for the first data tuple including (1) a first possible data tuple instantiation corresponding to the first data tuple being selected for inclusion in one of the possible instantiations of the non-deterministic data, and (2) a second possible data tuple instantiation corresponding to the first data tuple not being selected for inclusion in the one of the possible instantiations of the non-deterministic data, and wherein operations further comprise:

using a set of exclusion rules to determine which data tuples are included in each of the plurality of possible instantiations of the non-deterministic data, each data tuple being included in only one exclusion rule, each exclusion rule including one or more data tuples, any pair of data tuples occurring in a particular exclusion rule not being included together in any of the possible instantiations of the non-deterministic data;

for the first data tuple, summing the score probabilities associated with the data tuples ordered after the first data tuple in decreasing order of score to determine a first quantity;

summing the respective score probabilities associated with all data tuples to determine a second quantity; and for the first data tuple, combining the first quantity and the second quantity with score probabilities associated with at least some data tuples included with the first data tuple in a first exclusion rule to determine the expected rank for the first data tuple.

16. A database server for use in ranking non-deterministic data, the database server comprising:

a memory having machine readable instructions stored thereon;

a probabilistic database to store a set of data tuples representing a plurality of possible instantiations of the non-deterministic data, a first data tuple in the set of data tuples taking on a first one of a set of possible data tuple instantiations selectable according to a first probability representing a likelihood of occurrence of the first one of the set of possible data tuple instantiations, respective ones of the possible instantiations of the non-deterministic data being realized upon selection of a respective combination of possible data tuple instantiations for a combination of data tuples in the set of data tuples, the respective ones of the possible instantiations of the non-deterministic data being associated with respective instantiation probabilities; and an expected ranking processor to execute the machine readable instructions to perform operations comprising:

determining a ranking of the set of data tuples for output by the database server in response to a query requesting a first number of data tuples collectively exhibiting a highest ranking among the set of data tuples, wherein the determining the ranking comprises determining an expected rank for the first data tuple, the expected rank for the first data tuple corresponding to a combination of multiple weighted component ranks for the first data tuple across the plurality of possible instantiations of the non-deterministic data, respective ones of the weighted component ranks for the first data tuple comprising a component rank, which represents a respective rank of the first data tuple in a respective one of the possible instantiations of the non-deterministic data, weighted by the respective instantiation probability for the respective one of the possible instantiations of the non-deterministic data; and outputting a first ranked subset of the data tuples containing the first number of data tuples determined to exhibit the highest ranking among the set of data tuples, wherein the first ranked subset of the data tuples exhibits all of an exactness property, a containment property, a unique ranking property, a value invariance property and a stability property.

17. The database server as defined in claim 16 wherein:

the first ranked subset of the data tuples exhibits the exactness property when the first ranked subset of the data tuples comprises exactly the first number of data tuples;

the first ranked subset of the data tuples exhibits the containment property when the first ranked subset of the data tuples is included in a second ranked subset of the subset of the data tuples determined in response to a query requesting a second number of data tuples collectively exhibiting a highest ranking among the set of data tuples, the second number of data tuples being greater than the first number of data tuples;

the first ranked subset of the data tuples exhibits the unique ranking property when each data tuple included in the first ranked subset of the data tuples is assigned a unique rank;

the first ranked subset of the data tuples exhibits the value invariance property when an ordering of the data tuples included in the first ranked subset of the data tuples is to remain unchanged if a first score associated with the first data tuple is to be altered without changing an ordering of all scores associated with all data tuples included in the first ranked subset of the data tuples; and the first ranked subset of the data tuples exhibits the stability property when increasing a likelihood or an importance of the first data tuple relative to other data tuples included in the first ranked subset of the data tuples does not remove the first data tuple from the first ranked subset of the data tuples.

18. The database server as defined in claim 16 wherein each data tuple is associated with a respective set of scores paired with a respective set of score probabilities forming a respective set of score and score probability pairings, a particular score and score probability pairing representing a particular data tuple instantiation of the respective data tuple, a score in the particular pairing determined by evaluating a scoring function for a value of an uncertain attribute associated with the particular data tuple instantiation and a corresponding score probability in the particular pairing representing how likely the particular data tuple instantiation of the respective data tuple is to occur, and wherein the operations further comprise:

selecting a respective first score and a respective first score probability for each data tuple to realize a first one of the possible instantiations of the non-deterministic data;

selecting a respective second score and a respective second score probability for each data tuple to realize a second one of the possible instantiations of the non-deterministic data;

combining the respective first probabilities for all data tuples in the set of data tuples to determine a first instantiation probability;

combining the respective second probabilities for all data tuples in the set of data tuples to determine a second instantiation probability;

determining a first rank of the first data tuple, the first rank representative of a first ranking of the first data tuple when realized into the first one of the possible instantiations of the non-deterministic data;

determining a second rank of the first data tuple, the second rank representative of a second ranking of the first data tuple when realized into the second one of the possible instantiations of the non-deterministic data; and combining the first rank weighted by the first instantiation probability with the second rank weighted by the second instantiation probability to determine the expected rank of the first data tuple across the plurality of possible instantiations of the non-deterministic data.

19. The database server as defined in claim 16 wherein each data tuple is associated with a respective score and a respective score probability, the respective score determined by evaluating a scoring function for a value of an uncertain attribute associated with the particular data tuple, the respective score probability representing how likely the respective data tuple will be included in the plurality of possible instantiations of the non-deterministic data, the first set of possible data tuple instantiations for the first data tuple including (1) a first possible data tuple instantiation corresponding to the first data tuple being selected for inclusion in one of the possible instantiations of the non-deterministic data, and (2) a second possible data tuple instantiation corresponding to the first data tuple not being selected for inclusion in the one of the possible instantiations of the non-deterministic data, and wherein operations further comprise:

using a set of exclusion rules to determine which data tuples are included in each of the possible instantiations of the non-deterministic data, each data tuple being included in only one exclusion rule, each exclusion rule including one or more data tuples, any pair of data tuples occurring in a particular exclusion rule not being included together in any of the possible instantiations of the non-deterministic data;

for the first data tuple, summing the score probabilities associated with the data tuples ordered after the first data tuple in decreasing order of score to determine a first quantity;

summing the respective score probabilities associated with all data tuples to determine a second quantity; and for the first data tuple, combining the first quantity and the second quantity with score probabilities associated with at least some data tuples included with the first data tuple in a first exclusion rule to determine the expected rank for the first data tuple.

* * * * *